United States Patent
Yousefpor et al.

(10) Patent No.: US 12,099,683 B2
(45) Date of Patent: Sep. 24, 2024

(54) DIFFERENTIAL ACOUSTIC TOUCH AND FORCE SENSING

(71) Applicant: Apple Inc., Cupertino, CA (US)

(72) Inventors: Marduke Yousefpor, San Jose, CA (US); Mohammad Yeke Yazdandoost, San Francisco, CA (US); Aaron Scott Tucker, Redwood City, CA (US); Marcus Yip, San Carlos, CA (US); Ehsan Khajeh, Los Gatos, CA (US); Brian Michael King, Saratoga, CA (US); Giovanni Gozzini, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/325,565

(22) Filed: May 30, 2023

(65) Prior Publication Data

US 2023/0384892 A1    Nov. 30, 2023

Related U.S. Application Data

(63) Continuation of application No. 17/450,441, filed on Oct. 8, 2021, now Pat. No. 11,669,199, which is a
(Continued)

(51) Int. Cl.
*G06F 3/041* (2006.01)
*G06F 3/043* (2006.01)

(52) U.S. Cl.
CPC .......... *G06F 3/04166* (2019.05); *G06F 3/043* (2013.01); *G06F 3/0436* (2013.01);
(Continued)

(58) Field of Classification Search
CPC . G06F 2203/04105; G06F 2203/04106; G06F 3/0414; G06F 3/0416; G06F 3/043; G06F 3/0436
See application file for complete search history.

(56) References Cited

U.S. PATENT DOCUMENTS

| 3,673,327 A | 6/1972 | Johnson et al. |
| 4,506,354 A | 3/1985 | Hansen |

(Continued)

FOREIGN PATENT DOCUMENTS

| JP | 2000-163031 A | 6/2000 |
| JP | 2002-342033 A | 11/2002 |

(Continued)

OTHER PUBLICATIONS

Corrected Notice of Allowability received for U.S. Appl. No. 15/988,991, mailed on Sep. 15, 2021, 2 pages.
(Continued)

*Primary Examiner* — Kenneth Bukowski
(74) *Attorney, Agent, or Firm* — Kubota & Basol LLP

(57) ABSTRACT

Acoustic touch and/or force sensing system architectures and methods for acoustic touch and/or force sensing can be used to detect a position of an object touching a surface and an amount of force applied to the surface by the object. The position and/or an applied force can be determined using time-of-flight (TOF) techniques, for example. Acoustic touch sensing can utilize transducers (e.g., piezoelectric) to simultaneously transmit ultrasonic waves along a surface and through a thickness of a deformable material. The location of the object and the applied force can be determined based on the amount of time elapsing between the transmission of the waves and receipt of the reflected waves. In some examples, an acoustic touch sensing system can be insensitive to water contact on the device surface, and thus acoustic touch sensing can be used for touch sensing in devices that may become wet or fully submerged in water.

20 Claims, 52 Drawing Sheets

Related U.S. Application Data continuation of application No. 15/988,991, filed on May 24, 2018, now Pat. No. 11,144,158.

(60) Provisional application No. 62/561,578, filed on Sep. 21, 2017, provisional application No. 62/561,609, filed on Sep. 21, 2017, provisional application No. 62/510,513, filed on May 24, 2017, provisional application No. 62/510,493, filed on May 24, 2017.

(52) U.S. Cl.
CPC ............. *G06F 2203/04105* (2013.01); *G06F 2203/04106* (2013.01)

(56) References Cited

U.S. PATENT DOCUMENTS

| | | | |
|---|---|---|---|
| 4,746,914 A | 5/1988 | Adler | |
| 4,784,154 A * | 11/1988 | Shirley | A61B 7/04 600/528 |
| 4,825,212 A | 4/1989 | Adler et al. | |
| 4,866,325 A * | 9/1989 | Kodama | H03H 9/14547 310/313 C |
| 5,483,261 A | 1/1996 | Yasutake | |
| 5,488,204 A * | 1/1996 | Mead | G06F 3/0446 345/179 |
| 5,591,945 A * | 1/1997 | Kent | G06F 3/0418 345/177 |
| 5,663,695 A * | 9/1997 | Tanaka | H03H 9/02779 333/195 |
| 5,679,998 A * | 10/1997 | Toda | G06F 3/0436 73/632 |
| 5,766,493 A | 6/1998 | Shin | |
| 5,816,225 A | 10/1998 | Koch et al. | |
| 5,825,352 A | 10/1998 | Bisset et al. | |
| 5,835,079 A | 11/1998 | Shieh | |
| 5,854,450 A | 12/1998 | Kent | |
| 5,880,411 A * | 3/1999 | Gillespie | G06V 40/20 345/157 |
| 6,078,315 A | 6/2000 | Huang | |
| 6,091,406 A * | 7/2000 | Kambara | G06F 3/0436 345/177 |
| 6,188,391 B1 | 2/2001 | Seely et al. | |
| 6,225,985 B1 | 5/2001 | Armstrong et al. | |
| 6,229,529 B1 | 5/2001 | Yano et al. | |
| 6,310,610 B1 | 10/2001 | Beaton et al. | |
| 6,323,846 B1 | 11/2001 | Westerman et al. | |
| 6,327,011 B2 | 12/2001 | Kim | |
| 6,690,387 B2 | 2/2004 | Zimmerman et al. | |
| 6,856,259 B1 | 2/2005 | Sharp | |
| 7,015,894 B2 | 3/2006 | Morohoshi | |
| 7,079,118 B2 | 7/2006 | Benard et al. | |
| 7,098,891 B1 | 8/2006 | Pryor | |
| 7,184,064 B2 | 2/2007 | Zimmerman et al. | |
| 7,489,308 B2 | 2/2009 | Blake et al. | |
| 7,499,039 B2 | 3/2009 | Roberts | |
| 7,573,466 B1 | 8/2009 | Marzen et al. | |
| 7,663,607 B2 | 2/2010 | Hotelling et al. | |
| 7,907,129 B2 | 3/2011 | Idzik et al. | |
| 8,169,404 B1 | 5/2012 | Boillot | |
| 8,201,739 B2 * | 6/2012 | Schneider | G06V 40/1306 235/439 |
| 8,479,122 B2 | 7/2013 | Hotelling et al. | |
| 8,666,126 B2 * | 3/2014 | Lee | G06V 40/1306 382/124 |
| 8,743,091 B2 | 6/2014 | Bernstein | |
| 9,984,271 B1 * | 5/2018 | King | G06F 3/0436 |
| 11,093,088 B2 * | 8/2021 | Bagheri | G06F 3/0445 |
| 2004/0164970 A1 | 8/2004 | Benard et al. | |
| 2005/0017959 A1 | 1/2005 | Kraus et al. | |
| 2005/0052432 A1 | 3/2005 | Kraus et al. | |
| 2005/0083313 A1 | 4/2005 | Hardie-bick | |
| 2005/0146513 A1 * | 7/2005 | Hill | G06F 3/0436 345/173 |
| 2005/0248548 A1 * | 11/2005 | Tsumura | G06F 3/0436 345/177 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2007/0211031 A1 | 9/2007 | Marc | |
| 2007/0240913 A1 | 10/2007 | Schermerhorn | |
| 2008/0059761 A1 | 3/2008 | Norman | |
| 2008/0114251 A1 | 5/2008 | Weymer et al. | |
| 2008/0266266 A1 | 10/2008 | Kent et al. | |
| 2010/0026667 A1 * | 2/2010 | Bernstein | G06F 3/0436 345/177 |
| 2010/0225333 A1 * | 9/2010 | Uchida | G01D 5/2415 324/658 |
| 2012/0274599 A1 * | 11/2012 | Schediwy | G06F 3/0447 345/174 |
| 2013/0009905 A1 * | 1/2013 | Castillo | G06F 3/0414 345/174 |
| 2015/0185898 A1 * | 7/2015 | Masson | G06F 3/0436 600/587 |
| 2015/0266723 A1 * | 9/2015 | Chan | H04R 1/08 257/416 |
| 2016/0092714 A1 * | 3/2016 | Yazdandoost | G06F 21/32 345/177 |
| 2016/0092716 A1 * | 3/2016 | Yazdandoost | G06V 40/1306 382/124 |
| 2016/0117034 A1 * | 4/2016 | Day | G06F 3/04166 345/174 |
| 2016/0117541 A1 * | 4/2016 | Lu | G06V 40/1306 382/124 |
| 2017/0262099 A1 * | 9/2017 | Nathan | G06F 3/0443 |
| 2018/0341347 A1 | 11/2018 | Yousefpor et al. | |
| 2022/0075497 A1 | 3/2022 | Yousefpor et al. | |

FOREIGN PATENT DOCUMENTS

| | | |
|---|---|---|
| WO | 2005/103872 A2 | 11/2005 |
| WO | 2005/103872 A3 | 4/2006 |

OTHER PUBLICATIONS

Corrected Notice of Allowance received for U.S. Appl. No. 17/450,441, mailed on Feb. 7, 2023, 2 pages.
Final Office Action received for U.S. Appl. No. 12/184,232, mailed on Aug. 27, 2013, 26 pages.
Final Office Action received for U.S. Appl. No. 12/184,232, mailed on Feb. 20, 2013, 25 pages.
Final Office Action received for U.S. Appl. No. 15/988,991, mailed on Nov. 25, 2020, 9 pages.
Final Office Action received for U.S. Appl. No. 17/450,441, mailed on Sep. 2, 2022, 7 pages.
Non-Final Office Action received for U.S. Appl. No. 12/184,232, mailed on Jul. 25, 2012, 19 pages.
Non-Final Office Action received for U.S. Appl. No. 12/184,232, mailed on Nov. 18, 2011, 22 pages.
Non-Final Office Action received for U.S. Appl. No. 17/450,441, mailed on Mar. 2, 2022, 7 pages.
Non-Final Office Action received for U.S. Appl. No. 15/988,991, mailed on May 13, 2020, 10 pages.
Notice of Allowance received for U.S. Appl. No. 12/184,232, mailed on Mar. 14, 2014, 9 pages.
Notice of Allowance received for U.S. Appl. No. 15/988,991, mailed on Jun. 14, 2021, 9 pages.
Notice of Allowance received for U.S. Appl. No. 17/450,441, mailed on Jan. 26, 2023, 8 pages.
Restriction Requirement received for U.S. Appl. No. 15/988,991, mailed on Dec. 12, 2019, 9 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for

(56) References Cited

OTHER PUBLICATIONS the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

DIFFERENTIAL = A-B
COMMON = A+B

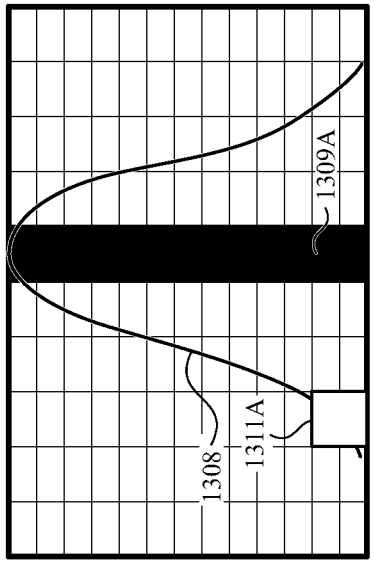
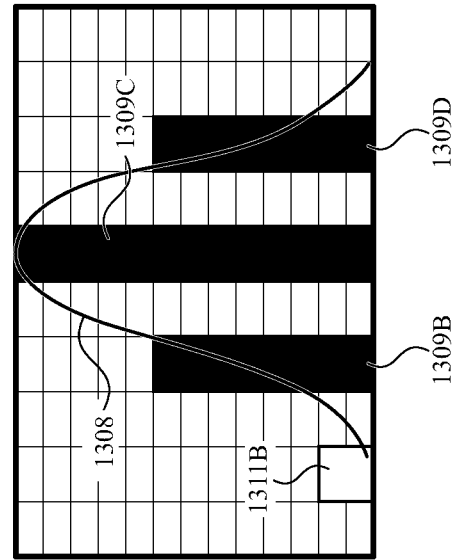
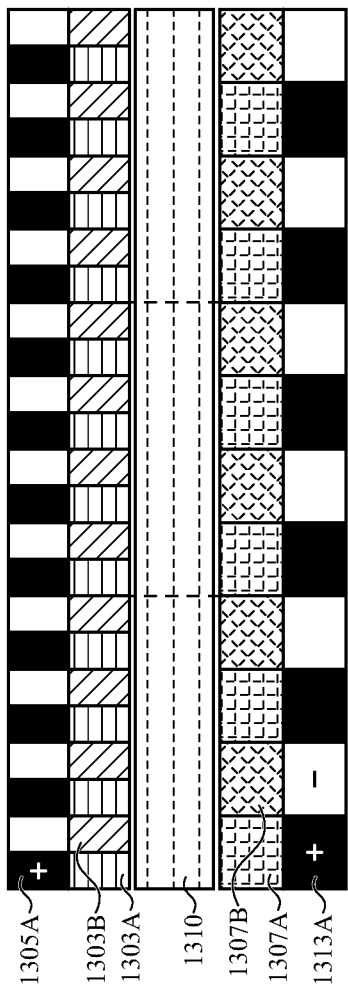
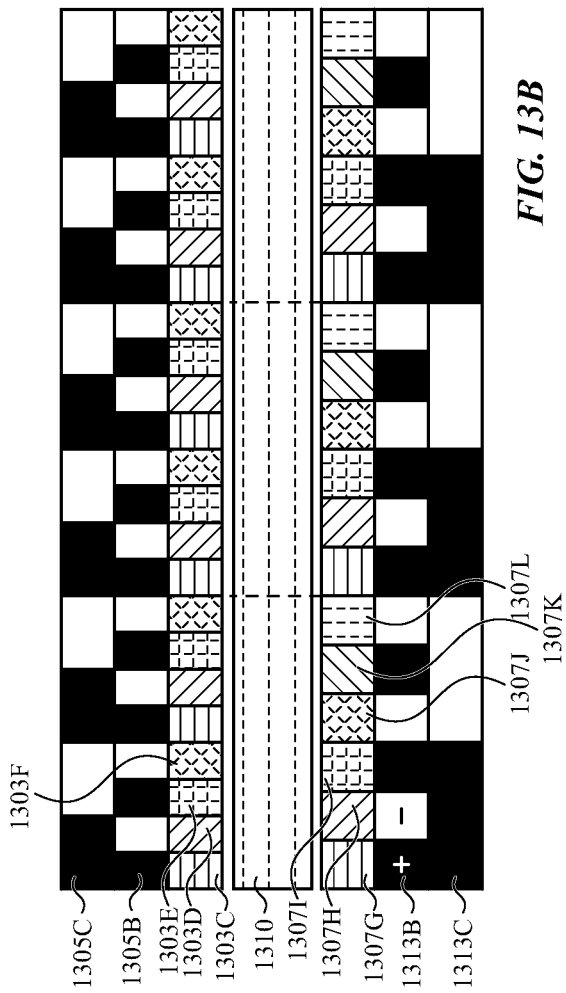
FIG. 13A
FIG. 13B

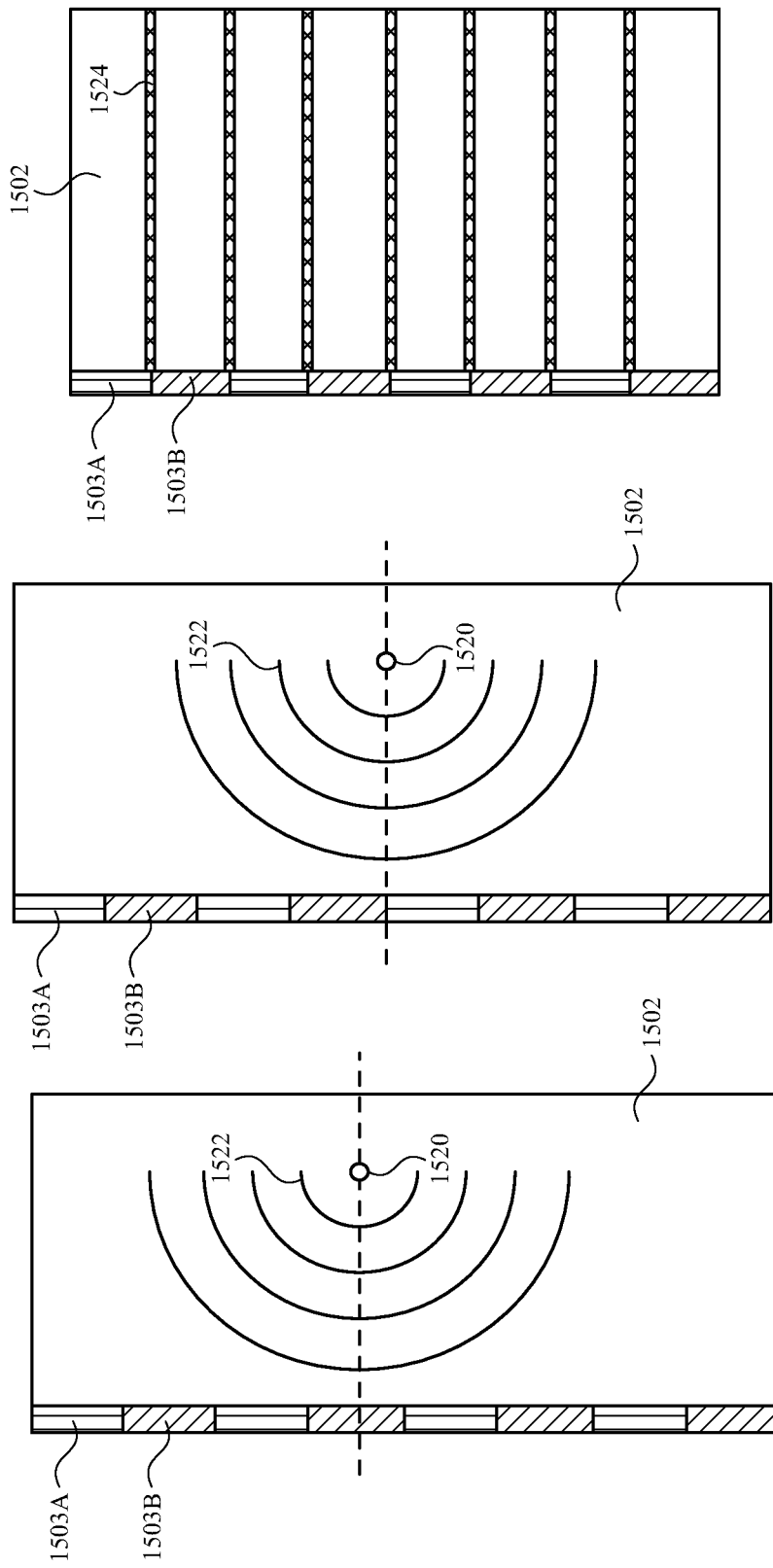

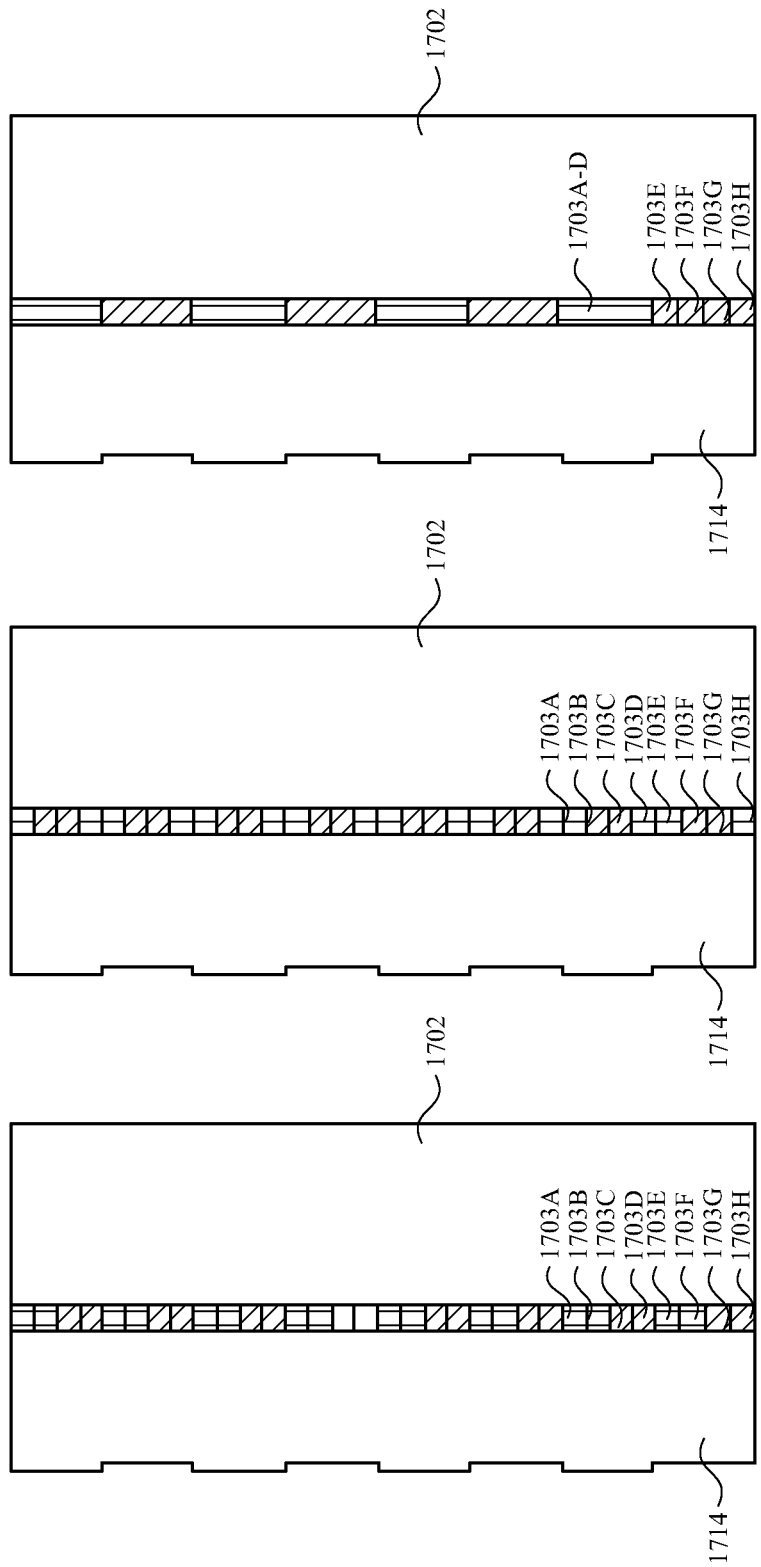

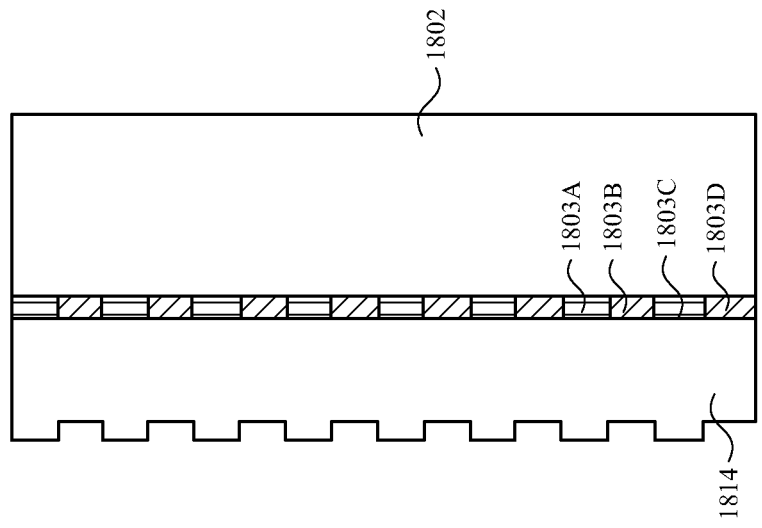
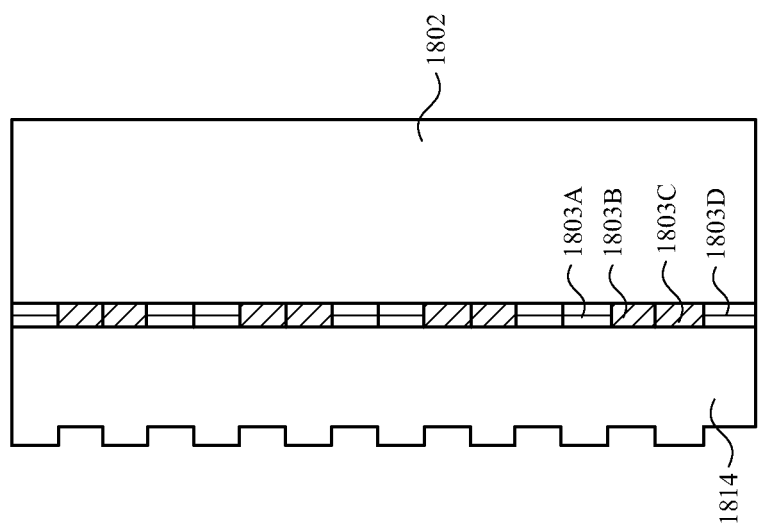
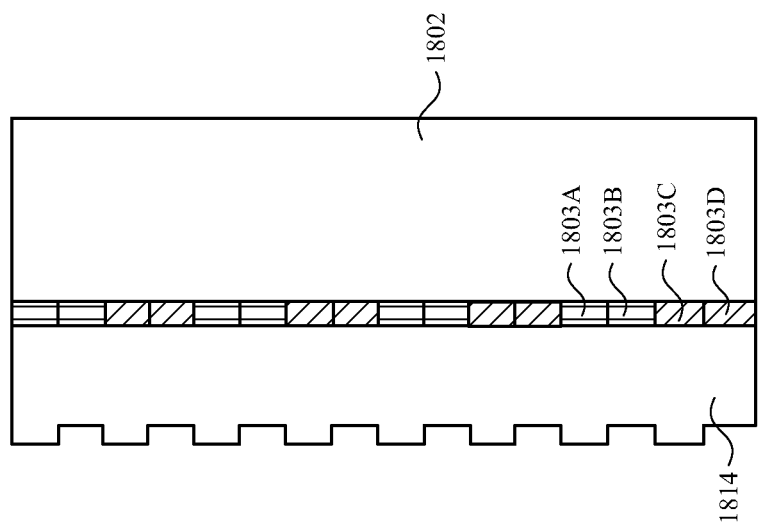

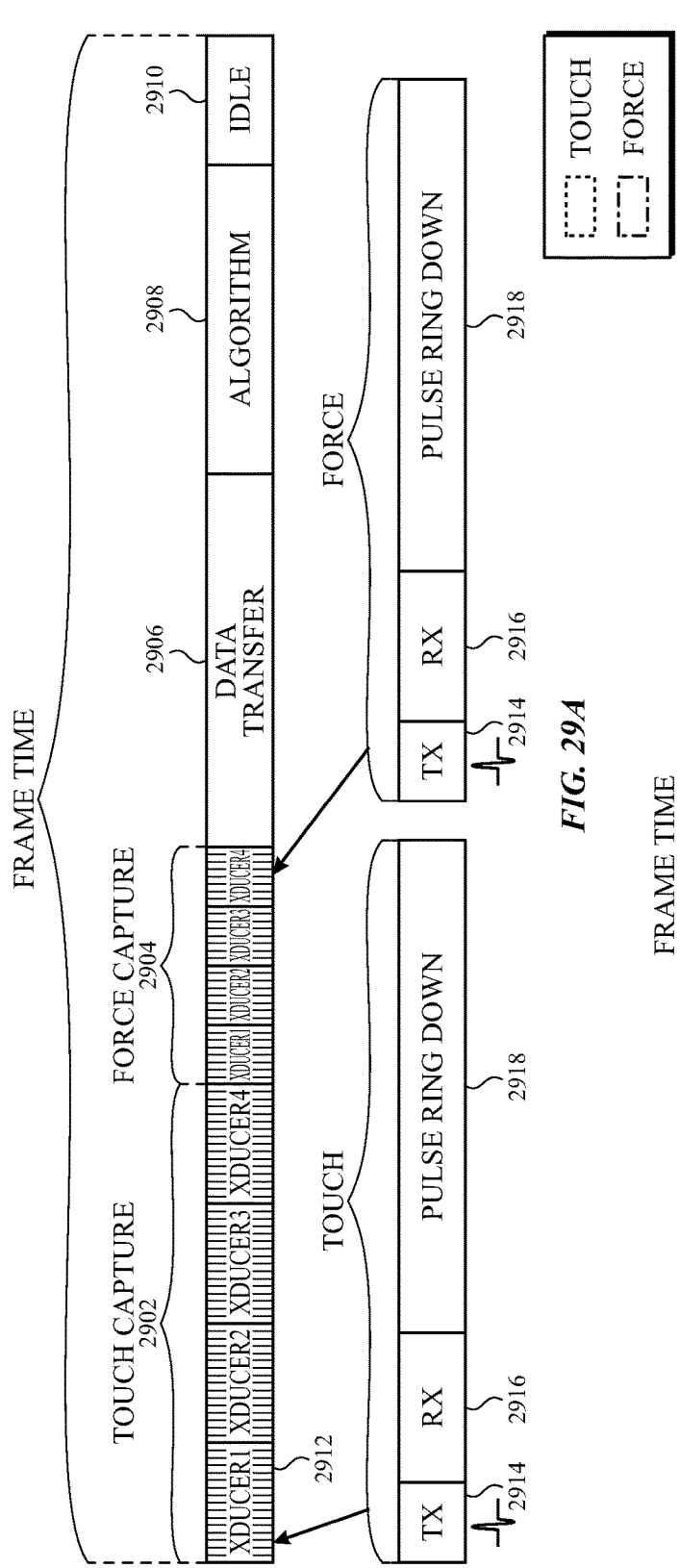
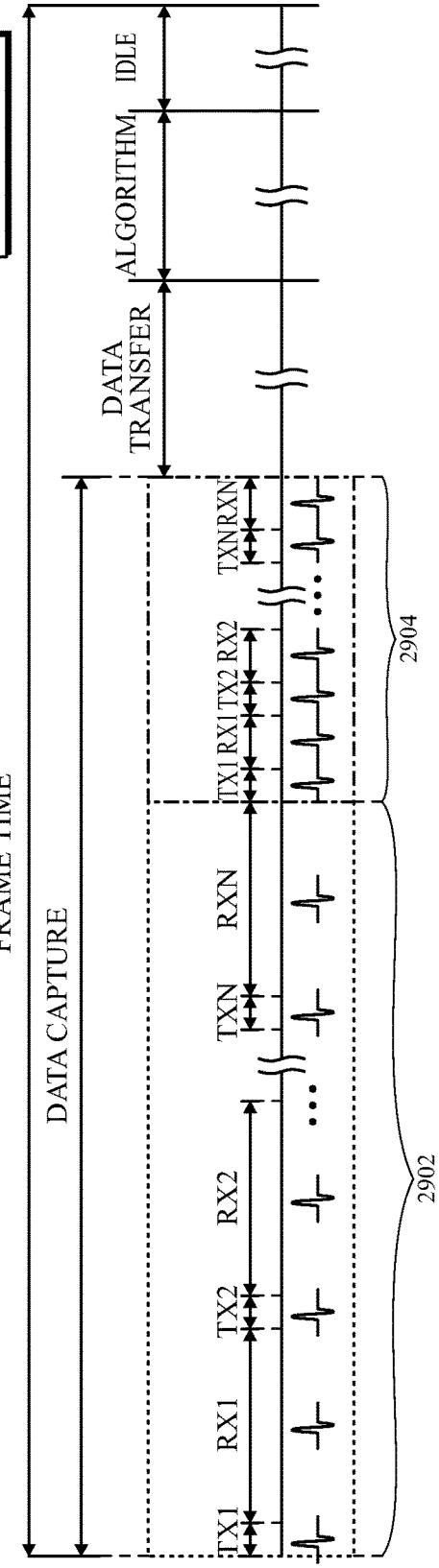
FIG. 29A
FIG. 29B

| | TX | RX (TOUCH - I) | RX (TOUCH - Q) | RX (FORCE) |
|---|---|---|---|---|
| CLOSED SWITCHES (WITH ACM REJECTION) | 32S9, 32S10, 32S11, 32S12, 32S13 | 32S1, 32S2, 32S7, 32S8 | 32S1, 32S4, 32S6, 32S7 | 32S1, 32S3, 32S6, 32S8 |
| CONNECTED ELECTRODES | 32A, 32B, 32C, 32D VS. 32E | 32A, 32B VS. 32C, 32D | 32A, 32D VS. 32B, 32C | 32A, 32C VS. 32B, 32D |

|  | TX | RX (TOUCH - I) | RX (TOUCH - Q) | RX (FORCE) |
|---|---|---|---|---|
| CLOSED SWITCHES (WITH ACM REJECTION) | 34S15, 34S16, 34S17, 34S18, 54S19, 34S20, 34S21, 34S22, 34S23 | 34S1, 34S2, 34S3, 34S4, 34S8, 34S9, 34S10, 34S11 | 34S2, 34S4, 34S5, 34S6, 34S9, 34S11, 34S12, 34S13 | 34S1, 34S2, 34S5, 34S7, 34S10, 34S11, 34S13, 34S14 |
| CONNECTED ELECTRONICS | 34A, 34B, 34C, 34D 34A1, 34B1, 34C1 34D1 VS. 34E | 34A, 34B, 34A1 34B1 VS. 34C 34D, 34C1, 34D1 | 34B, 34C, 34B1 34C1 VS. 34A 34D, 34A1, 34D1 | 34A, 34B, 34C 34D VS. 34A1 34B1, 34C1, 34D1 |

*FIG. 34*
*(CONTINUED)*

| | TX |
|---|---|
| CLOSED SWITCHES | 36S5, 36S6, 36S7, 36S8, 36S9 |
| CONNECTED ELECTRODES | 36A, 36B, 36C 36D VS. 36E |

DIFFERENTIAL ACOUSTIC TOUCH AND FORCE SENSING

CROSS-REFERENCE TO RELATED APPLICATIONS

This application is a continuation of U.S. application Ser. No. 17/450,441, filed Oct. 8, 2021, and published as U.S. Publication Number 2022-0075497 on Mar. 10, 2022, which is a continuation of U.S. application Ser. No. 15/988,991, filed May 24, 2018, and issued as U.S. Pat. No. 11,144,158 on Oct. 12, 2021, which claims priority to U.S. Provisional Application Ser. No. 62/510,493, filed May 24, 2017, U.S. Provisional Application Ser. No. 62/510,513, filed May 24, 2017, U.S. Provisional Application Ser. No. 62/561,578, filed Sep. 21, 2017 and U.S. Provisional Application Ser. No. 62/561,609, filed Sep. 21, 2017, the contents of which are hereby incorporated herein by reference in their entirety for all purposes.

FIELD OF THE DISCLOSURE

This relates generally to touch and/or force sensing systems, and more particularly, to integrated acoustic touch and force sensing systems and methods for acoustic touch and force sensing.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. Capacitive-type touch sensing systems, however, can experience reduced performance due to conductive, electrically-floating objects (e.g., water droplets) in contact with the touch-sensitive surface.

SUMMARY

This relates to acoustic touch and/or force sensing systems and methods for acoustic touch and/or force sensing. The position of an object touching a surface can be determined using time-of-flight (TOF) techniques, for example. Acoustic touch and/or force sensing can utilize transducers, such as piezoelectric transducers, to transmit ultrasonic waves along a surface and/or through the thickness of one or more materials (e.g., a thickness of an electronic device housing). As the wave propagates along the surface and/or through the thickness of the one or more materials, an object (e.g., finger, stylus, etc.) in contact with the surface can interact with the transmitted wave, causing a reflection of at least a portion of the transmitted wave. Portions of the transmitted wave energy after interaction with the object can be measured to determine the touch location of the object on the surface of the device. For example, one or more transducers (e.g., acoustic transducers) coupled to a surface of a device can be configured to transmit an acoustic wave along the surface and/or through the thickness of the one or more materials and can receive a portion of the wave reflected back when the acoustic wave encounters a finger or other object touching the surface. The location of the object can be determined, for example, based on the amount of time elapsing between the transmission of the wave and the detection of the reflected wave. Acoustic touch sensing can be used instead of, or in conjunction with, other touch sensing techniques, such as resistive, optical, and/or capacitive touch sensing. In some examples, the acoustic touch sensing techniques described herein can be used on a metal housing surface of a device, which may be unsuitable for capacitive or resistive touch sensing due to interference (e.g., of the housing with the capacitive or resistive sensors housed in the metal housing). In some examples, the acoustic touch sensing techniques described herein can be used on a glass surface of a display or touch screen. In some examples, an acoustic touch sensing system can be configured to be insensitive to contact on the device surface by water, and thus acoustic touch sensing can be used for touch sensing in devices that may become wet or fully submerged in water.

Additionally or alternatively, a force applied by the object on the surface can also be determined using TOF techniques. For example, one or more transducers can transmit ultrasonic waves through the thickness of a deformable material, and reflected waves from the opposite edge of the deformable material can be measured to determine a TOF or a change in TOF. The TOF, or change in TOF (ATOF), can correspond to the thickness of the deformable material (or changes in thickness) due to force applied to the surface. Thus, the TOF or change in TOF (or the thickness or change in thickness) can be used to determine the applied force. In some examples, using acoustic touch and force sensing can reduce the complexity of the touch and force sensing system by reducing the sensing hardware requirements (e.g., transducers, sensing circuitry/controllers, etc. can be integrated/shared).

The present disclosure is primarily directed to timing and switching schemes for acoustic touch sensing as described with regard to FIGS. 19A-36B below. FIGS. 1A-18C provide context to the timing and switching schemes as well as several exemplary configurations illustrating touch and force sensing systems according to examples of the disclosure.

BRIEF DESCRIPTION OF THE DRAWINGS

FIGS. 13A and 13B illustrated exemplary configurations and groupings for double sided differential electrode configurations according to examples of the disclosure.

FIGS. 15A-15C illustrate a spatial null phenomenon that can be associated with spatial differential electrode configurations according to examples of the disclosure.

FIGS. 17A-17C illustrates a first exemplary spatial electrode configuration for performing quadrature spatial differential measurements of touch signals on cover glass and force sensing using a shared set of electrodes according to examples of the disclosure.

FIGS. 18A-18C illustrates a second exemplary spatial electrode configuration for performing quadrature spatial differential measurements of touch signals on cover glass and force sensing using a shared set of electrodes according to examples of the disclosure.

FIGS. 28A-30B illustrate exemplary timing diagrams for acoustic touch and force sensing according to examples of the disclosure.

DETAILED DESCRIPTION

Figure 1A:
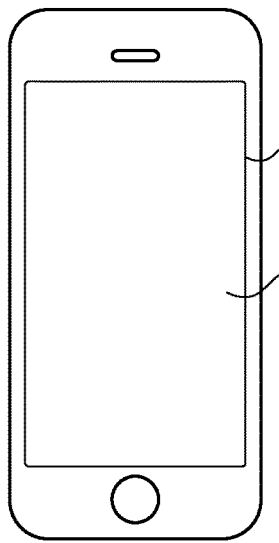
FIGS. 1A-1E illustrate exemplary systems with touch screens that can include acoustic sensors for detecting contact between an object and a surface of the system according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

This relates to acoustic touch and/or force sensing systems and methods for acoustic touch and/or force sensing. The position of an object touching a surface can be determined using time-of-flight (TOF) techniques, for example. Acoustic touch and/or force sensing can utilize transducers, such as piezoelectric transducers, to transmit ultrasonic waves along a surface and/or through the thickness of one or more materials (e.g., a thickness of an electronic device housing). As the wave propagates along the surface and/or through the thickness of the one or more materials, an object (e.g., finger, stylus, etc.) in contact with the surface can interact with the transmitted wave, causing a reflection of at least a portion of the transmitted wave. Portions of the transmitted wave energy after interaction with the object can be measured to determine the touch location of the object on the surface of the device. For example, one or more transducers (e.g., acoustic transducers) coupled to a surface of a device can be configured to transmit an acoustic wave along the surface and/or through the thickness of the one or more materials and can receive a portion of the wave reflected back when the acoustic wave encounters a finger or other object touching the surface. The location of the object can be determined, for example, based on the amount of time elapsing between the transmission of the wave and the detection of the reflected wave. Acoustic touch sensing can be used instead of, or in conjunction with, other touch sensing techniques, such as resistive, optical, and/or capacitive touch sensing. In some examples, the acoustic touch sensing techniques described herein can be used on a metal housing surface of a device, which may be unsuitable for capacitive or resistive touch sensing due to interference (e.g., of the housing with the capacitive or resistive sensors housed in the metal housing). In some examples, the acoustic touch sensing techniques described herein can be used on a glass surface of a display or touch screen. In some examples, an acoustic touch sensing system can be configured to be insensitive to contact on the device surface by water, and thus acoustic touch sensing can be used for touch sensing in devices that may become wet or fully submerged in water.

Additionally or alternatively, a force applied by the object on the surface can also be determined using TOF techniques. For example, one or more transducers can transmit ultrasonic waves through the thickness of a deformable material, and reflected waves from the opposite edge of the deformable material can be measured to determine a TOF or a change in TOF. The TOF, or change in TOF (ATOF), can correspond to the thickness of the deformable material (or changes in thickness) due to force applied to the surface. Thus, the TOF or change in TOF (or the thickness or change in thickness) can be used to determine the applied force. In some examples, using acoustic touch and force sensing can reduce the complexity of the touch and force sensing system by reducing the sensing hardware requirements (e.g., transducers, sensing circuitry/controllers, etc. can be integrated/shared).

The present disclosure is primarily directed to timing and switching schemes for acoustic touch sensing as described with regard to FIGS. 19A-36B below. FIGS. 1A-18C provide context to the timing and switching schemes as well as several exemplary configurations illustrating touch and force sensing systems according to examples of the disclosure.

Figure 1B:
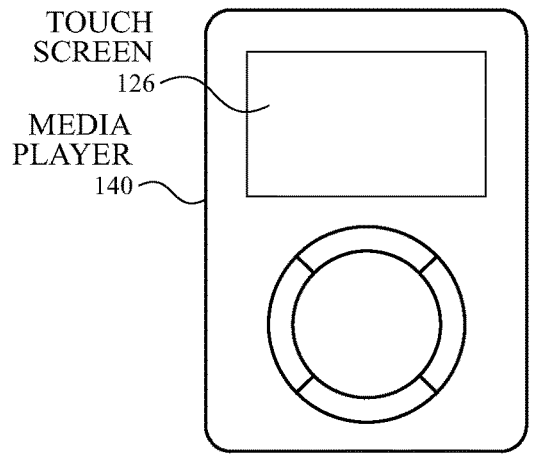
Figure 1C:
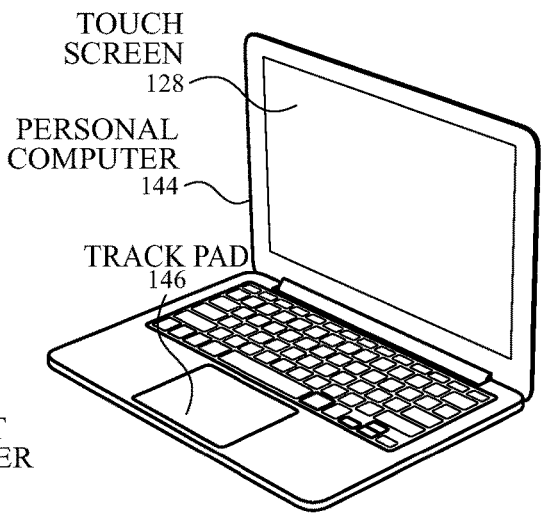
Figure 1D:
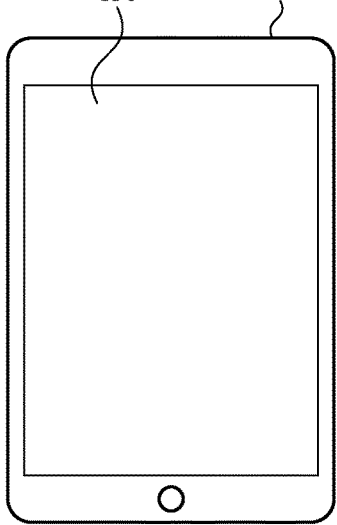
Figure 1E:
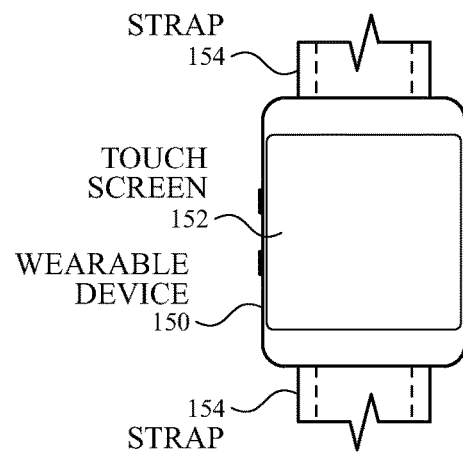

FIGS. 1A-1E illustrate exemplary systems with touch screens that can include acoustic sensors for detecting contact between an object (e.g., a finger or stylus) and a surface of the system according to examples of the disclosure. Detecting contact can include detecting a location of contact and/or an amount of force applied to a touch-sensitive surface. FIG. 1A illustrates an exemplary mobile telephone 136 that includes a touch screen 124 and can include an acoustic touch and/or force sensing system according to examples of the disclosure. FIG. 1B illustrates an example digital media player 140 that includes a touch screen 126 and can include an acoustic touch and/or force sensing system according to examples of the disclosure. FIG. 1C illustrates an example personal computer 144 that includes a touch screen 128 and a track pad 146, and can include an acoustic touch and/or force sensing system according to examples of the disclosure. FIG. 1D illustrates an example tablet computing device 148 that includes a touch screen 130 and can include an acoustic touch and/or force sensing system according to examples of the disclosure. FIG. 1E illustrates an example wearable device 150 (e.g., a watch) that includes a touch screen 152 and can include an acoustic touch and/or force sensing system according to examples of the disclosure. Wearable device 150 can be coupled to a user via strap 154 or any other suitable fastener. It should be understood that the example devices illustrated in FIGS. 1A-1E are provided by way of example, and other types of devices can include an acoustic touch and/or force sensing system for detecting contact between an object and a surface of the device. Additionally, although the devices illustrated in FIGS. 1A-1E include touch screens, in some examples, the devices may have a non-touch-sensitive display.

Acoustic sensors can be incorporated in the above described systems to add acoustic touch and/or force sensing capabilities to a surface of the system. For example, in some examples, a touch screen (e.g., capacitive, resistive, etc.) can be augmented with acoustic sensors to provide a touch and/or force sensing capability for use in wet environments or under conditions where the device may get wet (e.g., exercise, swimming, rain, washing hands). In some examples, an otherwise non-touch sensitive display screen can be augmented with acoustic sensors to provide a touch and/or force sensing capability. In such examples, a touch screen can be implemented without the stack-up required for a capacitive touch screen. In some examples, the acoustic sensors can be used to provide touch and/or force sensing capability for a non-display surface. For example, the acoustic sensors can be used to provide touch sensing capabilities for a track pad 146, a button, a scroll wheel, part or all of the housing or any other surfaces of the device (e.g., on the front, rear or sides).

Figure 2:
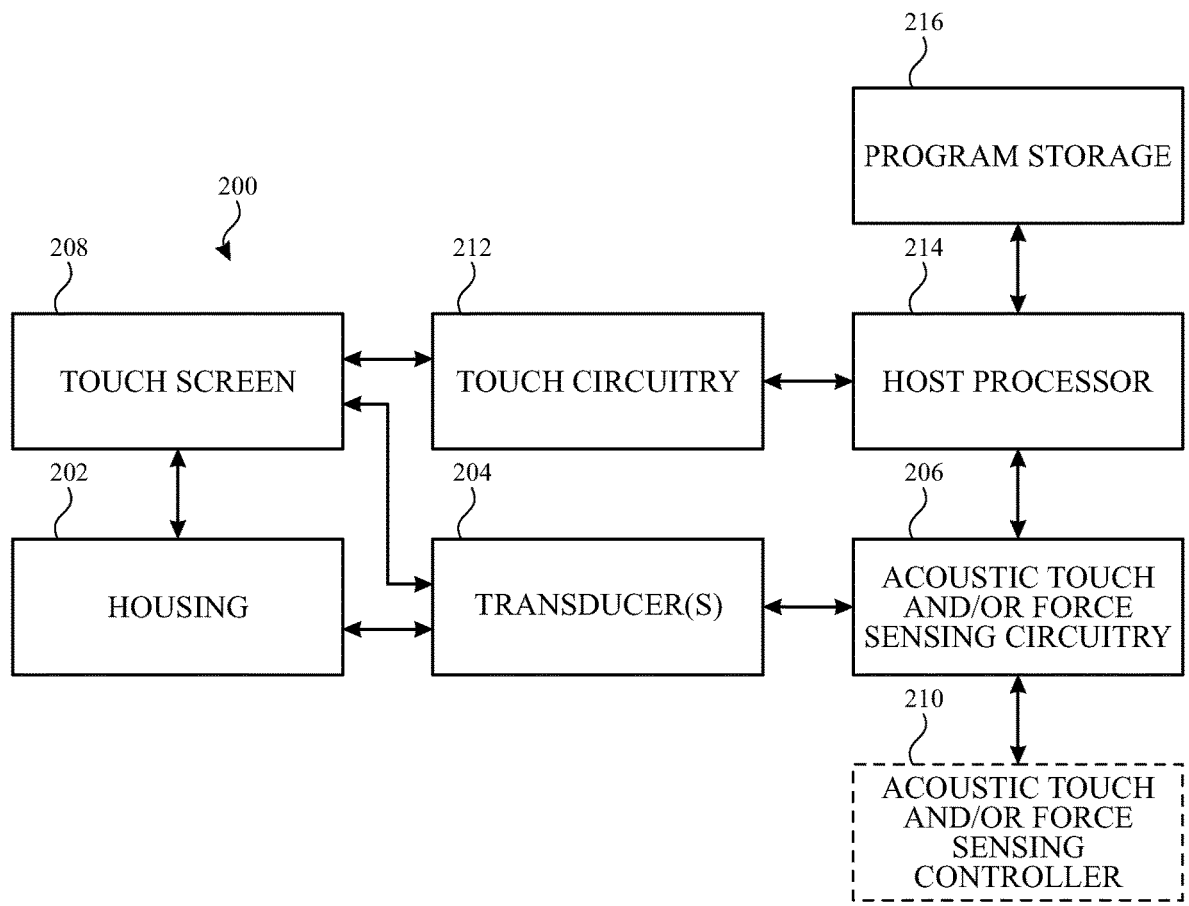
FIG. 2 illustrates an exemplary block diagram of an electronic device including an acoustic touch and/or force sensing system according to examples of the disclosure.

FIG. 2 illustrates an exemplary block diagram of an electronic device including an acoustic touch and/or force sensing system according to examples of the disclosure. In some examples, housing 202 of device 200 (e.g., corresponding to devices 136, 140, 144, 148, and 150 above) can be coupled (e.g., mechanically) with one or more acoustic transducers 204. In some examples, transducers 204 can be piezoelectric transducers, which can be made to vibrate by the application of electrical signals when acting as a transmitter, and generate electrical signals based on detected vibrations when acting as a receiver. In some examples, transducers 204 can be formed from a piezoelectric ceramic material (e.g., PZT or KNN) or a piezoelectric plastic material (e.g., PVDF or PLLA). Similarly, transducers 204 can produce electrical energy as an output when vibrated. In some examples, transducers 204 can be bonded to housing 202 by a bonding agent (e.g., a thin layer of stiff epoxy). In some examples, transducers 204 can be deposited on one or more surfaces (e.g., a cover glass of touch screen 208 and/or a deformable material as described in more detail below) through processes such as deposition, lithography, or the like. In some examples, transducers 204 can be bonded to the one or more surfaces using electrically conductive or non-conductive bonding materials. When electrical energy is applied to transducers 204 it can cause the transducers to vibrate, the one or more surfaces in contact with the transducers can also be caused to vibrate, and the vibrations of the molecules of the surface material can propagate as an acoustic wave through the one or more surfaces/materials. In some examples, vibration of transducers 204 can be used to produce ultrasonic acoustic waves at a selected frequency over a broad frequency range (e.g., 500 kHz-10 MHz) in the medium of the surface of the electronic device which can be metal, plastic, glass, wood, or the like. It should be understood that other frequencies outside of the exemplary range above can be used while remaining within the scope of the present disclosure.

In some examples, transducers 204 can be partially or completely disposed on (or coupled to) a portion of a touch screen 208. For example, touch screen 208 (e.g., capacitive) may include a glass panel (cover glass) or a plastic cover, and a display region of the touch screen may be surrounded by a non-display region (e.g., a black border region surrounding the periphery of the display region of touch screen 208). In some examples, transducers 204 can be disposed partially or completely in the black mask region of touch screen 208 (e.g., on the back side of the glass panel behind the black mask) such that the transducers are not visible (or are only partially visible) to a user. In some examples, transducers 204 can be partially or completely disposed on (or coupled to) a portion of a deformable material (not shown). In some examples, the deformable material can be disposed between touch screen 208 and a rigid material (e.g., a portion of housing 202). In some examples, the deformable material can be silicone, rubber or polyethylene. In some examples, the deformable material can also be used for water sealing of the device.

Device 200 can further include acoustic touch and/or force sensing circuitry 206, which can include circuitry for driving electrical signals to stimulate vibration of transducers 204 (e.g., transmit circuitry), as well as circuitry for sensing electrical signals output by transducers 204 when the transducer is stimulated by received acoustic energy (e.g., receive circuitry). In some examples, timing operations for acoustic touch and/or force sensing circuitry 206 can optionally be provided by a separate acoustic touch and/or force sensing controller 210 that can control timing of and other operations by acoustic touch and/or force sensing circuitry 206. In some examples, touch and/or force sensing controller 210 can be coupled between acoustic touch and/or force sensing circuitry 206 and host processor 214. In some examples, controller functions can be integrated with acoustic touch and/or force sensing circuitry 206 (e.g., on a single integrated circuit). In particular, examples integrating touch and force sensing circuitry and controller functionality into a single integrated circuit can reduce the number of transducers (sensor elements) and electronic chipsets for a touch and force sensing device. Output data from acoustic touch and/or force sensing circuitry 206 can be output to a host processor 214 for further processing to determine a location of and a force applied by an object contacting the device as will be described in more detail below. In some examples, the processing for determining the location of and a force applied by the contacting object can be performed by acoustic touch and/or force sensing circuitry 206, acoustic touch and/or force sensing controller 210 or a separate sub-processor of device 200 (not shown).

In addition to acoustic touch and/or force sensing, device 200 can include additional touch circuitry 212 and optionally a touch controller (not shown) that can be coupled to the touch screen 208. In examples including a touch controller, the touch controller can be disposed between touch circuitry 212 and host processor 214. Touch circuitry 212 can, for example, be capacitive or resistive touch sensing circuitry, and can be used to detect contact and/or hovering of objects (e.g., fingers, styli) in contact with and/or in proximity to touch screen 208, particularly in the display region of the touch screen. Thus, device 200 can include multiple types of sensing circuitry (e.g., touch circuitry 212 and acoustic touch and/or force sensing circuitry 206) for detecting objects (and their positions and/or applied force) in different regions of the device and/or for different purposes, as will be described in more detail below. Although described herein as including a touch screen, it should be understood that touch circuitry 212 can be omitted, and in some examples, touch screen 208 can be replaced by an otherwise non-touch-sensitive display (e.g., but-for the acoustic sensors).

Host processor 214 can receive acoustic or other touch outputs (e.g., capacitive) and/or force outputs and perform actions based on the touch outputs and/or force outputs. Host processor 214 can also be connected to program storage 216 and touch screen 208. Host processor 214 can, for example, communicate with touch screen 208 to generate an image on touch screen 208, such as an image of a user interface (UI), and can use touch sensing circuitry 212 and/or acoustic touch and/or force sensing circuitry 206 (and, in some examples, their respective controllers) to detect a touch on or near touch screen 208 and/or an applied force, such as a touch input and/or force input to the displayed UI. The touch input and/or force input can be used by computer programs stored in program storage 216 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch and/or force processing.

Note that one or more of the functions described herein can be performed by firmware stored in memory and executed by touch circuitry 212 and/or acoustic touch and/or force sensing circuitry 206 (or their respective controllers), or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2, but can include other or additional components in multiple configurations according to various examples. Additionally, the components of device 200 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2.

Figure 3A:
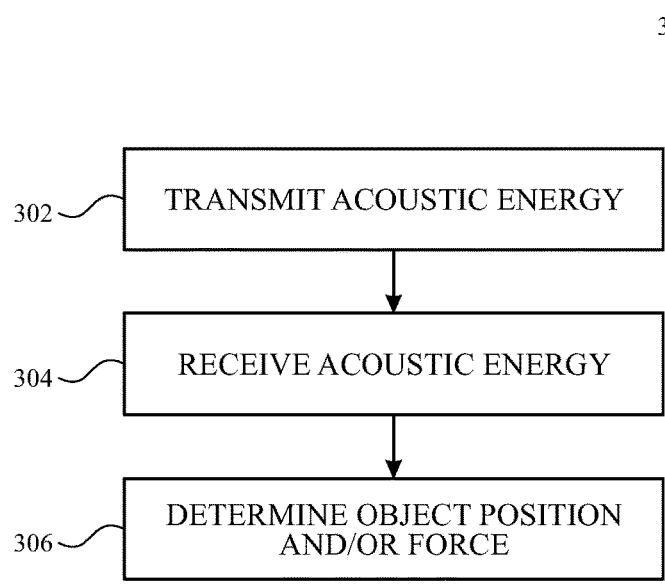
FIG. 3A illustrates an exemplary process for acoustic touch and/or force sensing of an object in contact with a touch and/or force sensitive surface according to examples of the disclosure.
Figure 3B:
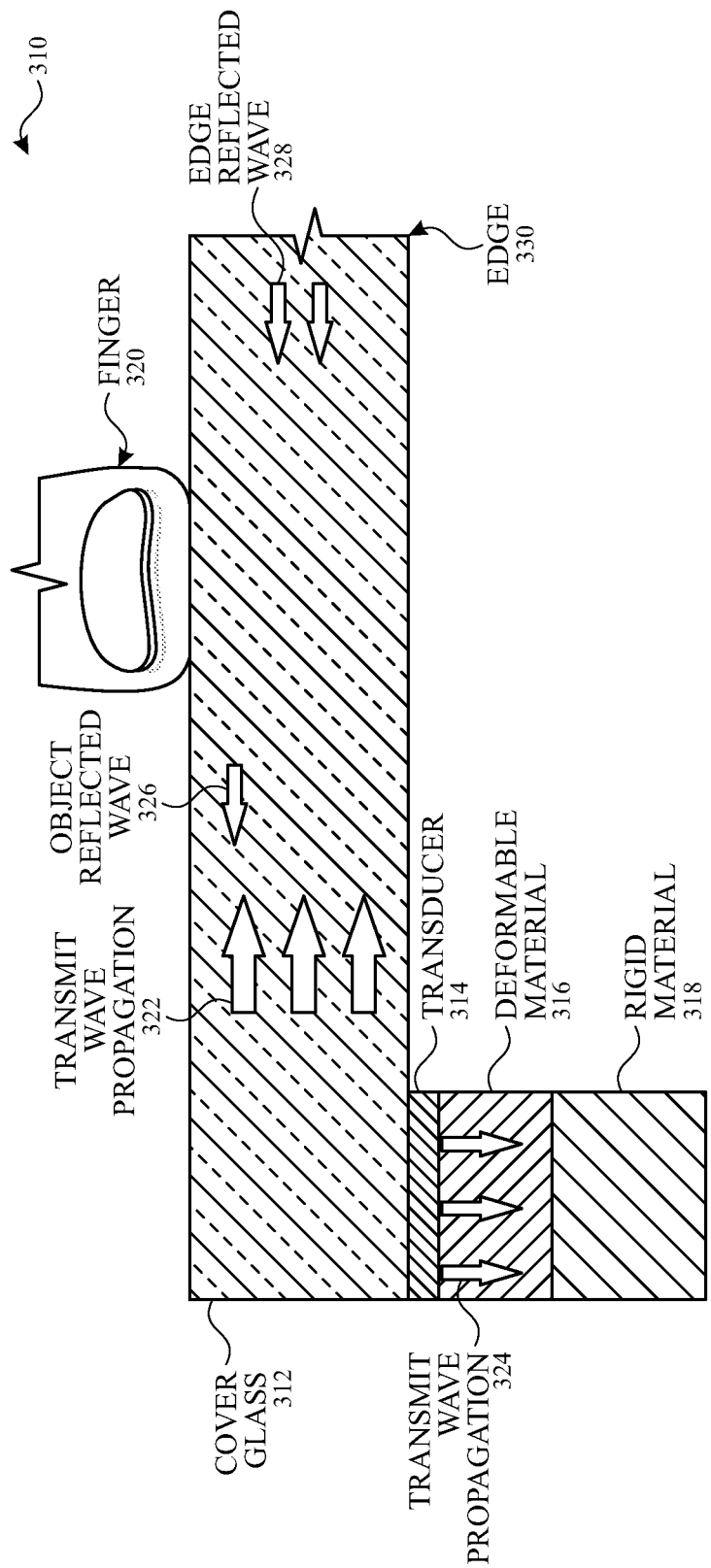
FIG. 3B illustrates an exemplary system, which can perform an exemplary process for acoustic touch and/or force sensing of an object in contact with a touch and/or force sensitive surface, according to examples of the disclosure.

FIG. 3A illustrates an exemplary process 300 for acoustic touch and/or force sensing of an object in contact with a touch and/or force sensitive surface according to examples of the disclosure. FIG. 3B illustrates an exemplary system 310, which can perform an exemplary process 300 for acoustic touch and/or force sensing of an object in contact with a touch and/or force sensitive surface, according to examples of the disclosure. At 302, acoustic energy can be transmitted (e.g., by one or more transducers 204) along a surface and/or through the thickness of a material in the form of an ultrasonic wave, for example. For example, as illustrated in FIG. 3B, transducer 314 can generate a transmit ultrasonic wave 322 in cover glass 312 (or other material capable of propagating an ultrasonic wave). In some examples, the wave can propagate as a compressive wave, a guided wave such as a shear horizontal wave, a Rayleigh wave, a Lamb wave, a Love wave, a Stoneley wave, or a surface acoustic wave. Other propagation modes for the transmitted acoustic energy can also exist based on the properties of the surface material, geometry and the manner of energy transmission from the transducers to the surface of the device. In some examples, the surface can be formed from glass, plastic, or sapphire crystal (e.g., touch screen 208, cover glass 312) or the surface can be formed from metal, ceramics, plastic, or wood (e.g., housing 202). Transmitted energy can propagate along the surface (e.g., cover glass 312) and/or through the thickness until a discontinuity in the surface is reached (e.g., an object, such as a finger 320, in contact with the surface), which can cause a portion of the energy to reflect. In some examples, a discontinuity can occur at edges (e.g., edge 330) of the surface material (e.g., when the ultrasonic wave propagates to the edge of the surface opposite the transducer). When the transmitted energy reaches one of the discontinuities described above, some of the energy can be reflected, and a portion of the reflected energy (e.g., object-reflected wave 326, edge-reflected wave 328) can be directed to one or more transducers (e.g., transducers 204, 314). In some examples, water or other fluids in contact with the surface of the device (e.g., device 200) will not act as a discontinuity to the acoustic waves, and thus the acoustic touch sensing process can be effective for detecting the presence of an object (e.g., a user's finger) even in the presence of water drops (or other low-viscosity fluids) on the surface of the device or even while the device is fully submerged.

At 304, returning acoustic energy can be received, and the acoustic energy can be converted to an electrical signal by one or more transducers (e.g., transducers 204). For example, as illustrated in FIG. 3B, object-reflected wave 326 and edge-reflected wave 328 can be received by transducer 314 and converted into an electrical signal.

At 306, the acoustic sensing system can determine whether one or more objects is contacting the surface of the device, and can further detect the position of one or more objects based on the received acoustic energy. In some examples, a distance of the object from the transmission source (e.g., transducers 204) can be determined from a time-of-flight between transmission and reception of reflected energy, and a propagation rate of the ultrasonic wave through the material. In some examples, baseline reflected energy from one or more intentionally included discontinuities (e.g., edges) can be compared to a measured value of reflected energy corresponding to the one or more discontinuities. The baseline reflected energy can be determined during a measurement when no object (e.g., finger) is in contact with the surface. Deviations of the reflected energy from the baseline can be correlated with a presence of an object touching the surface.

Although process 300, as described above, generally refers to reflected waves received by the same transducer(s) that transmitted the waves, in some examples, the transmitter and receiver functions can be separated such that the transmission of acoustic energy at 302 and receiving acoustic energy at 304 may occur at different co-located transducers (e.g., one transducer in a transmit configuration and one transducer in a receive configuration). In some examples, the acoustic energy can be transmitted along and/or through the surface (e.g., cover glass 312) by one or more transducers (e.g., transducer 314) and received on an opposite edge (e.g., edge 330) of the surface by one or more additional transducers (not shown). The attenuation of the received acoustic energy can be used to detect the presence of and/or identify the position of one or more objects (e.g., finger 320) on the surface (e.g., cover glass 312). Exemplary device configurations and measurement timing examples that can be used to implement process 300 will be described in further detail below. In some examples, the transmitted acoustic energy from transducer 314 can be received at the transmitting transducer and also received at one or more other non-transmitting transducers located in different positions (e.g., at different edges of the surface (e.g., cover glass 312). Energy can reflect from one or more objects at multiple angles, and the energy received at all of the receiving transducers can be used to determine the position of the one or more objects. In some examples, the non-transmitting transducers can be free of artifacts that can be associated with transmitting acoustic energy (e.g., ringing).

In some examples, the acoustic energy transmitted and received through a deformable material can be used to determine changes in the thickness of the deformable material and/or an applied force. For example, at 302, acoustic energy can be transmitted (e.g., by transducer 314) through the thickness of deformable material 316 in the form of a transmit ultrasonic wave 324. Transmitted energy can propagate through the deformable material 316 until it reaches a discontinuity at the rigid material 318 (e.g., at the opposite edge of the deformable material 316). When the transmitted energy reaches the discontinuity, some of the energy can be reflected, and a portion of the reflected energy can be directed back to transducer 314. At 304, returning acoustic energy can be received, and the acoustic energy can be converted to an electrical signal by transducers 314. At 306, the acoustic sensing system can determine an amount of force applied by one or more objects contacting the surface (e.g., cover glass 312) based on the received acoustic energy. In some examples, a thickness of deformable material 316 can be determined from a time-of-flight between transmission and reception of reflected energy, and a propagation rate of the ultrasonic wave through the material. Changes in the thickness of the deformable material (or the time-of-flight through the deformable material) can be used to determine an amount of applied force, as described in more detail below.

Figure 4:
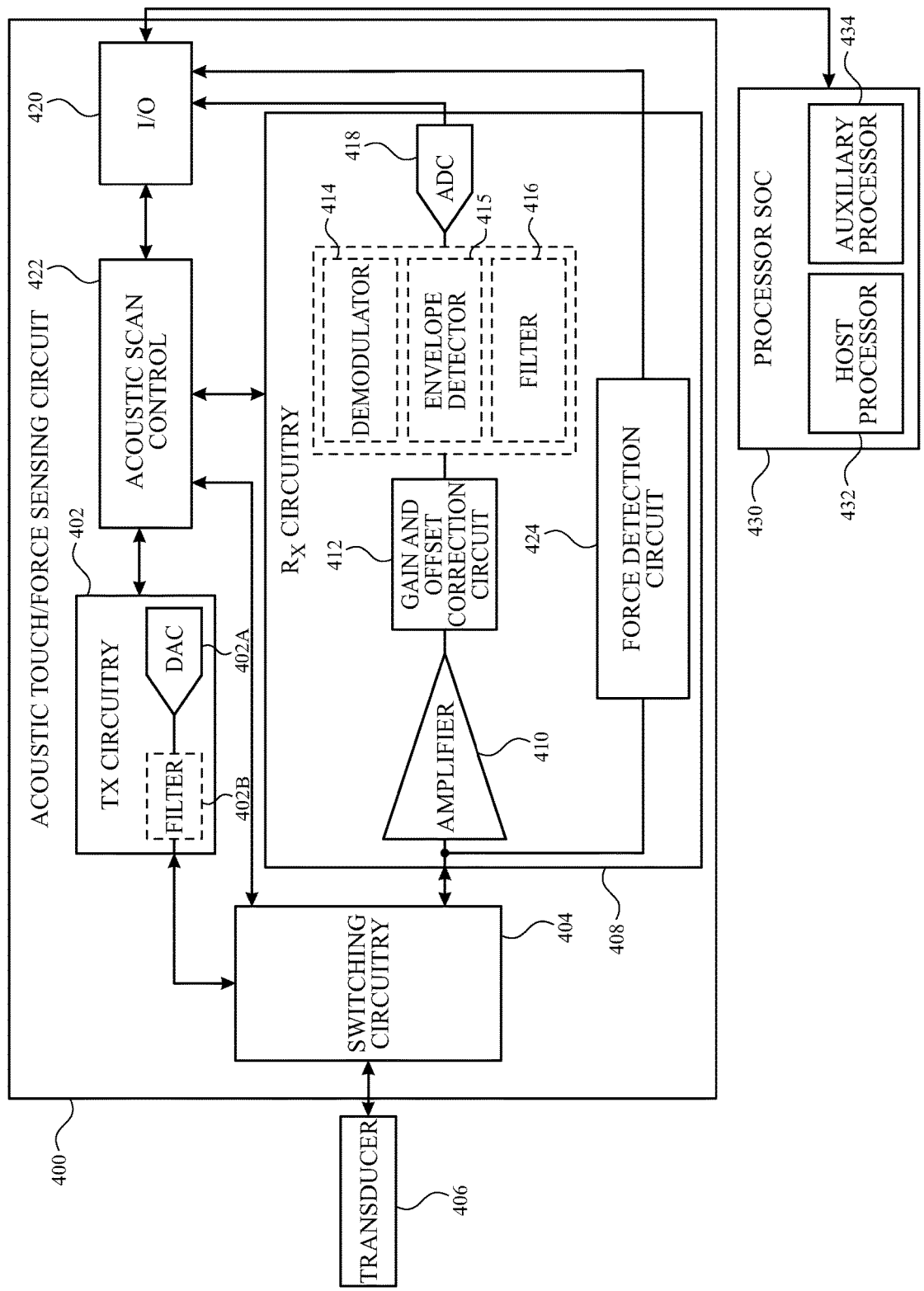
FIG. 4 illustrates an exemplary configuration of an acoustic touch and/or force sensing circuit according to examples of the disclosure.

FIG. 4 illustrates an exemplary configuration of an acoustic touch and/or force sensing circuit 400 according to examples of the disclosure. Acoustic touch and/or force sensing circuit 400 can include transmit circuitry (also referred to herein as Tx circuitry or transmitter) 402, switching circuitry 404, receive circuitry (also referred to herein as Rx circuitry or receiver) 408 and input/output (I/O) circuit 420 (which together can correspond to acoustic touch and/or force sensing circuitry 206) and acoustic scan control logic 422 (which can correspond to acoustic touch and/or force sensing controller 210). Transmitter 402, switching circuitry 404, receiver 408, I/O circuit 420 and/or acoustic scan control logic 422 can be implemented in an application specific integrated circuit (ASIC) in some examples. In some examples, acoustic touch and/or force sensing circuit 400 can also optionally include transducers 406 (which can correspond to transducers 204).

In some examples, a transmitter 402 can generate an electrical signal for stimulating movement of one or more of a plurality of transducers 406. In some examples, the transmitted signal can be a differential signal, and in some examples, the transmitted signal can be a single-ended signal. In some examples, transmitter 402 can be a simple buffer, and the transmitted signal can be a pulse (or burst of pulses at a particular frequency). In some examples, transmitter 402 can include a digital-to-analog converter (DAC) 402A and an optional filter 402B that can be optionally used to smooth a quantized output of DAC 402A. In some examples, characteristics of the transducer itself can provide a filtering property and filter 402B can be omitted. DAC 402A can be used to generate transmit waveform (e.g., any transmit waveform suitable for the touch and/or force sensing operations discussed herein). In some examples, the transmit waveform output can be pre-distorted to equalize the channel. In some examples, the characteristics of each channel, such as the properties of the surface material (and/or deformable material) coupled to transducers 406, the discontinuities in the surface material and/or deformable material, and the reflection characteristics of an edge of the device or deformable material can be measured and stored. In some examples, the channel characteristics can be measured as a manufacturing step (or factory calibration step), and in other examples the characteristics can be measured as a periodic calibration step (i.e., once a month, once a year, etc. depending on how quickly the channel characteristics are expected to change). In some examples, the channel characteristics can be converted to a transfer function of the channel, and the transmit waveform can be configured using the inverse of the channel transfer function such that the returning signal is equalized (e.g., returning signal can be detected as a pulse or a burst of pulses despite the transmitted waveform having a seemingly arbitrary waveform). In some examples, a single differential pulse can be used as a transmit waveform. For example, a bipolar square pulse (where the voltage applied to the transducer can be both positive and negative) can be used as the transmit waveform, and the bipolar square pulse can be implemented using a single-ended or differential implementation.

Switching circuitry 404 can include multiplexers (MUXs) and/or demultiplexers (DEMUXs) that can be used to selectively couple transmitter 402 and/or receiver 408 to one of transducers 406 that can be the active transducer for a particular measurement step in a measurement cycle. In a differential implementation, switching circuitry 404 can include two MUXs and two DEMUXs. In some examples, a DEMUX can have a ground connection, and the non-selected DEMUX outputs can be shorted, open, or grounded. In some examples, the same transducer 406 can be coupled to transmitter 402 by switching circuitry 404 (e.g., DEMUXs) during the drive mode and coupled to receiver 408 by switching circuitry 404 (e.g., MUXs) during the receive mode. Thus, in some examples, a single transducer 406 can be used both for transmitting and receiving acoustic energy. In some examples, a first transducer can be coupled to transmitter 402 by switching circuitry 404 (e.g. DEMUXs) and a second transducer can be coupled by switching circuitry 404 (e.g., MUXs) to receiver 408. For example, the transmitting transducer and the receiving transducer can be discrete piezoelectric elements, where the transmitting transducer can be designed for being driven by higher voltages (or currents) to produce sufficient motion in transducer 406 to generate an acoustic wave in the surface of a device (e.g., device 200 above), and the receiving transducer can be designed for receiving smaller amplitude reflected energy. In such a configuration, the transmit-side circuitry (e.g., transmitter 402 and DEMUXs of switching circuitry 404) can be optionally implemented on a high voltage circuit, and the receive-side circuitry (e.g., receiver 408 and MUXs of switching circuitry 404) can be optionally implemented on a separate low voltage circuit. In some examples, switching circuitry 404 (MUXs and DEMUXs) can also be implemented on the high voltage circuit to properly isolate the remaining receive-side circuitry (e.g., receiver 408) during transmission operations by transmit side circuitry. Additionally or alternatively, in some examples, the transmit circuit can include an energy recovery architecture that can be used to recover some of the energy required for charging and discharging the transducer. It should be understood that for a single-ended implementation, switching circuitry 404 can include a single DEMUX and MUX. In such a configuration, transmitter 402 and receiver 408 can be single-ended as well. Differential implementations, however, can provide improved noise suppression over a single-ended implementation.

Receiver 408 can include an amplifier 410 such as a low-noise amplifier (LNA) configured to sense the transducer. Receiver 408 can also include a gain and offset correction circuit 412. The gain and offset correction circuit can include a programmable gain amplifier (PGA) configured to apply gain to increase (or in some cases decrease) the amplitude of the signals received from LNA. The PGA can also be configured to filter (e.g., low pass) the signals received from the LNA to remove high frequency components. Additionally, the PGA circuit can also be configured to perform baselining (offset correction).

In some examples, the output of gain and offset correction circuit 412 can optionally be coupled to one or more analog processing circuits. In some examples, the output of gain and offset correction circuit 412 can be coupled to a demodulation circuit 414 configured to demodulate the received signals (e.g., by I/Q demodulation). In some examples, the output of the gain and offset correction circuit 412 can be coupled to an envelope detection circuit 415 configured to perform envelope detection on the received signals. In some examples, the output of gain and offset correction circuit 412 can be filtered at filter 416. In some examples, these blocks/circuits can be placed in a different order. In some examples, the processing of one or more of these analog processing circuits can be performed in the digital domain.

The received signals, whether raw or processed by one or more of demodulation circuit 414, envelope detection circuit 415 or filter 416, can be passed to an analog-to-digital converter (ADC) 418 for conversion to a digital signal. In some examples, an input/output (I/O) circuit 420 can be used to transmit received data for processing. In some examples, the output of I/O circuit 420 can be transferred to a host processor of the device, or to an auxiliary processor (sub-processor) separate from the host processor. For example, as illustrated, the output of I/O circuit 420 can be coupled to a processor system-on-chip (SoC) 430, which can include one or more processors. In some examples, processor SoC 430 can include a host processor 432 (e.g., an active mode processor) and an auxiliary processor 434 (e.g., a low power processor). In some examples, some digital signal processing can be performed (e.g., by acoustic touch and/or force sensing circuit 400) before transmitting the data to other processors in the system (e.g., processor SoC 430). In some examples, the I/O circuit 420 is not only used for data transfer to processor SoC 430 (e.g., host processor 432), but also is used for writing the control registers and/or firmware download from processor SoC 430.

The components of receiver circuitry 408 described above can be implemented to detect touch (e.g., presence and location of a touch on a surface). In some examples, receiver 408 can also include a force detection circuit 424 to detect applied force (e.g., of the touch on the surface). In some examples, the force detection circuit 424 can include the same or similar components as described above (e.g., amplifier, gain and offset correction, etc.). In some examples, the function of force detection circuit 424 can be performed using the same components described above that are used to determine time-of-flight for touch detection. In some examples, a low-power time gating circuit can be used to determine time-of-flight for force detection. Data from force sensing circuit 424 can be transferred to I/O circuit 420 and/or processor SoC 430 for further processing of force data in a similar manner as described above for touch data. In some examples the same circuitry for touch detection can be used to detect force.

A control circuit, acoustic scan control circuit 422, can be used to control timing and operations of the circuitry of acoustic touch and/or force sensing circuit 400. Acoustic scan control circuit 422 can be implemented in hardware, firmware, software or a combination thereof. In some examples, acoustic scan control circuit 422 can include digital logic and timing control. Digital logic can provide the various components of acoustic touch and/or sensing circuit 400 with control signals. A timing control circuit can generate timing signals for acoustic touch and/or sensing circuit 400 and generally sequence the operations of acoustic touch and/or force sensing circuit 400. In some examples, the acoustic touch and/or force sensing circuit 400 can receive a master clock signal from an external source (e.g., clock from the host processor, crystal oscillator, ring oscillator, RC oscillator, or other high-performance oscillator). In some examples, an on-chip oscillator can be used to generate the clock. In some examples, a master clock signal can be generated by an on-chip phase locked loop (PLL), included as part of acoustic touch and/or force sensing circuit 400, using an external clock as the input. In some examples, a master clock signal can be routed to the acoustic touch sensing circuit from processor SoC 430. The appropriate master clock source can be determined based on a tradeoff between area, thickness of the stack-up, power and electromagnetic interference.

It is to be understood that the configuration of FIG. 4 is not limited to the components and configuration of FIG. 4, but can include other or additional components (e.g., memory, signal processor, etc.) in multiple configurations according to various examples. Additionally, some or all of the components illustrated in FIG. 4 can be included in a single circuit, or can be divided among multiple circuits while remaining within the scope of the examples of the disclosure.

Figure 5A:
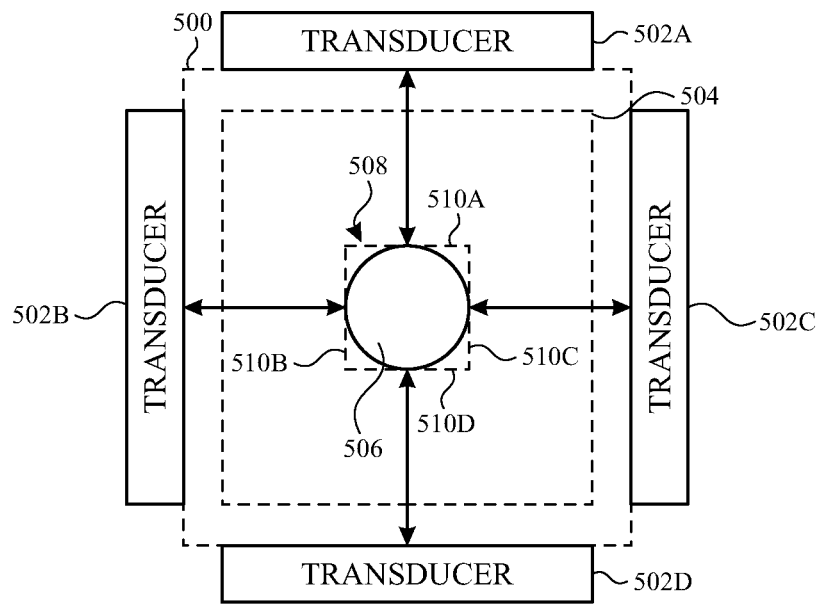
FIGS. 5A-5C illustrate exemplary system configurations and timing diagrams for acoustic touch sensing to determine position using time-of-flight measurements according to examples of the disclosure.
Figure 5B:
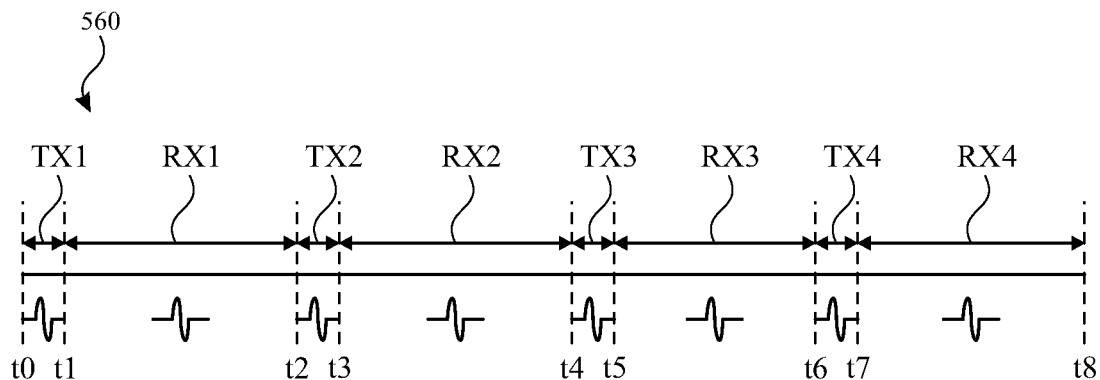
Figure 5C:
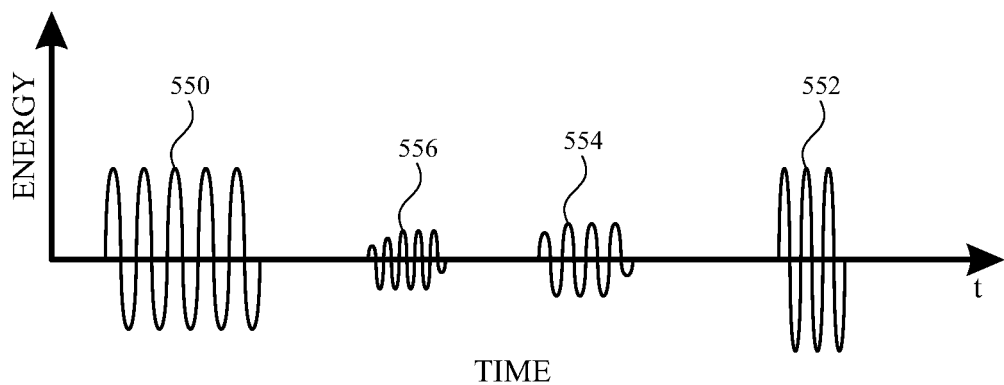

As described herein, various acoustic sensing techniques can be used to determine the position of an object touching a surface and/or its applied force on the surface. In some examples, one or more time-of-flight measurements can be performed using one or more acoustic transducers to determine boundaries of the position of the contacting object. FIGS. 5A-5C illustrate exemplary system configurations and timing diagrams for acoustic touch sensing to determine position using time-of-flight measurements according to examples of the disclosure. FIG. 5A illustrates an exemplary acoustic touch sensing system configuration using four acoustic transducers 502A-D mounted along (or otherwise coupled to) four edges of a surface 500 (e.g., corresponding to cover glass 312). Transducers 502A-D can be configured to generate acoustic waves (e.g., shear horizontal waves) and to receive the reflected acoustic waves. Propagation of shear horizontal waves can be unaffected by water on surface 500 because low viscosity fluids and gases (such as water and air) have a very low shear modulus, and therefore do not perturb the boundary conditions that affect wave propagation. Shear horizontal waves can be highly directional such that the active detection region (or active area) 504 can be effectively defined based on the position and dimensions of the acoustic transducers 502A-D. It should be understood, however, that active area can change based on the directionality property of the acoustic waves and the size and placement of acoustic transducers 502A-D. Additionally, it should be understood that although illustrated as transmit and receive transducers (i.e., transceivers), in some examples, the transmit and receive functions can be divided (e.g., between two transducers in proximity to one another, rather than one transmit and receive transducer).

The position of a touch 506 from an object in contact with surface 500 can be determined by calculating TOF measurements in a measurement cycle using each of acoustic transducers 502A-D. For example, in a first measurement step of the measurement cycle, acoustic transducer 502A can transmit an acoustic wave and receive reflections from the acoustic wave. When no object is present, the received reflection can be the reflection from the acoustic wave reaching the opposite edge of surface 500. However, when an object is touching surface 500 (e.g., corresponding to touch 506), a reflection corresponding to the object can be received before receiving the reflection from the opposite edge. Based on the received reflection corresponding to the object received at transducer 502A, the system can determine a distance to the edge (e.g., leading edge) of touch 506, marked by boundary line 510A. Similar measurements can be performed by transducers 502B, 502C and 502D to determine a distance to the remaining edges of touch 506, indicated by boundary lines 510B, 510C and 510D. Taken together, the measured distances as represented by boundary lines 510A-510D can form a bounding box 508. In some examples, based on the bounding box, the acoustic touch sensing system can determine the area of the touch (e.g., the area of the bounding box). Based on the bounding box, the acoustic touch sensing system can determine position of touch 506 (e.g., based on a centroid and/or area of the bounding box).

The acoustic touch sensing scan described with reference to FIG. 5A can correspond to the acoustic touch detection described above with reference to FIGS. 3A and 3B. Acoustic waves transmitted and received along or through cover glass 312 can be used to determine the position/location of an object touching the surface of cover glass 312.

FIG. 5B illustrates an exemplary timing diagram 560 for an acoustic touch sensing scan described in FIG. 5A according to examples of the disclosure. As illustrated in FIG. 5B, each of the transducers can transmit acoustic waves and then receive reflected waves in a series of measurement steps. For example, from t0 to t1 a first transducer (e.g., acoustic transducer 502A) can be stimulated, and reflections at the first transducer can be received from t1 to t2. From t2 to t3 a second transducer (e.g., acoustic transducer 502B) can be stimulated, and reflections at the second transducer can be received from t3 to t4. From t4 to t5 a third transducer (e.g., acoustic transducer 502C) can be stimulated, and reflections at the third transducer can be received from t5 to t6. From t6 to t7 a fourth transducer (e.g., acoustic transducer 502D) can be stimulated, and reflections at the fourth transducer can be received from t7 to t8. Although the transmit (Tx) and receive (Rx) functions are shown back-to-back in FIG. 5B for each transducer, in some examples, gaps can be included between Tx and Rx functions for a transducer (e.g., to minimize capturing portions of the transmitted wave at the receiver), and or between the Tx/Rx functions of two different transducers (such that acoustic energy and the transients caused by multiple reflections from a scan by one transducer does not impact a scan by a second transducer). In some examples, unused transducers can be grounded (e.g., by multiplexers/demultiplexers in switching circuitry 404).

The distance between an object touching the surface and a transducer can be calculated based on TOF principles. The acoustic energy received by transducers can be used to determine a timing parameter indicative of a leading edge of a touch. The propagation rate of the acoustic wave through the material forming the surface can be a known relationship between distance and time. Taken together, the known relationship between distance and time and the timing parameter can be used to determine distance. FIG. 5C illustrates an exemplary timing diagram according to examples of the disclosure. FIG. 5C illustrates the transducer energy output versus time. Signal 550 can correspond to the acoustic energy at the transducer from the generation of the acoustic wave at a first edge of the surface. Signal 552 can correspond to the acoustic energy at the transducer received from the wave reflected off of a second edge opposite the first edge of the surface. Due to the known distance across the surface from the first edge to the opposite second edge and the known or measured propagation rate of the acoustic signal, the reflection off of the opposite edge of the surface occurs at a known time. Additionally, one or more objects (e.g., fingers) touching the surface can cause reflections of energy in the time between the generation of the wave and the edge reflection (i.e., between signals 550 and 552). For example, signals 554 and 556 can correspond to reflections of two objects touching the surface (or a leading and trailing edge of one object). It should be understood that signals 550-556 are exemplary and the actual shape of the energy received can be different in practice.

In some examples, the timing parameter can be a moment in time that can be derived from the reflected energy. For example, the time can refer to that time at which a threshold amplitude of a packet of the reflected energy is detected. In some examples, rather than a threshold amplitude, a threshold energy of the packet of reflected energy can be detected, and the time can refer to that time at which a threshold energy of the packet is detected. The threshold amplitude or threshold energy can indicate the leading edge of the object in contact with the surface. In some examples, the timing parameter can be a time range rather than a point in time. To improve the resolution of a TOF-based sensing scheme, the frequency of the ultrasonic wave and sampling rate of the receivers can be increased (e.g., so that receipt of the reflected wave can be localized to a narrower peak that can be more accurately correlated with a moment in time).

In some examples (e.g., as illustrated in FIG. 5B), transducers 502A-D can operate in a time multiplexed manner, such that each transducer transmits and receives an acoustic wave at a different time during a measurement cycle so that the waves from one transducer do not interfere with waves from another transducer. In other examples, the transducers can operate in parallel or partially in parallel in time. The signals from the respective transducers can then be distinguished based on different characteristics of the signals (e.g., different frequencies, phases and/or amplitudes).

Although four transducers are illustrated in FIG. 5A, in some examples, fewer transducers can be used. For example, when using an input object with known dimensions (e.g., stylus or a size-characterized finger or target), as few as two transducers mounted along two perpendicular edges can be used. Based on the known dimensions of an object, a bounding box 518 can be formed by adding the known dimensions of the object to the first and second distances, for example. Additionally, although FIG. 5A illustrates detection of a single object (e.g., single touch), in some examples, the acoustic touch sensing system can use more transducers and be configured to detect multiple touches (e.g., by replacing each of transducers 502A-D with multiple smaller transducers).

TOF schemes described with reference to FIGS. 5A-5C can provide for touch sensing capability using a limited number of transducers (e.g., as compared with a number of electrodes/touch nodes of a capacitive touch sensing system) which can simplify the transmitting and receiving electronics, and can reduce time and memory requirements for processing. Although FIGS. 5A-5C discuss using a bounding box based on TOF measurements to determine position of an object, in other examples, different methods can be used, including applying matched filtering to a known transmitted ultrasonic pulse shape, and using a center of mass calculation on the filtered output (e.g., instead of a centroid).

Figure 6A:
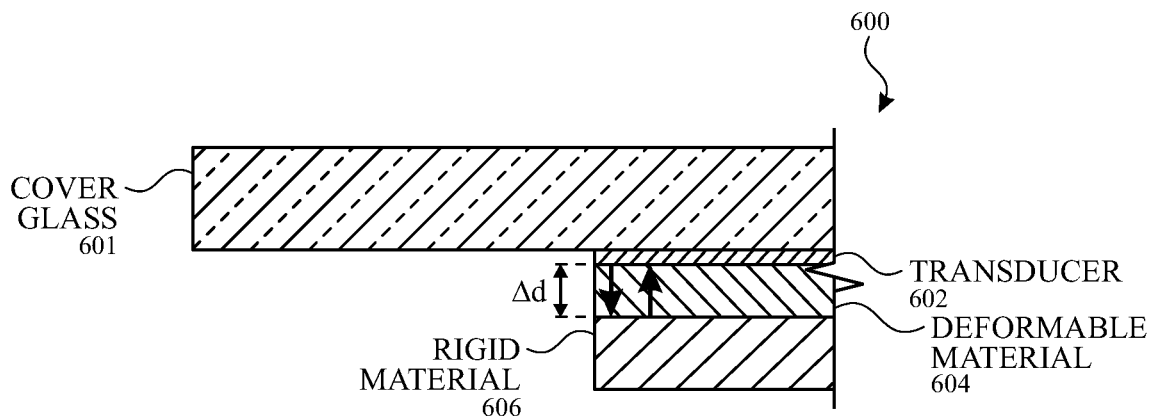
FIGS. 6A-6D illustrate exemplary system configurations and timing diagrams for acoustic force sensing to determine an amount of applied force using a time-of-flight measurement according to examples of the disclosure.

In some examples, a time-of-flight measurement can be performed using one or more acoustic transducers to determine an amount of force applied by an object touching a surface. FIGS. 6A-6D illustrate exemplary system configurations and timing diagrams for acoustic force sensing to determine an amount of applied force using a time-of-flight measurement according to examples of the disclosure. FIG. 6A illustrates an exemplary acoustic force sensing system stack-up 600 including a deformable material 604 in between two rigid surfaces. One of the rigid surfaces can be a cover glass 601 (e.g., corresponding to cover glass 312). The second of the rigid surfaces can be a portion of a device housing, for example (e.g., corresponding to housing 202). An acoustic transducer 602 (e.g., corresponding to transducer 314) can mounted to (or otherwise coupled to) the deformable material 604. For example, as illustrated in FIG. 6A, transducer 602 can be disposed between cover glass 601 and deformable material 604. Transducer 602 can be configured to generate acoustic waves (e.g., shear horizontal waves) and to receive the reflected acoustic waves from the discontinuity at the edge between deformable material 604 and rigid material 606. It should be understood that although illustrated as transmit and receive transducers (i.e., transceivers), in some examples, the transmit and receive functions can be divided (e.g., between two transducers in proximity to one another, rather than one transmit and receive transducer). Shear horizontal waves can be highly directional waves such that the time of flight can be effectively measure the thickness of the deformable material. A baseline thickness (or time-of-flight) can be determined for a no-force condition, such that changes in thickness (Δd) (or time-of-flight) can be measured. Changes in thickness or time-of-flight can correspond to amount of applied force.

Figure 6B:
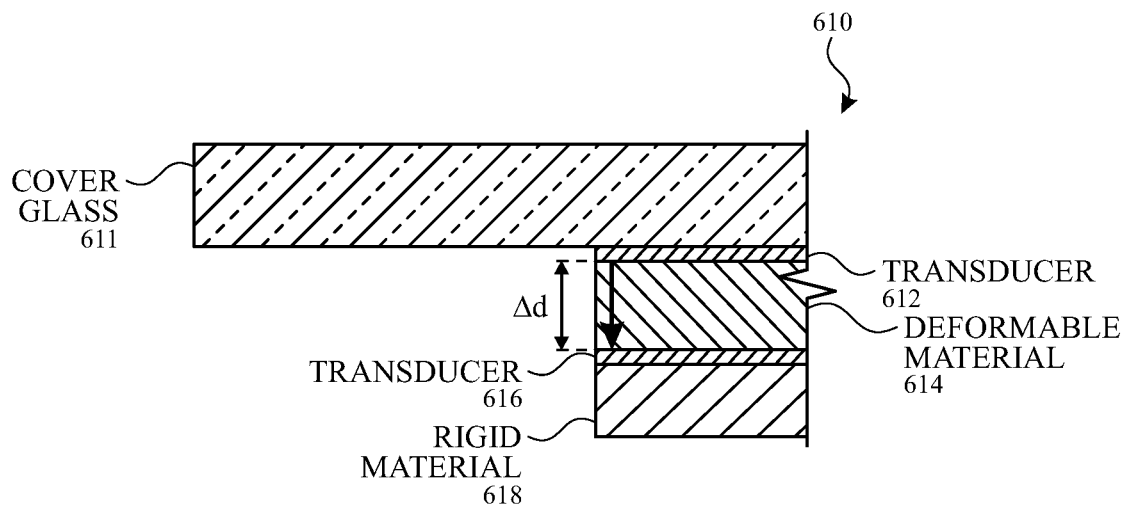
Figure 6C:
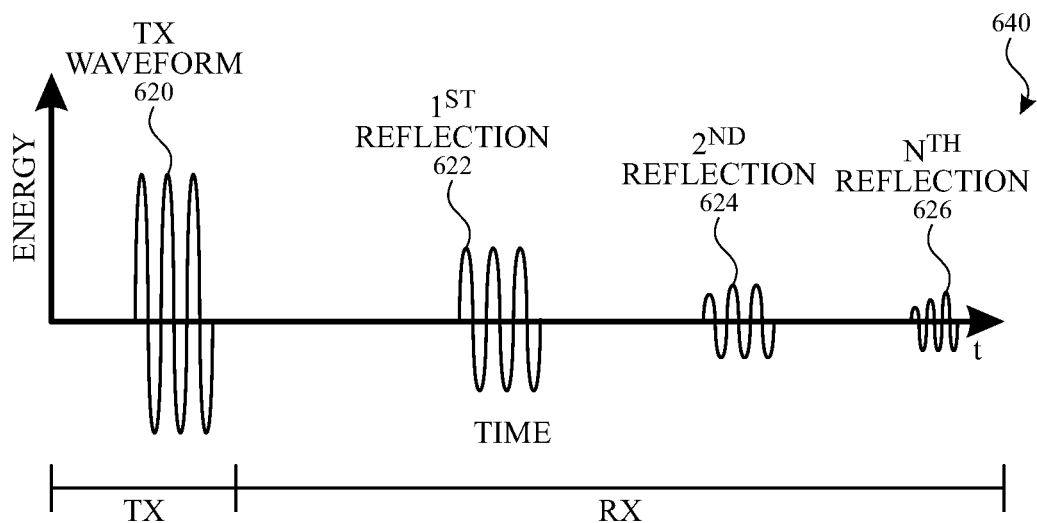
Figure 6D:
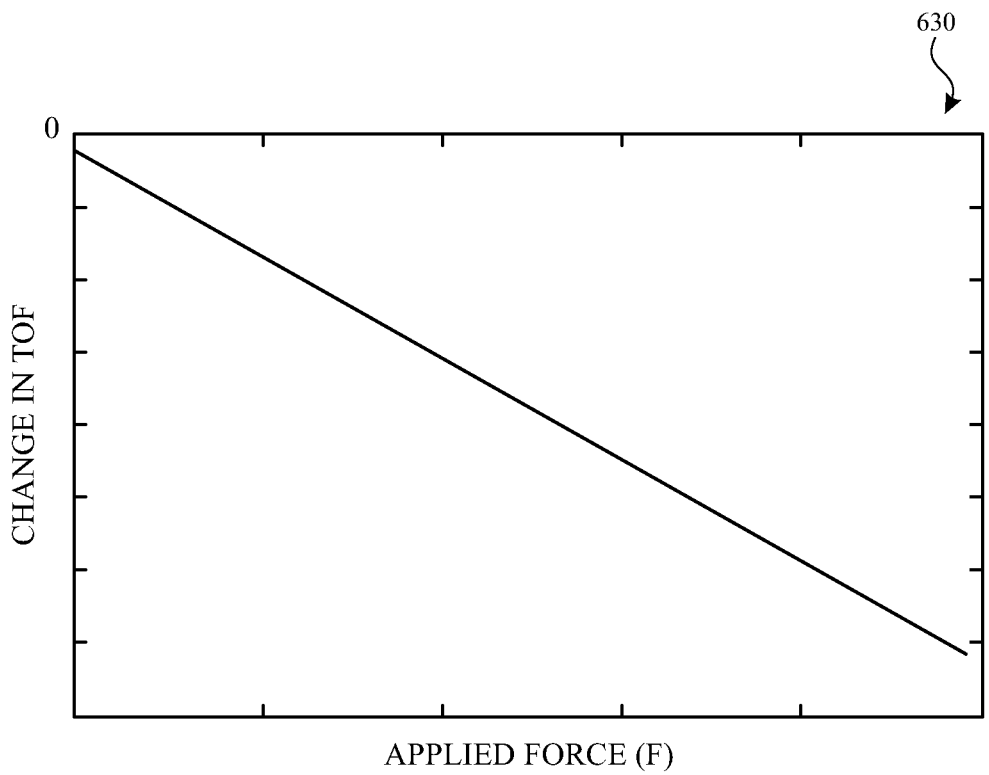

For example, plot 630 of FIG. 6D illustrates an exemplary relationship between time-of-flight (or thickness) and applied force according to examples of the disclosure. For example, in a steady state condition, where there is no change in time-of-flight across the deformable material 604, the applied force can be zero. As the time-of flight varies (e.g., decreases), the applied force can vary as well (e.g., increase). Plot 630 illustrates a linear relationship between TOF and force, but in some examples, the relationship can be non-linear. The relationship between TOF and applied force can be empirically determined (e.g., at calibration) using a correlation. In some examples, the calibration can include linearizing the inferred applied force and normalizing the measurements (e.g., removing gain and offset errors). In some examples, the Young's modulus of the deformable material can be selected below a threshold to allow a small applied force to introduce a detectable normal deformation.

FIG. 6B illustrates another exemplary acoustic force sensing system stack-up 610 including a deformable material 614 in between two rigid surfaces (e.g., between cover glass 611 and rigid material 618). An acoustic transducer 612 can mounted to (or otherwise coupled to) one side of deformable material 614, and a second acoustic transducer 616 can be mounted to (or otherwise coupled to) a second side (opposite the first side) of deformable material 614. For example, as illustrated in FIG. 6B, transducer 612 can be disposed between cover glass 611 and deformable material 614 and transducer 616 can be disposed between rigid material 618 and deformable material 614. Transducer 612 can be configured to generate acoustic waves (e.g., shear horizontal waves) and transducer 616 can be configured to receive the acoustic waves. The configuration of transducers in stack-up 610 can be referred to as a "pitch-catch" configuration in which one transducer on one side of a material transmits acoustic waves to a second transducer on an opposite side, rather than relying on a reflected acoustic wave. The time-of-flight between the time of transmission and the time of receipt of the acoustic wave can be measured to determine the amount of applied force in a similar manner as discussed above with respect to FIG. 6D.

FIG. 6C illustrates an exemplary timing diagram 640 according to examples of the disclosure. FIG. 6C illustrates the transducer energy output versus time. Signal 620 can correspond to the acoustic energy at transducer 602 from the generation of the acoustic wave at a first edge of the deformable material 604. Signal 622 can correspond to the acoustic energy at transducer 602 received from a first wave reflected off of a second edge, opposite the first edge, of the deformable material 604. Due to the known distance across the surface from the first edge to the opposite, second edge (under steady-state) and the known or measured propagation rate of the acoustic signal, the reflection off of the opposite edge of the surface occurs at a known time. In some examples, rather than using the first reflection, a different reflection of the acoustic energy can be used to determine time of flight. For example, signal 624 can refer to the acoustic energy at transducer 602 received from a second wave reflected off of the second edge of deformable material 604 (e.g., signal 622 can reflect off of the first side of 604 deformable material and reflect a second time off of the second edge of deformable material 604). In some examples, signal 626 can correspond to an integer number reflection after repeated reflections between the two edges of deformable material 604. It should be understood that signals 620-626 are exemplary and the actual shape of the energy received can be different in practice. In some examples, the choice of which reflection to use for the time-of-flight calculation for force sensing can be a function of the thickness of the material and the frequency of the transmitted wave.

In some examples, rather than using time-of-flight measurements to determine thickness of the deformable material, other methods can be used. For example, transducer 602 can stimulate the deformable material 604 with ultrasonic waves at a resonant frequency. As the deformable material 604 changes in thickness due to applied force, the resonant frequency can shift. The change in resonant frequency can be measured to determine the applied force. Using a resonant frequency can result in better signal-to-noise ratio (SNR) performance and better accuracy as compared with the time-of-flight method.

As described above with reference to FIGS. 3A-3B, in some examples acoustic touch and force sensing can both be performed. In some examples, the two operations can be time-multiplexed. Transducers 502A-D (e.g., one of which can correspond to transducer 314) can generate transmit waveforms and receive reflections to determine a location/position of touch on a surface (e.g., cover glass 312) as described with reference to timing diagram 560 during an acoustic touch sensing phase. Transducer 602 (e.g., corresponding to transducer 314) can generate a transmit waveform and receive a reflection to determine an amount of force applied to the surface (e.g., cover glass 312) as described with reference to timing diagram 640 during an acoustic force sensing phase.

Figure 7:
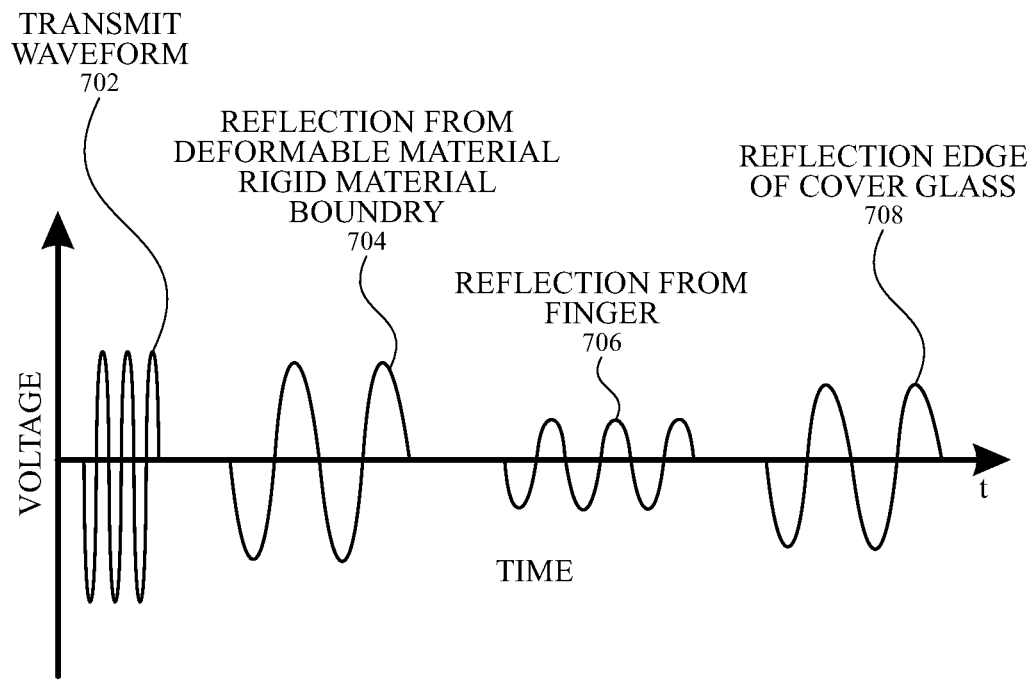
FIG. 7 illustrates a timing diagram for acoustic touch and force sensing according to examples of the disclosure.

In some examples, the acoustic touch and force sensing can be performed using transmit waveforms generated at the same time. FIG. 7 illustrates a timing diagram 700 for acoustic touch and force sensing according to examples of the disclosure. Signal 702 can correspond to a transmit waveform generated by a transducer (e.g., transducer 314) to simultaneously propagate in deformable material 316 and in cover glass 312. Signal 704 can correspond to a reflection (e.g., a first reflection) from the boundary between deformable material 316 and rigid material 318. Signal 706 can correspond to a reflection from an object (e.g., a finger) on the surface of cover glass 312. Signal 708 can correspond to a reflection from the opposite edge of cover glass 312. Based on the timing of signal 704, the acoustic touch and force sensing circuitry can measure a time-of-flight across the deformable material. Based on the timing of signals 706 and/or 708, the acoustic touch and force sensing circuitry can measure the time-of-flight along the surface of cover glass 312 to an object (or an edge when no object is contacting the cover glass). The time-of-flight measurements for touch can be repeated for each transducer 502A-D (e.g., four times) to determine the location/position of the object. The time-of-flight measurements can optionally be repeated (e.g., for each of transducers 502A-D) to measure force applied to the cover glass 312. In some examples, an average force measurement can be determined from repeated force measurements. In some examples, the repeated measurements can indicate relative force applied to different edges of the cover glass. In some examples, the measurements and different edges of the cover glass can be combined to determine an applied force.

Performing acoustic touch and force sensing using one or more shared transducers can provide for both touch and force information with one set of ultrasonic transducers (e.g., 502A-D) and one sensing circuit (e.g., acoustic touch and/or force sensing circuit 400). As a result, the touch and force sensing systems can potentially be reduced in size, in complexity and in power consumption.

Performance of ultrasonic touch and force sensing using ultrasonic waves transmitted into deformable material 316 and cover glass 312 at the same time can depend, in some examples, on the separation between the transmitted ultrasonic waves for touch and for force. For example, FIG. 7 illustrates signals 704 and 706 corresponding to force and touch reflections, respectively, that can be well separated in time (e.g., such that the force reflections arrive in a dead zone for touch reflections). In practice, an integration of acoustic touch and force sensing can subject each measurement (touch/force) to noise/interference from the other measurement (force/touch).

In some examples, interference between ultrasonic waves in the deformable material and the cover glass can be reduced or eliminated based on the design of the deformable material. For example, the deformable material can be selected to have an ultrasonic attenuation property above a threshold, such that the signal in the deformable material can be damped before reflections in the cover glass are received. In some examples, the thickness of the deformable material can be selected to allow for one or more reflections through the deformable material to be received before reflections from the cover glass. In some examples, the reflection (e.g., first, second, nth) through the deformable material can be selected such that the reflection of interest occurs between reflections from the cover glass can be received. In some examples, an absorbent material can be coupled to the deformable material to further dampen ringing of ultrasonic signals in the deformable material.

Figure 8A:
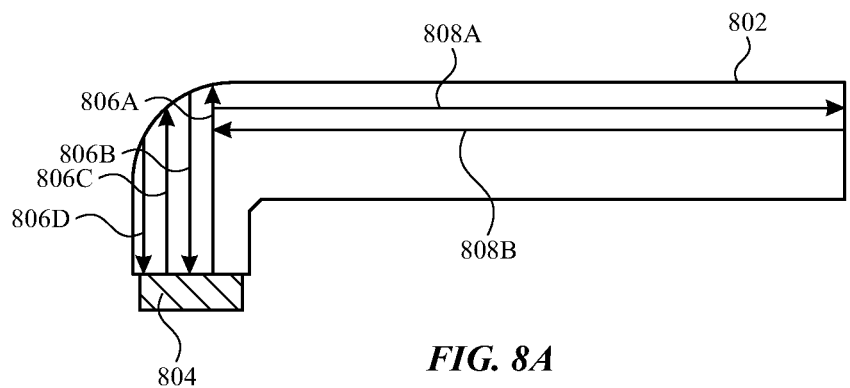
FIGS. 8A-8C illustrate an exemplary cover glass ringing effect and exemplary mitigations for the ringing effect according to examples of the disclosure.

FIG. 8A illustrates an exemplary cover glass and a ringing effect that can occur in the cover glass. The cover glass 802 can correspond to cover glass 601 and 611 in FIGS. 6A and 6B. Transducer 804 can be configured to generate acoustic waves (e.g., shear horizontal waves) and to determine position of a touch from an object in contact with cover glass 802 as described in connection with FIGS. 5A-5C above. The generated acoustic wave can travel initially in the z-axis direction, reflect from the curved bezel of the cover glass 802, and reflect in the direction of transmitted acoustic wave 808A along the x-axis direction. The transmitted acoustic wave 808A can correspond to the transmit wave propagation 322 described in connection with FIG. 3B above. An edge reflected wave 808B can correspond to the edge reflected wave 328 described in connection with FIG. 3B above. Another portion of the acoustic wave generated by transducer 804 can undergo a series of reflections within the edge area of the cover glass 802 as illustrated by reflecting energy 806A-806D. These reflections can exhibit similar timing characteristics to the multiple reflections described in FIG. 6C, while the timing between reflections can depend on at least the material properties of the cover glass 802, the geometry of the edge area of the cover glass, and the frequency and mode of the transmitted wave. These multiple reflections 806A-806D can be referred to as a ringing signal in the bezel. As illustrated in FIG. 6C, each subsequent reflection can be attenuated such that the ringing can eventually die down. In some examples, the initial reflected energy in the ringing signals in the bezel can have significantly more energy (e.g., several orders of magnitude more energy) than signals due to reflections from an object (e.g., a finger) contacting the cover glass 802. In some examples, the energy in the ringing can continue to be high long enough to interfere with reflected energy signals received from objects touching the cover glass. The ringing signals in the bezel can also interfere with the operation of the force sensor functionality described in FIGS. 6A-6C if the ringing signals occur during the Rx time window of the force sensing operation.

Figure 8B:
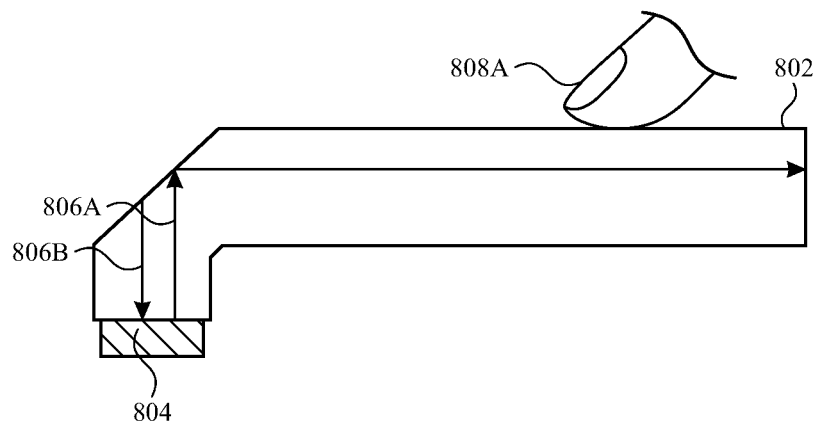
Figure 8C:
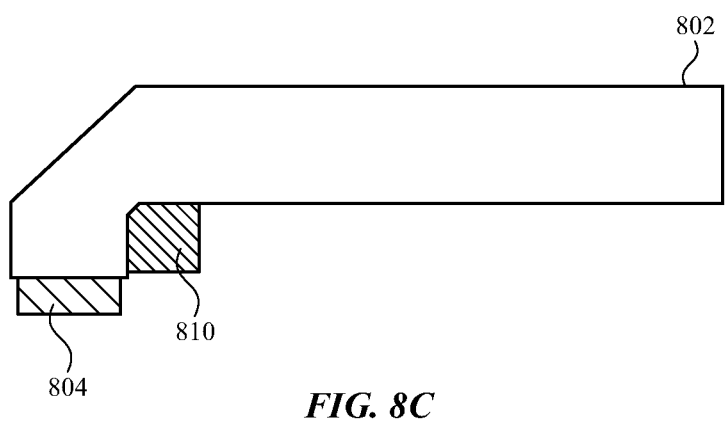

FIGS. 8B and 8C illustrate exemplary mitigation techniques for reducing effects of the ringing illustrated in FIG. 8A. As illustrated in FIG. 8B, the shape of the edge of the cover glass 802 can be designed to reduce the relative amount of reflected energy 806B that returns toward the transducer 804, and increasing the relative amount of transmitted energy 808A. For example, a 45-degree angle at the edge of cover glass 802 can behave essentially as a flat mirror that produces a consistent angle of reflection of 90 degrees. It should be understood that flattening even a portion of the edge of cover glass 802 can result in reduced ringing amplitude and that it is not necessary to make the edge of the cover glass completely flat. Many other cover glass edge shapes are possible and the shape illustrated in FIGS. 8B and 8C are for illustration purposes only. FIG. 8C illustrates the addition of a dampening material 810 can also be added somewhere on the cover glass near where the ringing energy occurs to absorb the ringing energy and cause the ringing to attenuate more quickly. As shown in FIG. 8C, the dampening material can be combined with the cover glass edge shape of FIG. 8B to significantly improve the ringing performance of the device.

Figure 9A:
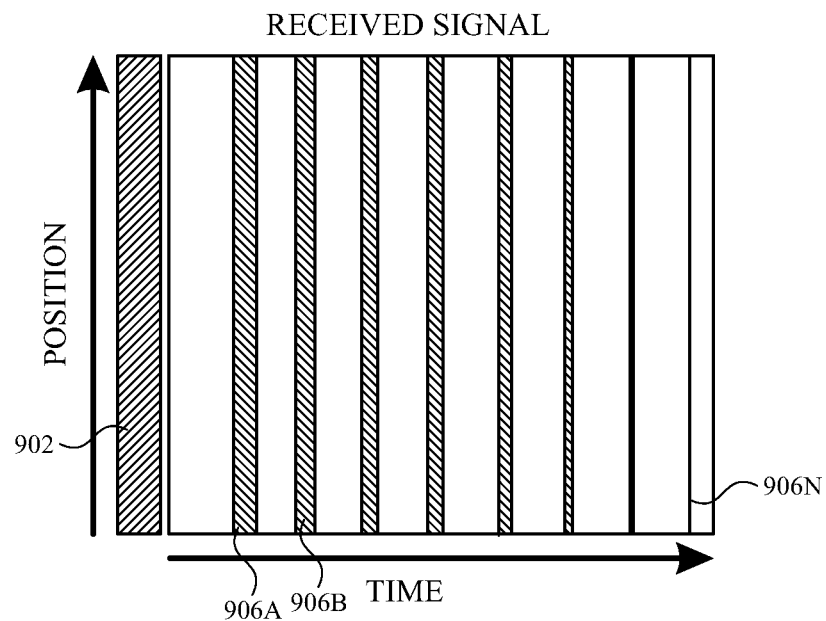
FIG. 9A illustrates a representation of spatial and temporal distribution of energy received by a transducer due to the ringing effect described in FIG. 8A.

FIG. 9A illustrates a representation of spatial and temporal distribution of energy received by a transducer 902 due to the ringing effect described in FIG. 8A. In the illustrated example, the y-axis represents a position of received acoustic energy that can be received by a transducer 902 positioned at one edge of the electronic device (e.g., transducer 314 above). In FIG. 9A, the width of each of the bars 906A-906N can represent an amount of signal (e.g., amount of energy) received by transducer 902 at a particular position in the y-axis direction. An acoustic wave can be generated by the transducer 902 at time=0. The illustrated bars 906A-906N can represent a signal received by the transducer 902, and can correspond to the gradually dampening bezel ringing signal as described in FIG. 8A and/or the multiple reflections in the force sensor described in FIG. 6C above. For example, when compared to FIG. 6C, the widest bar 906A can correspond to the first reflection 622 having the largest amplitude. The appearance of each reflection 906A-906N as a continuous bar in the y-axis direction illustrates that the ringing signal is approximately spatially uniform across the entire length of the transducer 902. Over time, the energy of the ringing signal can diminish, as illustrated by bar 906N. The amount of time for the ringing to diminish and the total energy in each of the ringing signals can be mitigated by the techniques described in FIG. 8B-8C above.

Figure 9B:
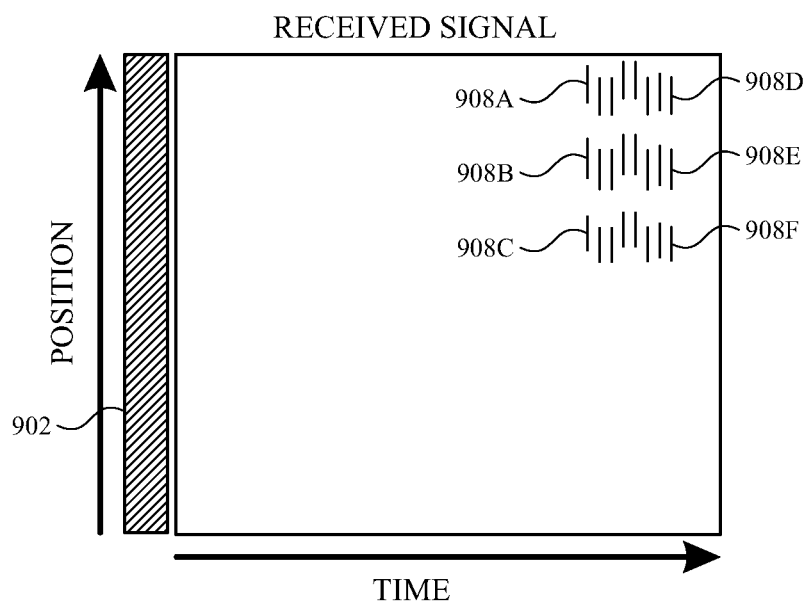
FIG. 9B illustrates a representation of spatial and temporal distribution of energy received by a transducer during a touch sensing operation.

FIG. 9B illustrates a representation of spatial and temporal distribution of energy received by a transducer 902 during a touch sensing operation. In FIG. 9B, the received signal pattern represented by 908A-908F can correspond to signals reflected by an object in contact with a cover glass as described above in connection with FIG. 3B. In some examples, the spacing of the received energy 908A-908F can be affected by ridges in a user's fingers, orientation of the finger, and the like. The first received energy returning from the object can be represented by 908A-908C, which can all occur at the same time on the time axis. Unlike the ringing energy illustrated in FIG. 9A, the received signal caused by an object can be non-uniform along the position axis, as shown by the three discrete received signal segments 908A-908C. In some examples, the position of the received signal segments 908A-908C can be used to determine the position of the object in the y-axis direction, and the time of flight can be used to determine the position of the object in the x-axis direction. Spaces of no received energy occurring between received signal segments 908A-908C can be caused by characteristics of the object, e.g., fingerprints of a user. Although a relatively simple pattern is illustrated for the received signal segments 908A-908F, it should be understood that an actual received energy pattern due to an object can be significantly more complex. The pattern shown is merely for illustrative purposes, and is illustrated to show that there can be a spatial modulation in the received signal from an object. The spatial modulation can vary based on, for example, individual fingerprint patterns, orientation of a finger relative to the acoustic wave propagation direction, amount of force being applied to the cover glass, and the like. The position of each received signal segment 906A-906F on the time axis can correspond to the round trip TOF for transmitted acoustic energy from the transducer 902 to return to the transducer after being reflected. Furthermore, the amount of time between the first received signal 906A-906C and the final received signal 908D-908F can be indicative of the size of the object contacting the cover glass. It is important to note that the ringing signal illustrated in FIG. 9A can be occurring simultaneously to the signal returning from the object 906A-906F. The amount of received signal 908A-908F from the object can appear relatively small compared to the amount of received signal caused by the ringing 906A-906N. As will be discussed further below, the spatial modulation of the received signal from an object 908A-908F can be used to differentiate between received signal from an object and received signal caused by the ringing.

Figure 9C:
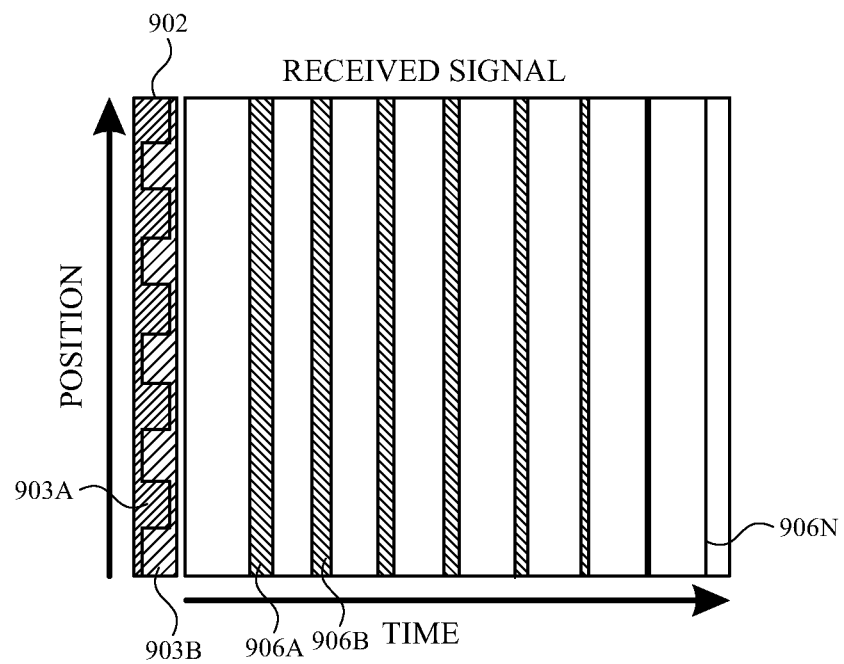
FIG. 9C illustrates a spatial differential electrode configuration for transducer electrodes alongside the spatial and temporal distribution of energy due to the ringing effect according to examples of the disclosure.

FIG. 9C illustrates a spatial differential electrode configuration for transducer electrodes alongside the spatial and temporal distribution of energy received by a transducer 902 due to the ringing effect described in FIGS. 8A and 9A. Although not shown in the figures above, a pair of electrodes can be disposed on opposing sides of the transducer that can be used to both drive the transducer 902 and to receive electrical signals generated by the transducer. In the simplest configuration, one of the two electrodes can act as a common electrode, and the second of the two electrodes act as both the drive and sense electrode for the transducer. FIG. 9C illustrates two patterned electrodes 903A-903B disposed on a same side of the transducer 902. The patterned electrodes 903A-903B are shown with an alternating repeating pattern where each electrode 903A and 903B occupies half of the surface of the transducer 902. In some examples, the received signal at each of these electrodes can be subtracted to remove the effects of the ringing signals 906A-906N. Because of the spatially uniform nature of the ringing signals (e.g., a solid bar across the entire y-axis), the signal due to ringing that is received by each of the electrodes 903A and 903B can be approximately equal. Thus, in some examples, the ringing signal can be canceled after subtracting the signal values of the two electrodes 903A and 903B. Signals such as the illustrated ringing signal that have a spatially uniform characteristic can be referred to as common mode signals relative to the electrode pattern 903A and 903B. As mentioned above, the illustrated ringing signal can correspond to ringing in an edge or bezel area of a cover glass as shown in FIG. 9A, ringing from the back edge of the cover glass, ringing in a force sensor such as the ringing shown in FIG. 6C, or any other spatially uniform (e.g., common mode) signal relative to the electrode pattern.

Figure 9D:
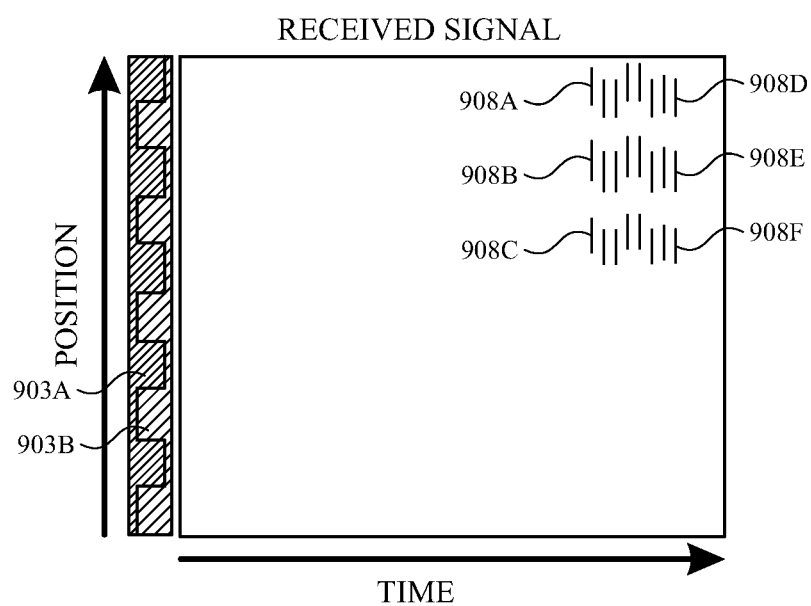
FIG. 9D illustrates the spatial differential electrode configuration for transducer electrodes alongside the representation of spatial and temporal distribution of energy of a touch sensing signal according to examples of the disclosure.

FIG. 9D illustrates the spatial differential electrode configuration for transducer electrodes alongside the representation of spatial and temporal distribution of a touch sensing signal corresponding to the touch sensing operation shown in FIG. 9B. As explained above, the received signal segments 908A-908F can return with a spatial modulation pattern that can correspond to characteristics of the object contacting the cover glass. The electrode pattern for electrodes 903A-903B can be selected to correspond to a particular spatial modulation frequency. In some examples, by leveraging known spatial modulation characteristics expected in the received signal, the electrode pattern 903A-903B can be designed to be appropriately sensitive to the received signal. In the illustrated pattern of received signal segments 908A-908F, the electrodes 903A and 903B can each receive a different amount of reflected energy because of the pattern. For example, signal segments 908A and 908B may primarily be received by electrode 903A, thus causing a difference in the signal on electrodes 903A and 903B. In some examples, by subtracting the signals received by the two electrodes 903A/903B a differential touch signal based on the energy reflected by the object can be produced. At the same time, because the electrodes 903A and 903B can receive the same signals from the ringing 906A-906N, the ringing component of received signal can be canceled. In some examples, this scheme can be more effective in reducing the impact of ringing on the detecting touch sensing output than the mitigation measures illustrated in FIGS. 8B and 8C. Alternatively, the combined effect of the spatial differential electrode configuration and the mitigation measures illustrated in FIGS. 8B and 8C can be used to maximize signal to noise ratio values of the acoustic touch sensing system.

As can be seen in the configuration of electrodes 903A and 903B in FIGS. 9C-9D, the electrodes can form a repeating pattern with a certain pitch along the y-axis direction. The pitch of the electrodes can have a corresponding spatial frequency to which differential measurement of the electrodes 903A and 903B can be responsive. In other words, the electrodes 903A and 903B can be designed to be tuned to a particular spatial frequency. For example, ridges on a human finger can produce a spatial frequency within a particular range of frequencies that can correspond to the typical spacing of ridges that form a fingerprint. A typical range of fingerprint ridge spacing can be between 200 μm and 700 μm. Accordingly, the spacing or pitch of the electrodes 903A and 903B being used for touch measurement can be tuned to an appropriate spatial frequency that lies within the range of spatial frequencies expected to be produced by a human finger. In addition, as will be discussed in more detail below, multiple electrode patterns of different pitch, electrode patterns with a configurable pitch, or a combination of both can be used to selectively tune the sensitivity of a differential measurement to a plurality of spatial frequencies.

Figure 10A:
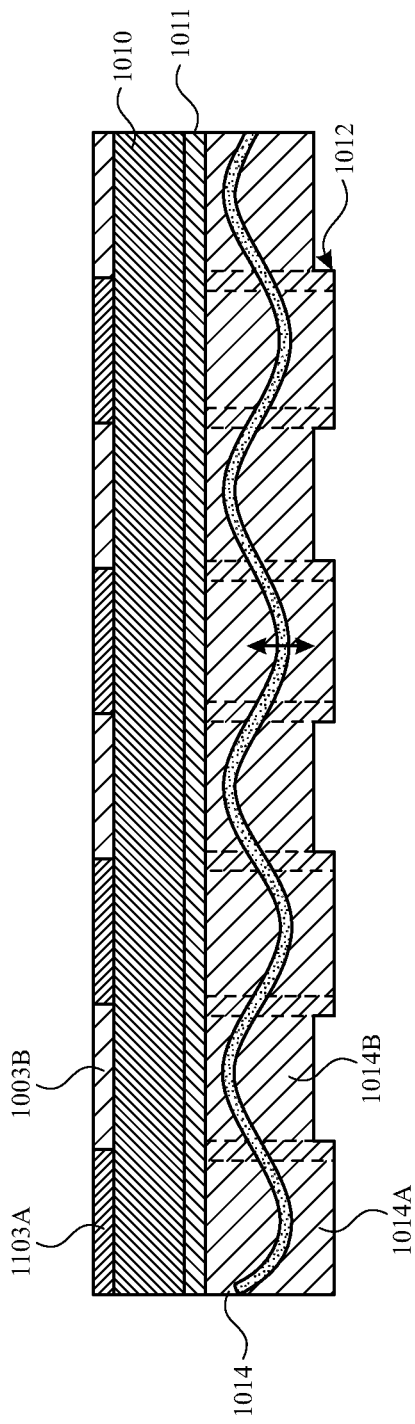
FIGS. 10A-10B illustrate exemplary spatial differential force sensing configurations according to examples of the disclosure.
Figure 10B:
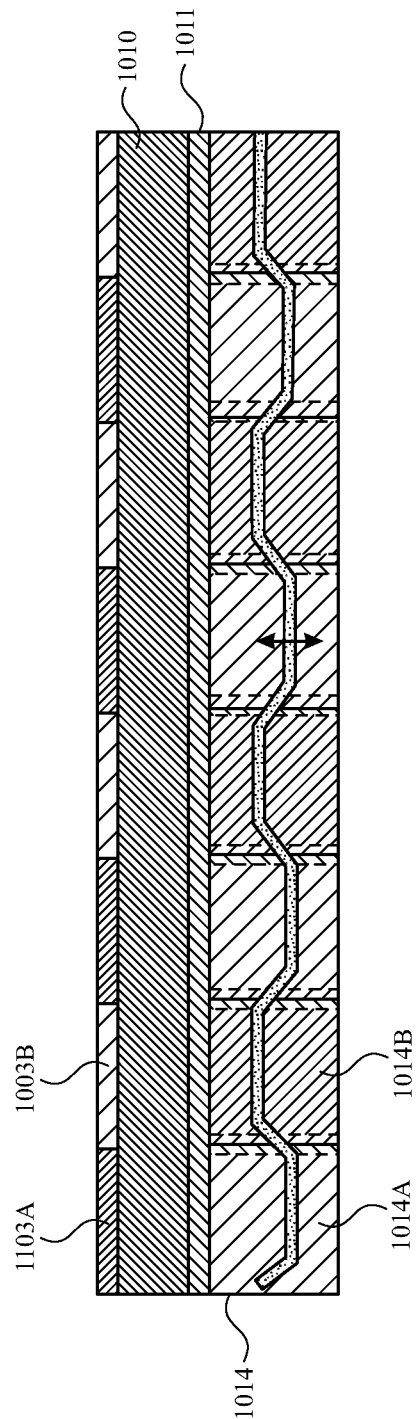

FIGS. 10A-10B illustrate exemplary spatial differential force sensing configurations according to examples of the disclosure. As discussed immediately above, the pitch of electrodes 1003A and 1003B can determine a spatial frequency sensitivity for differential measurements of the transducer 1010. As also described above, the spatial frequencies produced by fingerprint ridges can be used to perform touch measurement with an appropriately tuned electrode configuration. As a reminder, the force measurement described in FIGS. 3 and 6A-6C utilize a deformable material (e.g., 316 and 614) with a uniform physical characteristic. Unlike the signals reflected from a fingerprint, a uniform deformable material as described above may produce only a DC or common mode spatial frequency as a result of reflected energy.

FIG. 10A illustrates a first deformable material configuration for introducing a spatial frequency into the deformable material comprising first sections 1014A and second sections 1014B. In addition, FIG. 10A illustrates a corresponding electrode configuration of electrodes 1003A and 1003B (which can correspond to electrodes 903A and 903B above) that can be tuned to the spatial frequency created by the pattern in the deformable material. In some examples, the electrodes 1003A and 1003B can be coupled to one side of transducer 1010, and a second electrode 1011 can be disposed on the opposite side of the transducer. In some examples, the second electrode 1011 can be connected to ground. In some examples, as will be described in more detail below regarding FIGS. 14A-14B, the second electrode 1011 can be operated as a floating electrode. Furthermore, as will be described in more detail below, multiple electrodes 1011 can be disposed on the opposite side of the transducer 1010 and connected in different ways.

In some examples, a spatial frequency associated with the deformable material 1014 can be introduced by varying the thickness of the deformable material between the first sections 1014A and 1014B as shown in FIG. 10. In some examples, the difference in thickness of the first sections 1014A and second sections 1014B can introduce a difference time of flight based on the different distances traveled by a travelling acoustic wave. In some examples, the thicknesses can be configured to create a half-wavelength difference in round trip time of flight between the first sections 1014A and the second sections 1014B. As described above in FIGS. 9A-9D, the electrodes 1003A and 1003B can be read differentially to eliminate the effects of common mode signals such as a ringing signal in a bezel as described in FIGS. 8A-8C. In some examples, the half-wavelength difference in time of flight in the first sections 1014A and second sections 1014B can result effectively in a summation when the differential measurement is performed between the electrodes 1003A and 1003B. In some examples, the electrodes 1003A and 1003B can also be used for touch detection in addition to force detection. In some examples, the electrodes 1003A and 1003B can be grouped together to perform touch sensing measurements. In some examples, electrodes 1003A and 1003B can be added together to perform touch detection. In some examples, force detection in the deformable material 1014A and 1014B can be performed during a ring-down period of the bezel reflections described above in FIGS. 8A-8C. During the ring-down period, the differential measurements being performed can cancel out the common mode bezel reflection signals as described above. In some examples, after the ring-down period, the touch sensing operation using combined electrodes 1003A and 1003B or the summation of electrodes 1003A and 1003B. In some examples, the spatial frequency selected for the deformable material can be selected to be orthogonal to one or more spatial frequencies used for detecting touch in a touch sensing mode. In some examples, an optional isolation material 1012 can be placed between the first sections 1014A and the second sections 1014B of the deformable material to prevent interactions between the waves traveling in the separate sections.

FIG. 10B illustrates an alternative configuration for introducing a spatial frequency associated with the deformable material 1014 by varying the speed of sound between the first sections 1014A and second sections 1014B of the deformable material. In some examples, the electrodes 1003A and 1003B, transducer 1010, and second electrode 1011 can be configured in the same was as described in FIG. 10A above. In some examples, the speed of sound between the first and second sections can be achieved by placing a first material in the first sections 1014A and a second, different material with a different speed of sound in the second sections 1014A. In some examples, the differences of speed of sound of the first sections 1014A and second sections 1014B can result in different time of flight of acoustic waves travelling in the respective sections. In some examples, the speed of sounds can be selected such that the round trip time of flight difference between the first sections 1014A and the second sections 1014B is half-wavelength of the transmitted acoustic wave. In some examples, the speed of sounds can be selected such that the time of flight difference between the first sections 1014A and second sections 1014B is equal to multiple wavelengths of the transmitted acoustic wave. For example, one of the materials can be silicone, while the second material can be air. As described above in FIGS. 9A-9D, the electrodes 1003A and 1003B can be read differentially to eliminate the effects of common mode signals such as a ringing signal in a bezel as described in FIGS. 8A-8C. In some examples, the ½ wavelength difference in time of flight in the first sections 1014A and second sections 1014B can result effectively in a summation when the differential measurement is performed between the electrodes 1003A and 1003B. In some examples, the electrodes 1003A and 1003B can also be used for touch detection in addition to force detection. In some examples, the electrodes 1003A and 1003B can be grouped together to perform touch sensing measurements. In some examples, electrodes 1003A and 1003B can be added together to perform touch detection. In some examples, force detection in the deformable material 1014A and 1014B can be performed during a ring-down period of the bezel reflections described above in FIGS. 8A-8C. During the ring-down period, the differential measurements being performed can cancel out the common mode bezel reflection signals as described above. In some examples, after the ring-down period, the touch sensing operation using combined electrodes 1003A and 1003B or the summation of electrodes 1003A and 1003B. In some examples, the spatial frequency selected for the deformable material can be selected to be orthogonal to one or more spatial frequencies used for detecting touch in a touch sensing mode. In some examples, an optional isolation material 1012 can be placed between the first sections 1014A and the second sections 1014B of the deformable material to prevent interactions between the waves traveling in the separate sections.

Figure 11A:
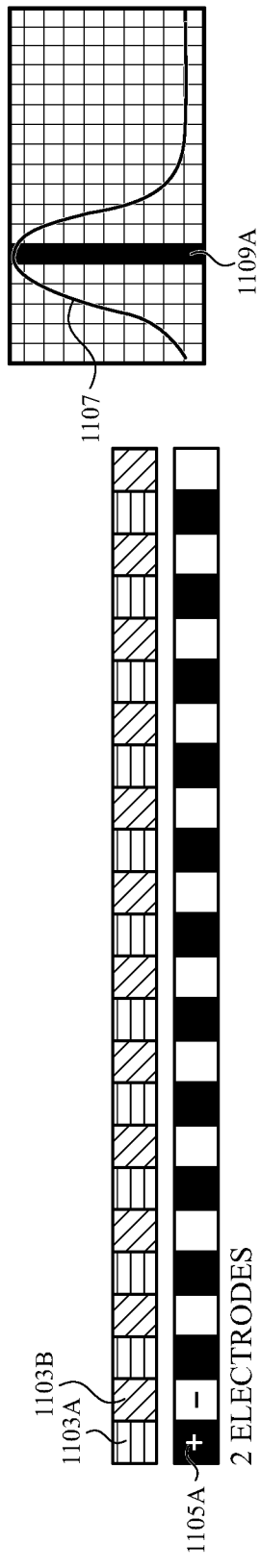
FIGS. 11A-11E illustrate electrode arrangement grouping patterns for single-sided spatial differential electrode configurations according to examples of the disclosure.

FIGS. 11A-11E illustrate electrode arrangement grouping patterns for single-sided, spatial differential electrode configurations according to examples of the disclosure. FIGS. 9C-9D and FIGS. 10A-10B both illustrate single-sided differential electrode patterns, and both touch sensing and force sensing operations associated with the single-sided differential electrode patterns have been described above. FIG. 11A illustrates an exemplary two-electrode spatial differential electrode configuration according to examples of the disclosure. The alternating two-electrode configuration can include electrodes 1103A and 1103B, which can correspond to electrodes 903A and 903B in FIGS. 9C-9D above and electrodes 1003A and 1003B in FIGS. and 10B above.

Grouping pattern 1105A illustrates an exemplary differential connection pattern that can be used to perform spatial differential sensing for touch as described above in connection to FIGS. 9C-9D or for force as described above in connection to FIGS. 10A-10B. In some examples, the electrode 1103A can be coupled to a first terminal (e.g., positive) of a differential amplifier, and the electrode 1103B can be connected to a second terminal (e.g., negative) of the differential amplifier. It should be understood that the positive/negative connections of the differential amplifier can be reversed without departing from the scope of the present disclosure. The right hand side of each FIG. 11A-11E illustrates a finger spatial frequency curve 1107 that can approximate the energy density of various spatial frequencies produced by finger reflections. The bar 1109A illustrates one possibility for the spatial frequency that can correspond to the pitch of electrodes 1103A and 1103B. In the illustrated bar 1109A, the spatial frequency that corresponds to the pitch of electrodes 1103A and 1103B can be placed at the peak of the finger spatial frequency curve to maximize the amount of signal obtained during a touch operation. However, it should be understood from the disclosure above in FIGS. 10A-10B that the spatial frequency can be adjusted (e.g., by changing the pitch) to correspond to a spatial frequency of a deformable material pattern (e.g., 1014A and 1014B above) in order to tune the spatial frequency sensitivity to force sensing. It should be understood that the physical metal layers used to form the electrodes 1103A and 1103B are fixed once the metal layers are formed into the electrode patterns. Accordingly the physical size of the metal layers that form electrodes themselves cannot be dynamically changed to change the spatial frequency sensitivity. However, as will be described below in connection with FIGS. 11B-11E, 13B and 17-20, the spatial frequency and phase sensitivity can be dynamically configurable by changing electrode groupings as will be described in more detail below.

Figure 11B:
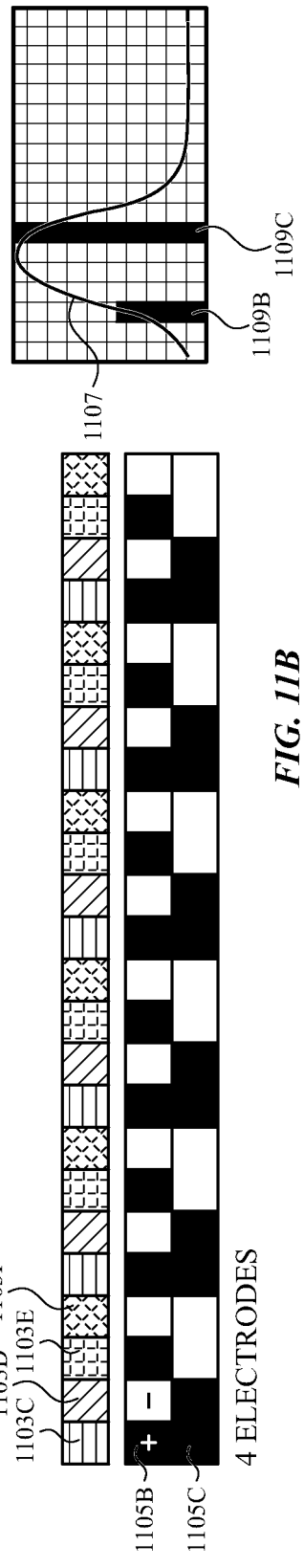

FIG. 11B illustrates an exemplary four electrode spatial differential electrode configuration according to examples of the disclosure. In some examples, the electrodes 1103C-1103E can be disposed on a single side of a transducer (e.g., 612, 902, or 1010 above) with a common electrode on the opposite side of the transducer. The electrodes 1103C-1103E can be placed in an alternating and repeating pattern as indicated by the fill patterns corresponding to each electrode. Grouping patterns 1105B and 1105C illustrated two exemplary differential connection patterns that can be used to perform spatial differential sensing tuned to multiple spatial frequencies.

Grouping pattern 1105B illustrates an alternating pattern similar to connection pattern 1105A in FIG. 11A. This connection pattern can be achieved by combining the outputs of electrodes 1103C with the outputs of electrode 1103E and connecting the combined electrode to one terminal of a differential amplifier (e.g., positive). At the same time, the outputs of electrodes 1103D and 1103F can be combined and the combined electrode can be connected to the opposite terminal of the differential amplifier (e.g., negative). Grouping pattern 1105C illustrates a second exemplary pattern can be configured to produce a different effective electrode pitch (and corresponding spatial frequency sensitive) using the same electrodes as pattern 1105B. In the grouping configuration 1105C, the electrodes 1103C and 1103D can be combined and connected to a first terminal of a differential amplifier (e.g., positive), and electrodes 1103E and 1103F can be combined and connected to a second terminal of the differential amplifier (e.g., negative). The pitch of the resulting pattern can be twice as long as the pitch of the pattern resulting from grouping pattern 1105B. Thus, by switching the electrode configurations between grouping pattern 1105A and 1105B, the spatial frequency sensitivity of the spatial differential electrode configuration can be dynamically changed. Bars 1109B and 1109C plotted against the finger spatial frequencies curve 1107 illustrate an exemplary set of spatial frequencies that can correspond to the groupings 1105B and 1105C respectively. In the illustrated bars, both of the bars fall near the peak of the spatial frequency curve 1107. However, because the relative sizing of the grouping patterns can change by a factor of two between the two groupings and the resulting ratio of the spatial frequencies corresponding to bars 1109B and 1109C can also be 2:1.

Figure 11C:
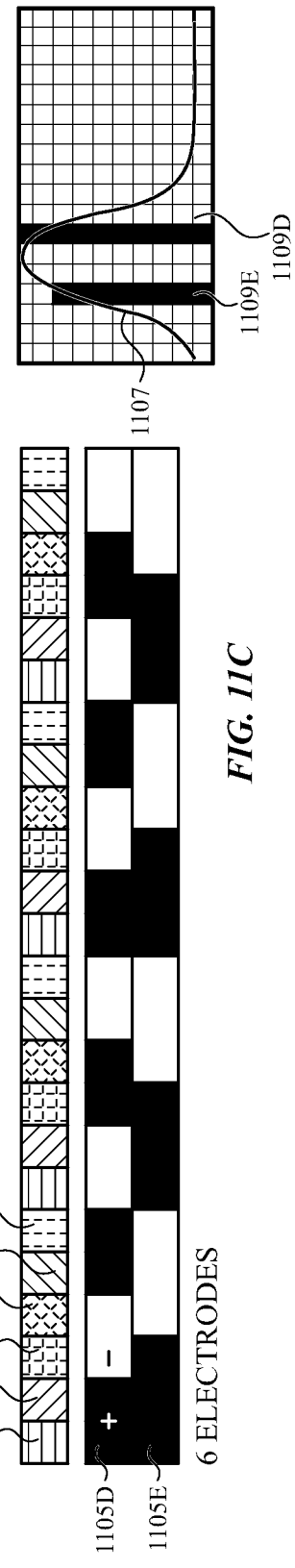

FIG. 11C illustrates an exemplary electrode spatial differential electrode configuration with six electrodes respectively according to examples of the disclosure. In some examples, the electrodes 1103G-1103L can be disposed on a single side of a transducer (e.g., 612, 902, or 1010 above) with a common electrode on the opposite side of the transducer. The electrodes 1103G-1103L can be placed in an alternating and repeating pattern as indicated by the fill patterns corresponding to each electrode. As should be understood based on the descriptions of FIG. 10B above, the grouping configurations 1105D and 1105E can be connected to terminals of a differential amplifier. The pitch of the illustrated patterns can have a ratio of 3:2, and corresponding bars 1109D and 1109E are illustrated along with the finger spatial frequency curve 1107. Although the difference may appear subtle, in the graphs of FIG. 11B and FIG. 11C, the groupings in FIG. 11C show that by reducing the ratio of effective pixel pitch (e.g., from 2:1 to 3:2), the sensed spatial frequencies can be closer together, and in some examples, an increased in amount of signal can be obtained.

Figure 11D:
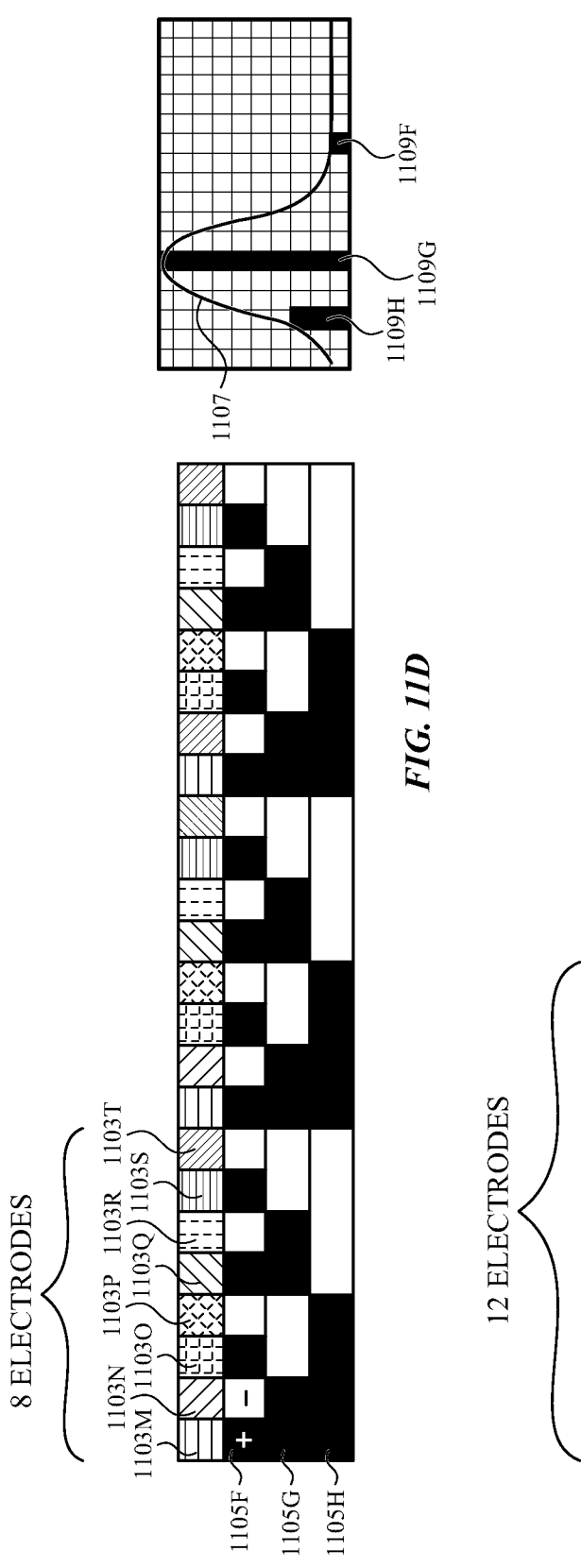
Figure 11E:
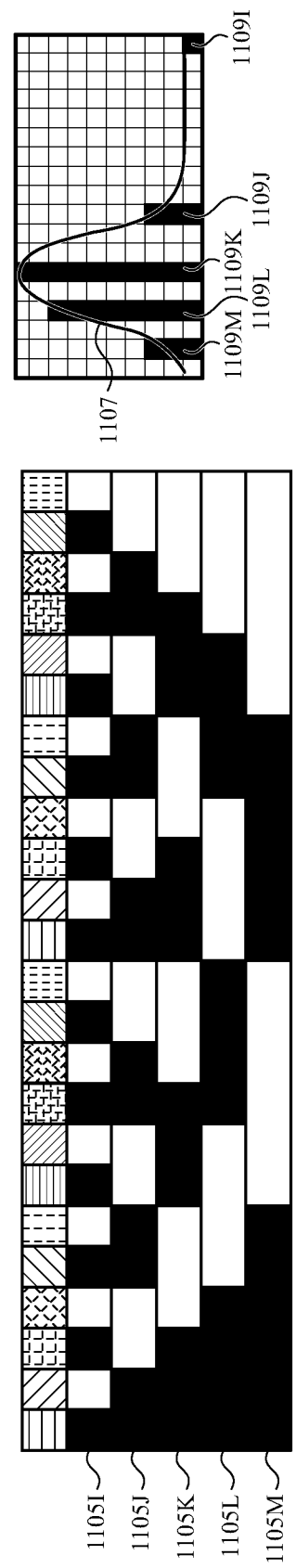

FIG. 11D-11E illustrate exemplary electrode spatial differential electrode configuration with eight and twelve electrodes respectively according to examples of the disclosure. As should be understood based on the FIGS. 11A-11C above, the electrodes can be grouped into different groupings (e.g., 1105F-1105H in FIGS. 11D and 1105I-1105M in FIG. 11E) to maximize an amount of signal obtained within the desirable frequency range. For example, the bars 1109J-1109M can correspond to four different spatial frequencies within the finger spatial frequency curve 1107 peak. In some examples, the bar 1109I, which is shown positioned away from the spatial frequency curve 1107 peak can be used for force sensing. As explained above, the deformable material in FIGS. 10A-10B can be configured with a desired spatial frequency, and by placing the desired frequency outside of the finger spatial frequency curve 1107 peak, the touch and force signals have a reduced amount of interference with one another.

Figures 12A, 12B:
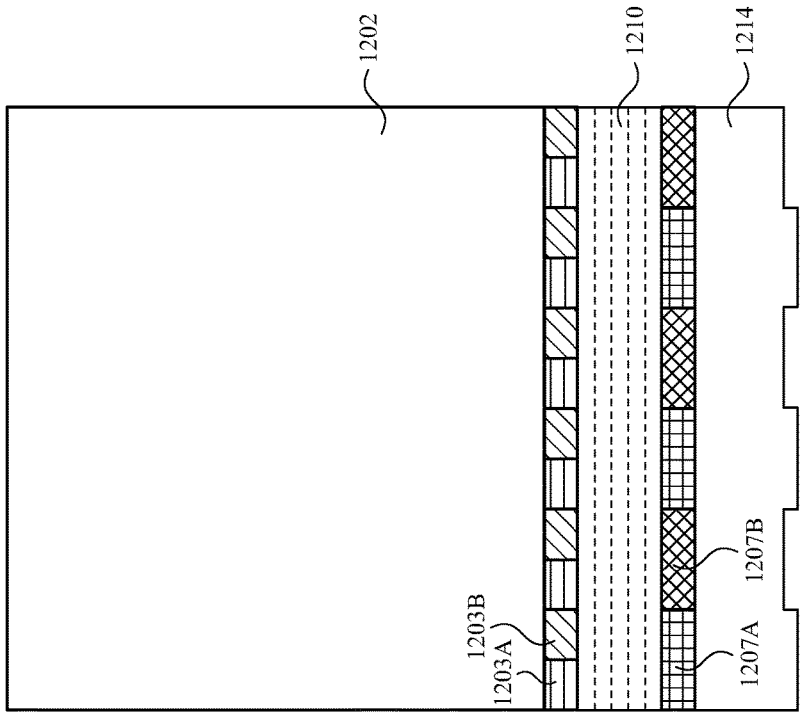
FIG. 12A illustrates an exemplary configuration for a spatial differential electrode configuration having differential electrodes on both sides of a transducer according to examples of the disclosure.
FIG. 12B illustrates an exemplary connection pattern for performing acoustic wave transmission, touch measurement, and force measurements.

FIG. 12A illustrates an exemplary configuration for a spatial differential electrode configuration having differential electrodes on both sides of a transducer 1210 according to examples of the disclosure. FIG. 12 depicts a flattened view of a cover glass 1202, transducer 1210, and a deformable material 1214 that can correspond to the cover glass, transducer, and deformable material components in FIGS. 3B and 6B. Furthermore the deformable material 1214 is depicted with a jagged border to illustrate that a spatial frequency has been included in the deformable material 1214. It should be understood that either of the configurations in FIGS. 10A and 10B for including a spatial frequency in the deformable material 1214 can be used while remaining within the scope of the present disclosure. The illustrated jagged shape of the deformable material 1214 is merely illustrative of a pitch of the associated spatial frequency. FIG. 12 illustrates a transducer 1210 having two sets of two electrode differential patterns, electrodes 1203A and 1203B on a first side of the transducer, and electrodes 1207A and 1207B on a second side of the transducer. As illustrated, the first side electrodes 1203A/1203B can be disposed between the transducer and the cover glass 1202 and the second side electrodes 1207A/1207B can be disposed between the transducer and the deformable material 1214. It should be recognizable that each of the pairs of electrodes 1203A/1203B and 1207A/1207B respectively can correspond to a two pixel differential electrode configuration as shown in FIG. 11A above. As illustrated the 1207A/1207B can have a larger electrode size and a corresponding larger electrode pitch, leading each of the electrode pairs to have a different corresponding spatial frequency. Furthermore, in some examples, the pitch of the electrodes 1207A and 1207B can be configured to match the spatial frequency associated with the deformable material.

FIG. 12B illustrates an exemplary connection pattern for performing acoustic wave transmission, touch measurement, and force measurements. In an exemplary transmit state an acoustic wave can be transmitted by providing a differential driving signal across the transducer 1210. This can be accomplished by differentially driving electrodes on one side (e.g., 1203A and 1203B) of the transducer 1210 with a first polarity of a transmit signal and driving electrodes (e.g., 1207A and 1207B) on the opposite side with the opposite polarity of the transmit signal. While the chart illustrates 1203A/1203B connected to the positive input terminal and 1207A/1207B connected to the negative input terminal, these polarities can be switched without departing from the scope of the present disclosure. In some examples, a single-sided transmit can be accomplished by driving a set of electrodes on one side of the transducer (e.g., either 1203A/1203B or 1207A/1207B) with a transmit signal and coupling the opposite set of electrodes to ground.

In a first exemplary force measurement configuration, the electrode 1207A can be coupled to a first input terminal of a differential amplifier and the electrode 1207B can be coupled to a second input terminal of a differential amplifier. In the first exemplary force measurement configuration, the electrodes 1203A and 1203B can be coupled to ground. In a second exemplary force measurement configuration, one of the electrodes (e.g., 1207A or 1207B) can be coupled to a single-ended amplifier, and the other electrode (e.g., 1207B or 1207A) can be coupled to ground. In the second exemplary force measurement configuration, the electrodes 1203A and 1203B can be left floating to create a differential measurement in the charge domain as will be explained in more detail with regard to FIGS. 14B and 14C below.

In a first exemplary touch measurement configuration, the electrode 1203A can be coupled to a first input terminal of a differential amplifier and the electrode 1203B can be coupled to a second input terminal of a differential amplifier. In the first exemplary force measurement configuration, the electrodes 1207A and 1207B can be coupled to ground. In a second exemplary force measurement configuration, one of the electrodes (e.g., 1203A or 1203B) can be coupled to a single ended amplifier, and the other electrode (e.g., 1203B or 1203A) can be coupled to ground. In the second exemplary force measurement configuration, the electrodes 1207A and 1207B can be left floating to create a differential measurement in the charge domain as will be explained in more detail with regard to FIGS. 14B and 14C below.

FIGS. 13A and 13B illustrated exemplary configurations and groupings for double-sided differential electrode configurations according to examples of the disclosure. FIG. 13A illustrates a configuration with two electrodes 1303A and 1303B on a first (e.g., top) side of the transducer 1310 and two electrodes 1307A and 1307B on a second (e.g., bottom) side of the transducer. The electrode pairs can be operated similarly to the two-sided electrode operation described in FIG. 12 with grouping pattern 1305A for the electrodes 1303A and 1303B and grouping pattern 1313A for the electrodes 1307A and 1307B. In some examples, the top-side electrodes (e.g., 1303A and 1303B) and bottom-side electrodes (e.g., 1307A and 1307B) can have a different pitch, and thus different corresponding spatial frequency sensitivity. The example in FIG. 13A shows a ratio of 2:1 between the pitch of the bottom electrodes and the top electrodes. The chart in the right hand side of FIG. 13A illustrates a finger spatial frequency curve 1308 that can correspond to the finger spatial frequency curve 1107 in FIGS. 11A-11E above. In the particular example of FIG. 13A, the top electrodes 1303A/1303B can be designed to sense a spatial frequency 1309A at the peak of the finger spatial frequency curve 1308. Furthermore, the bottom electrodes 1307A/1307B can be designed to sense a spatial frequency 1311A that can be away from the peak of the finger spatial frequency curve 1308. Furthermore, the spatial frequency corresponding to 1311A can be the spatial frequency associated with the deformable material pattern (e.g., 1204 above) as further described in FIGS. 10A-10B.

FIG. 13B illustrates a configuration with four electrodes 1303C-1303F on a first (e.g., top) side of transducer 1310 and six electrodes 1307G-1307L on a second side (e.g., bottom of transducer 1310. The four-electrode configuration can correspond to the electrode configuration illustrated in FIG. 11B and the six-electrode configuration can correspond to the electrode configuration illustrated in FIG. 11C. In some examples, electrode groupings 1305B, 1305C, 1313B, and 1313C can be used to obtain measurements at four different spatial frequencies. It should be understood that the transmit, force measurement, and touch measurement states described in FIGS. 12A and 12B can be implemented with the electrode groupings in an analogous way to the connections in FIG. 12B. As one example, the force measurement of FIG. 12B can be accomplished using pixel grouping 1313C. In some examples, the electrodes 1307G, 1307H, and 1307I can be grouped together and coupled to a first input terminal of a differential amplifier and the electrodes 1307J, 1307K, and 1307L can be grouped together and coupled to a second terminal of the differential amplifier. The chart in the right hand side of FIG. 13B illustrates a finger spatial frequency curve 1308 that can correspond to the finger spatial frequency curve 1107 in FIGS. 11A-11E above. In some examples, the spatial frequency for grouping 1313C can be located at the position of the bar 1311B, which is at a spatial frequency far from the peak of the finger spatial frequency curve 1308. In some examples, the spatial frequency associated with 1311B can be the frequency associated with the deformable material pattern (e.g., 1204 above), as further described in FIGS. 10A-10B. The remaining groupings 1305B, 1305C, and 1313B can also be used to produce measurements at additional spatial frequencies as reflected by bars 1309B-1309D, which can all be positioned near the peak of the finger spatial frequency curve 1308 to maximize an amount of signal for touch measurement.

Figure 14A:
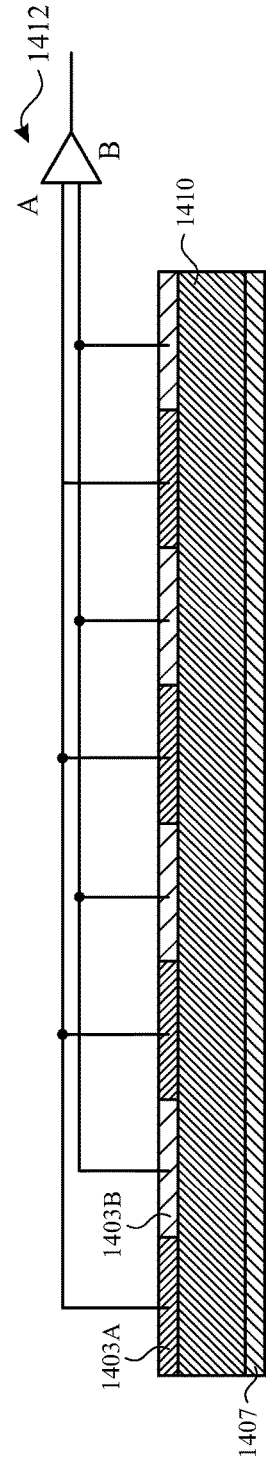
FIGS. 14A-14F illustrate exemplary amplifier configurations for performing differential sensing according to examples of the disclosure.
Figure 14B:
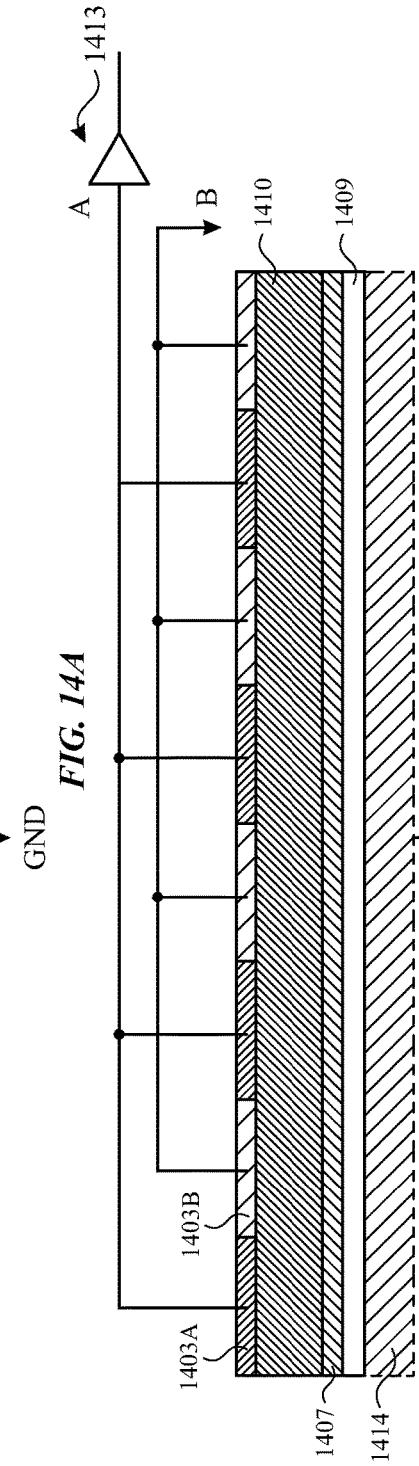
Figure 14C:
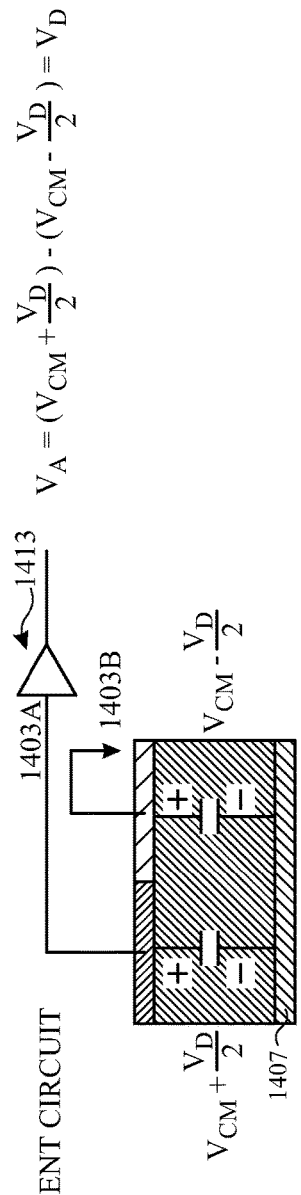

FIGS. 14A-14C illustrate exemplary amplifier configurations for performing differential sensing according to examples of the disclosure. FIG. 14A illustrates an exemplary differential amplifier readout connection for a two-pixel electrode pattern 1403A and 1403B disposed on a first side of a transducer 1410. In some examples, a ground electrode 1407 can be disposed on the opposite side of the transducer 1410. It should be understood from the disclosure above, including FIGS. 12 and 13, that the electrode 1407 could be representative of a multiple electrode configuration (e.g., as described in FIGS. 11A-11E) where all of the individual electrodes are connected to ground. In some examples, the use of a differential amplifier to read out the signals from electrodes 1403A and 1403B can result in a large amount of noise. Furthermore, in some examples, the differential amplifier must be able to accept a large amount of common mode signal at the differential inputs (e.g., from the ringing signal described in FIGS. 8A-8C.

FIG. 14B illustrates an alternative single-ended amplifier configuration for performing differential sensing according to examples of the disclosure. In the illustrated configuration, one of the two electrodes 1403A/1403B can be connected to a single ended amplifier 1413, and the other of the two electrodes 1403B/1403A can be connected to ground. The electrode on the opposite side 1407 of the transducer 1410 can be floating instead of connected to ground as shown in FIG. 14A. In addition, an optional grounded shield 1414 can be provided from preventing coupling of signals into the floating electrode 1407 that can get injected into the signal received at the amplifier 1413. In some examples, when the optional grounded shield 1414 is provided, an insulating layer 1409 can be disposed between the grounded shield and the floating electrode 1407 to electrically isolate the grounded shield from the floating electrode. FIG. 14C illustrates an equivalent circuit of the configuration in FIG. 14B. FIG. 14C shows a voltage signal formed between electrode 1403A and the floating electrode 1407 having a value $V_{CM}+V_D/2$ and a voltage formed between electrode 1403B (which can be grounded) and the floating electrode having a value $V_{CM}-V_D/2$. $V_{CM}$ represents a common mode voltage that can be a result of signals that are common to the two electrodes 1403A and 1403B such as ringing in the bezel described in FIGS. 8A-8C above. V D represents a differential voltage between the first and second electrode that can result from the electrodes 1043A and 1403B receiving different signals due to spatial modulation of the incoming signal (e.g., from a finger) as described above. In some examples, when the electrode 1403B is grounded and the floating electrode 1407 is at a floating potential, the single ended amplifier sees the voltages in series, with the common mode signal effectively canceling out, and the differential components adding together. The voltage ($V_A$) at the input of amplifier 1413 can be expressed with the following equations:

$$V_A = \left(V_{CM} + \frac{V_D}{2}\right) - \left(V_{CM} - \frac{V_D}{2}\right) \tag{1}$$

$$\left(V_{CM} + \frac{V_D}{2}\right) - \left(V_{CM} - \frac{V_D}{2}\right) = V_D \tag{2}$$

$$V_A = V_D \tag{3}$$

The equations show that the common mode term can be canceled, and the voltage at the amplifier input can be equal to the differential voltage between the electrodes 1403A and 1403B. Thus, a single-ended amplifier can be used to perform the differential measurement, and the amplifier does not need to handle the signal swing of the full common-mode signal, which can be orders of magnitude larger than the differential signal as described in FIGS. 8A-8C above. It should be understood from the disclosure above that the single-ended amplifier configuration of FIGS. 14B and 14C is not limited to the situation of a two-electrode pattern on one side of the transducer 1410, but can be extended to any of the single-sided or double-sided electrode patterns described in FIGS. 11A-11E and 13A-13B and other electrode patterns capable of performing the differential sensing described throughout the disclosure.

Figure 14D:
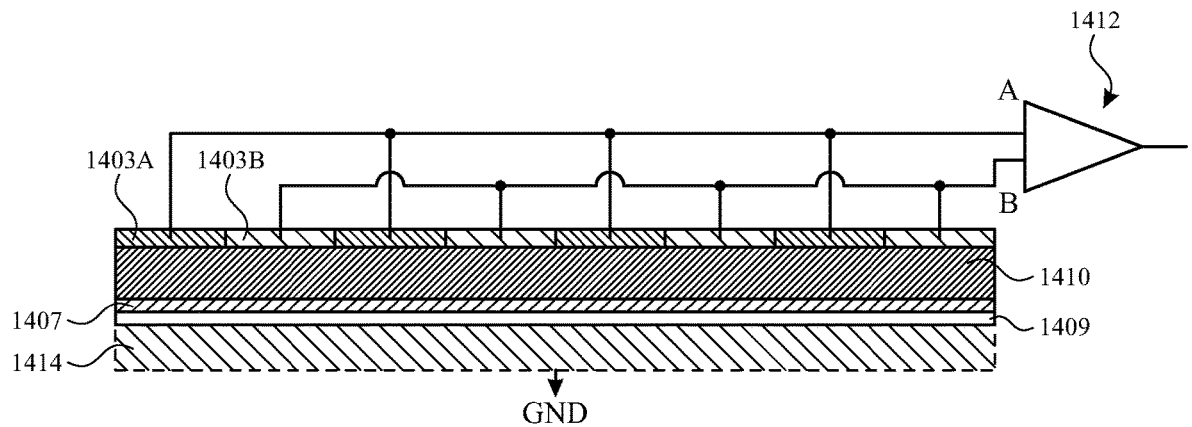
Figure 14E:
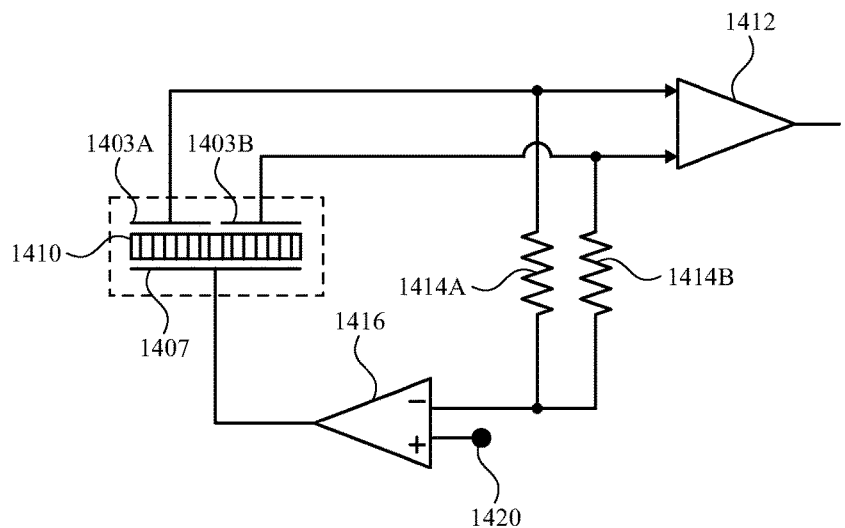
Figure 14F:
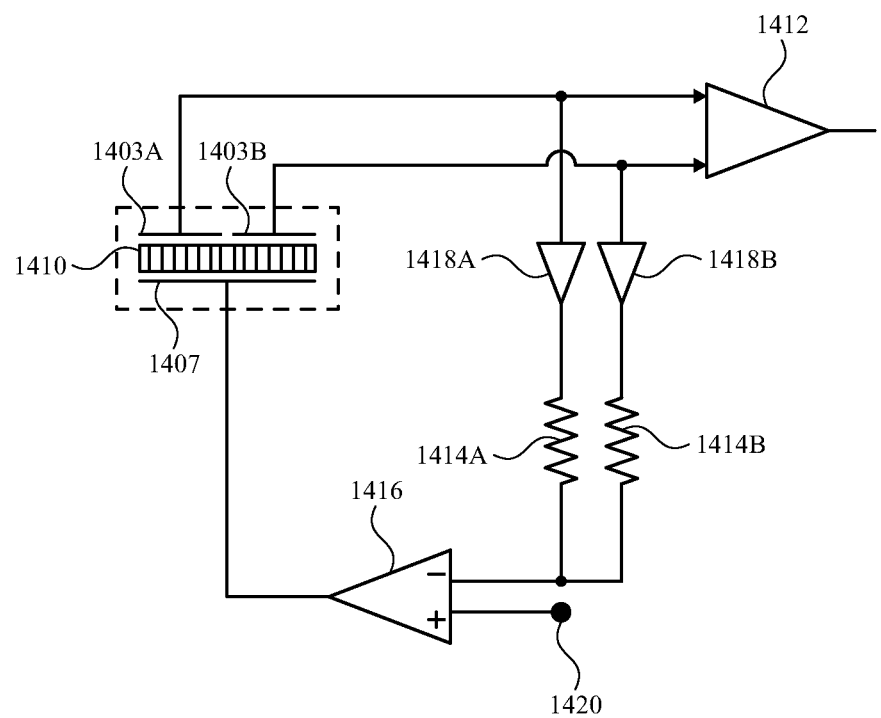

FIG. 14D illustrates an alternative amplifier configuration for performing differential sensing according to examples of the disclosure. In the illustrated configuration, the two electrodes 1403A and 1403B can be connected to a differential amplifier 1412, instead of the single ended amplifier 1413 of FIG. 14B. The other components of the configuration illustrated in FIG. 14D can be the same as the configuration illustrated in FIG. 14B. However unlike in the configuration of FIG. 14B, the signals may not be referenced to a known potential, as the floating electrode 1407 is floating at the time of measurement. In this case, the differential amplifier 1412 may need to be capable of accepting a wider range of input voltage values. In particular, the floating electrode 1407 can be influenced by coupling with nearby objects. As mentioned above, an optional grounded shield 1414 can be used to shield the floating electrode 1407 from coupling with nearby objects. In some examples, when the optional grounded shield 1414 is provided, an insulating layer 1409 can be disposed between the grounded shield and the floating electrode 1407 to electrically isolate the grounded shield from the floating electrode. However, the optional grounded shield 1414 can create a leakage path for charge via capacitive coupling to the floating electrode 1407. Accordingly, there can be a trade-off between rejecting outside object coupling and common mode rejection in the floating electrode 1407 configuration. In light of these trade-offs, in some examples, a common-mode feedback approach as described in FIGS. 14E-14F below can be used as an alternative to the floating electrode configuration for reducing effects of a common-mode signal in during spatial-differential readout according to examples of the disclosure FIGS. 14E-14F illustrate exemplary amplifier configurations with a common-mode feedback (CMFB) configuration for performing spatial differential sensing according to examples of the disclosure. FIG. 14E illustrates an exemplary differential amplifier 1412 readout connection for a two-pixel electrode pattern 1403A and 1403B disposed on a first side of a transducer 1410. In some examples, an electrode 1407 can be disposed on the opposite side of the transducer 1410. In some examples, the signals from electrodes 1403A and 1403B can result include a large common mode signals as described above (e.g., ringing in the bezel as described with reference to FIGS. 8A-8C above). These common mode signals can be reduced or eliminated by the CMFB configuration illustrated in FIG. 14E. For example, the common mode signal from electrodes 1403A and 1403B can be sensed by resistors 1414A and 1414B, respectfully. In some examples, resistors 1414A and 1414B can be the same size or substantially the same size. In some examples, resistors 1414A and 1414B can be a generic impedance that can include resistors, capacitors, and/or inductors. The sensed common mode signal ($V_{CM}$) (can be coupled to the first terminal (e.g., negative or inverting) of operational amplifier 1416, and the second terminal (e.g., positive or non-inverting) of operational amplifier 1416 can be coupled to a desired reference voltage 1420 (e.g., ground or any other desired voltage). In some examples, the output of operational amplifier 1416 can be connected to electrode 1407 on one side of the transducer. In some examples, when the second terminal (e.g., positive) of operational amplifier 1416 is coupled to ground, the common mode signal can be eliminated or reduced by the operational amplifier. As discussed above with reference to FIG. 14C, a voltage signal can be formed between electrode 1403A and electrode 1407 having a value $V_{CM}+V_D/2$ and a voltage can be formed between electrode 1403B and electrode 1407 also having a value $V_{CM}-V_D/2$. Because the configuration illustrated in FIG. 14E can eliminate $V_{CM}$, amplifier 1412 can receive only $V_D$—the differential voltage between the first and second electrode that can result from the electrodes 1403A and 1403B receiving different signals due to spatial modulation of the incoming signal (e.g., from a finger) as described above. The voltage ($V_A$) at the input of amplifier 1412 can be expressed with the following equations:

$$V_A=(V_{CM}+V_D/2)-(V_{CM}-V_D/2) \quad (1)$$

$$V_A=(0+V_D/2)-(0-V_D/-/2) \quad (2)$$

$$V_A=V_D/2+V_D/2 \quad (3)$$

$$V_A=V_D \quad (4)$$

The equations show that the common mode term can be eliminated or reduced, and the voltage at the input of amplifier 1412 can be made equal to the differential signal component between the electrodes 1403A and 1403B (e.g., $V_D$). Thus, amplifier 1412 does not need to have to be designed to accommodate the voltage range of common-mode signal, which can be orders of magnitude larger than the differential signal as described in FIGS. 8A-8C above. It should be understood from the disclosure above, including FIGS. 12 and 13, that the electrode 1407 could represent a multiple electrode configuration (e.g., as described in FIGS. 11A-11E).

FIG. 14F illustrates a CMFB configuration for performing differential sensing according to examples of the disclosure. In some examples, resistors 1414A and 1414B can reduce the impedance seen at the input of differential amplifier 1412, and cause errors. In some examples, 1414A and 1414B can introduce thermal noise at the input of amplifier 1412 that can be amplified by the differential amplifier 1412. In the illustrated configuration, buffers 1418A and 1418B can be used to isolate resistors 1414A/1414B from the inputs of differential amplifier 1412). This configuration can isolate resistors 1414A/1414B from amplifier 1412 such that resistors 1414A/1414B do not interfere with differential amplifier 1412 and the differential amplifier does not see the resistance of the resistors 1414A/1414B. Moreover, the positive terminal of feedback operational amplifier 1416 can be coupled to ground or a reference voltage source 1420 that can provide any desired reference voltage. The CMFB circuit illustrated in FIG. 14F can be used to remove or reduce the common mode signal component from the input to differential amplifier 1412. Thus, when the CMFB circuit is employed, amplifier 1412 does not need to be able to accept the full common-mode signal swing.

Figure 16B:
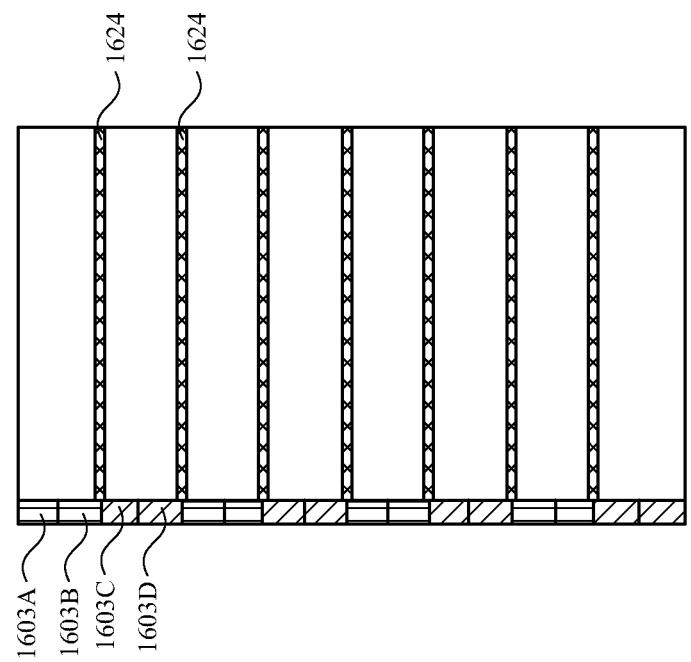
FIGS. 16A-16D illustrate an exemplary quadrature spatial differential electrode configuration according to examples of the disclosure.
Figure 16A:
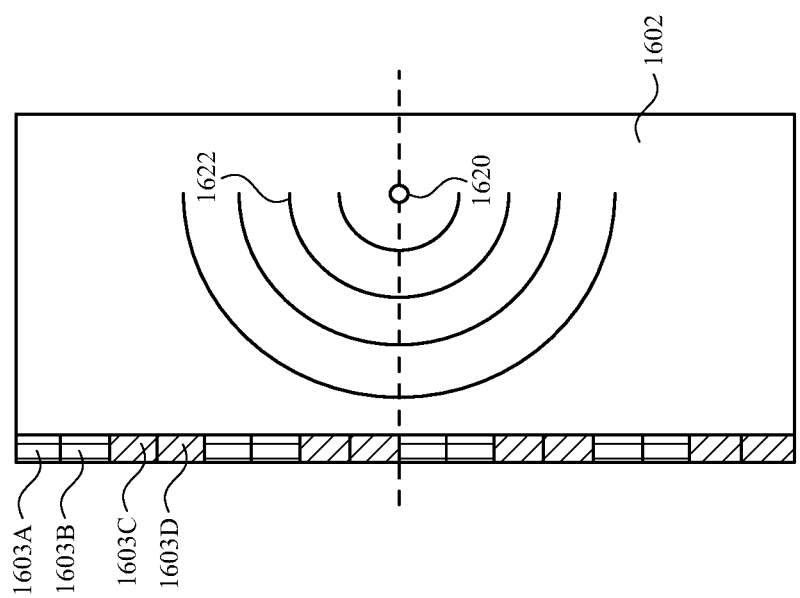
Figure 16D:
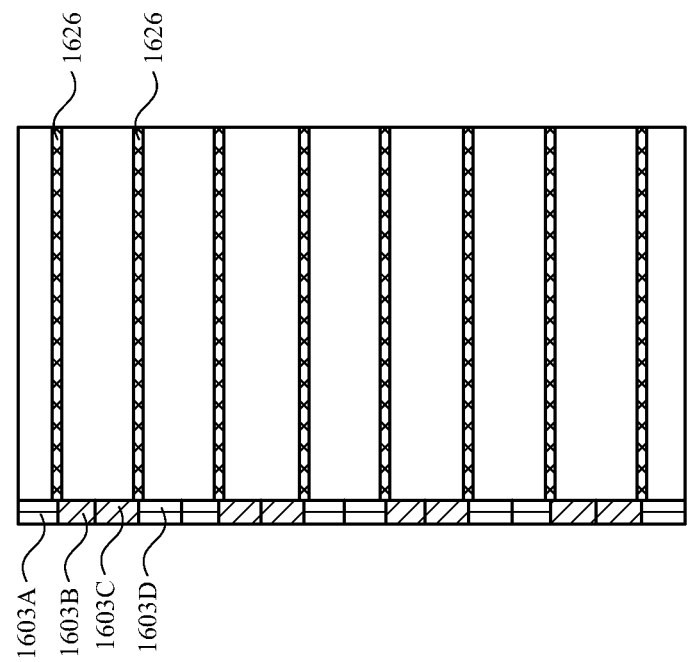

It should be understood from the disclosure above that the CMFB configurations of FIGS. 14E and 14F are not limited to the situation of a two-electrode pattern on one side of the transducer 1410, but can be extended to any of the single-sided or double-sided electrode patterns described in FIGS. 11A-11E and 13A-13B as well as other electrode patterns capable of performing the differential sensing described throughout the disclosure FIGS. 15A-15C illustrate a spatial null phenomenon that can be associated with spatial differential electrode configurations according to examples of the disclosure. FIGS. 16A and 16B illustrate a single-sided electrode pattern having four electrodes 1603A-1603D that can correspond to the four-electrode pattern illustrated in FIG. 11B above, and in particular the grouping 1105C. FIG. 15A illustrates a point source 1520 of acoustic energy. Acoustic energy from the point source 1520 can radiate in a radiating pattern 1522, and for some point source locations, the point source 1520 can be aligned with the center of one of the segments of an electrode (e.g., 1503B). FIG. 15B illustrates a point source 1520 aligned between two adjacent segments 1503A and 1503B. In some examples, when the point source 1520 is aligned between the two electrodes, equal amounts of signal from the point source can produce equal amounts of signal on each electrode. In some examples, when the two electrodes are sensed differentially, the signal from the point source can be canceled. FIG. 15C illustrates a plurality of spatial nulls 1524 that can occur for point source locations that fall on the edge of the alternating electrode pattern of electrodes 1503A and 1503B. Although a point source 1520 is described in connection with the figures above, it should be understood that a similar effect can occur as a result of reflections from an object touching the cover glass 1502, particularly when the contact by the object is centered along one of the spatial nulls 1524. Furthermore, it should be understood that the same spatial null phenomenon can occur not only at the intersection points between individual electrodes, but also at intersection points of electrode groupings in the various grouping configurations (e.g., 1105A-1105M, 1305A-1305C, and/or 1313A-1313C).

FIGS. 16A-16D illustrate an exemplary quadrature spatial differential electrode configuration according to examples of the disclosure. FIG. 16A depicts a four electrode spatial differential electrode configuration that can correspond to the electrode configuration in FIG. 11B and in particular the electrode grouping 1105C. As illustrated, the electrodes 1603A and 1603B are grouped together and can be connected to a first terminal of a differential amplifier, and the electrodes 1603C and 1603D are grouped together and can be connected to a second terminal of a differential amplifier. Similar to the illustration in FIG. 15B, a point source 1620 is illustrated at the intersection between the electrode groups. FIG. 16B illustrates corresponding spatial nulls 1624, and it can be seen that the point source 1620 in FIG. 16A can fall within one of the spatial nulls illustrated in FIG. 16B. In some examples, signal measurements by the first electrode grouping show in FIGS. 16A-16B can be referred to as the in-phase component.

Figure 16C:
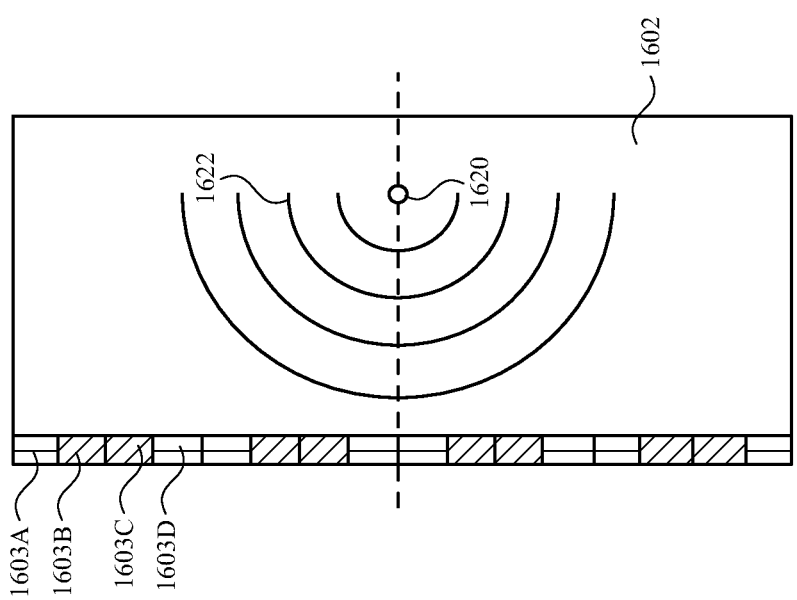

FIG. 16C illustrates the same spatial differential electrode configuration with a second grouping having shifted spatial nulls according to examples of the disclosure. In FIG. 16C, the point source location on the cover glass 1602 is identical to the location in FIG. 16A. The grouping of the electrodes has the same pitch as the grouping in FIG. 16A, but the pattern is shifted by 90 degrees (e.g., one quarter of the total pitch) in the spatial domain. As illustrated, electrodes 1603A and 1603D are grouped together and can be connected to a first terminal of a differential amplifier, and the electrodes 1603B and 1603C are grouped together and can be connected to a second terminal of a differential amplifier. The overall pitch of the electrode grouping is the same as in FIG. 16A, and thus the spatial frequency corresponding to the grouping remains the same, but the spatial phase is changed. The spatial phase of the grouping is illustrated by the shifted spatial nulls 1626 in FIG. 16D. In some examples, signal measurements by the second electrode grouping show in FIGS. 16C-16D can be referred to as the quadrature component. The position of the spatial nulls 1624 and shifted spatial nulls 1626 can be made non-overlapping, such that any point source 1620 location on the cover glass 1602 can fall outside of a spatial null in at least one of the two electrode configurations. In some examples, the in-phase and quadrature components can be added together to eliminate any signal nulls regardless of the position of the signal source.

FIGS. 17A-17C illustrates a first exemplary spatial electrode configuration for performing quadrature spatial differential measurements of touch signals on cover glass 1702 and force sensing using a shared set of electrodes according to examples of the disclosure. In some examples, an eight-electrode configuration as described in FIG. 11D can be used. FIGS. 17A and 17B illustrate the in-phase and quadrature electrode grouping configurations described in FIGS. 16A-16D. In the in-phase configuration, electrodes 1703A, 1703B, 1703E and 1703F can be grouped together and electrodes 1703C, 1703D, 1703G, and 1703H can be grouped together. In the quadrature configuration, electrodes 1703A, 1703D, 1703E, and 1703H can be grouped together and electrodes 1703B, 1703C, 1703F, and 1703G can be grouped together. In some examples, the deformable material 1714 can include a spatial pattern as described in FIGS. having a corresponding spatial frequency. It should be understood that while the jagged shape of the deformable material 1714 in FIGS. 17A-17C imply a spatial pattern based on thickness variations of the deformable material, any of the techniques for including a spatial pattern in the deformable material as taught in FIGS. 10A-10B can be used. The illustrated jagged shape of the deformable material 1714 is merely illustrative of the pitch of the associated spatial pattern. FIG. 17C illustrates an exemplary electrode grouping for performing touch sensing, the electrode grouping being matched to the pitch of the deformable material 1714 spatial pattern. In some examples, the electrodes 1703A-1703D can be grouped together and the electrodes 1703E-1703H can be grouped together and connected to a differential amplifier for performing force sensing using the deformable material as described in FIGS. 3B, 6A-6B and above. The electrode grouping of FIG. 17C can result in force sensing at a lower spatial frequency than the touch sensing because the spatial pattern of the deformable material 1714 has a larger pitch than the pitch used for touch sensing.

FIGS. 18A-18C illustrate a second exemplary spatial electrode configuration for performing quadrature spatial differential measurements of touch signals on cover glass 1702 and force sensing using a shared set of electrodes according to examples of the disclosure. In some examples, a four-electrode configuration as described in FIG. 11B can be used. FIGS. 18A and 18B illustrate the in-phase and quadrature electrode grouping configurations described in FIGS. 16A-16D. In the in-phase configuration, electrodes 1803A and 1803B can be grouped together and electrodes 1803C and 1803D can be grouped together. In the quadrature configuration, electrodes 1803A and 1803D can be grouped together, and electrodes 1803B and 1803C can be grouped together. In some examples, the deformable material 1814 can include a spatial pattern as described in FIGS. 10A-10B having a corresponding spatial frequency. It should be understood that while the jagged shape of the deformable material 1814 in FIGS. 18A-18C imply a spatial pattern based on thickness variations of the deformable material, any of the techniques for including a spatial pattern in the deformable material as taught in FIGS. 10A-10B can be used. The illustrated jagged shape of the deformable material 1814 is merely illustrative of the pitch of the associated spatial pattern. FIG. 18C illustrates an exemplary electrode grouping for performing touch sensing, the electrode grouping being matched to the pitch of the deformable material 1714 spatial pattern. In some examples, the electrodes 1803A and 1803C can be grouped together and the electrodes 1803B and 1803D can be grouped and connected to a differential amplifier for performing force sensing using the deformable material as described in FIGS. 3B, 6A-6B and 10A-10B above. The electrode grouping of FIG. 17C can result in force sensing at a higher spatial frequency than the touch sensing because the spatial pattern of the deformable material 1814 has a smaller pitch than the pitch used for touch sensing.

It should be understood that although one set of electrodes is shown in FIGS. 17A-17C and 18A-18C for performing both touch sensing and force sensing, the two-sided electrode configurations shown in FIGS. 12 and 13A-13B can also be used together with the quadrature touch sensing described in FIGS. 16A-16D.

Figure 19A:
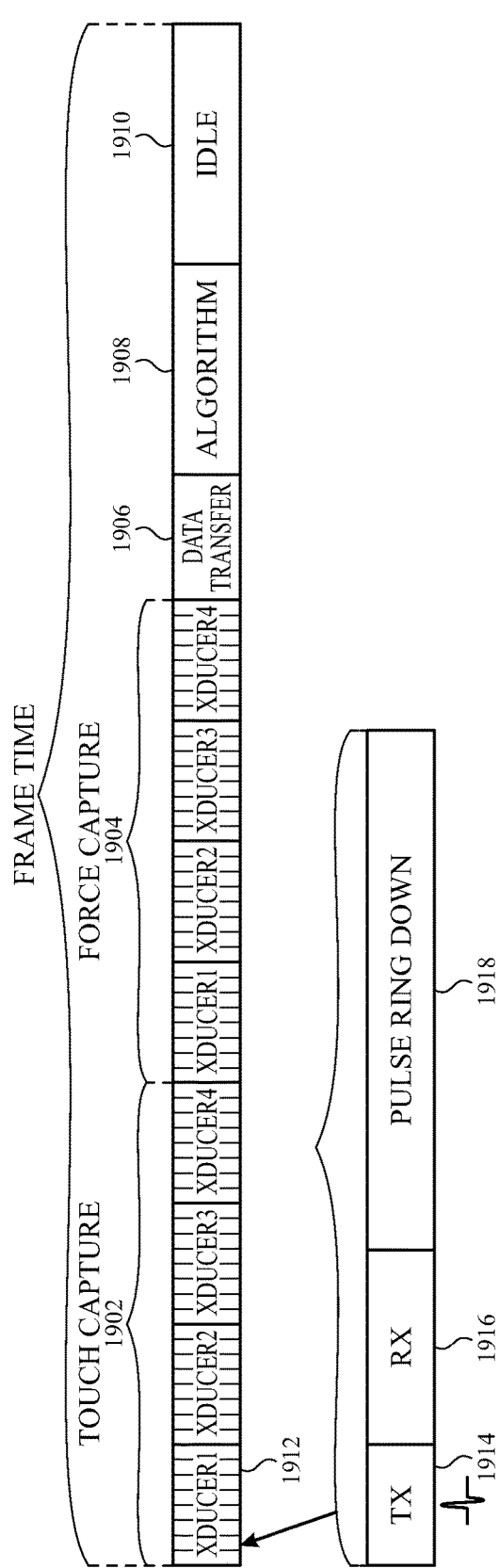
FIGS. 19A-20B illustrate exemplary timing diagrams for acoustic touch and force sensing according to examples of the disclosure.
Figure 19B:
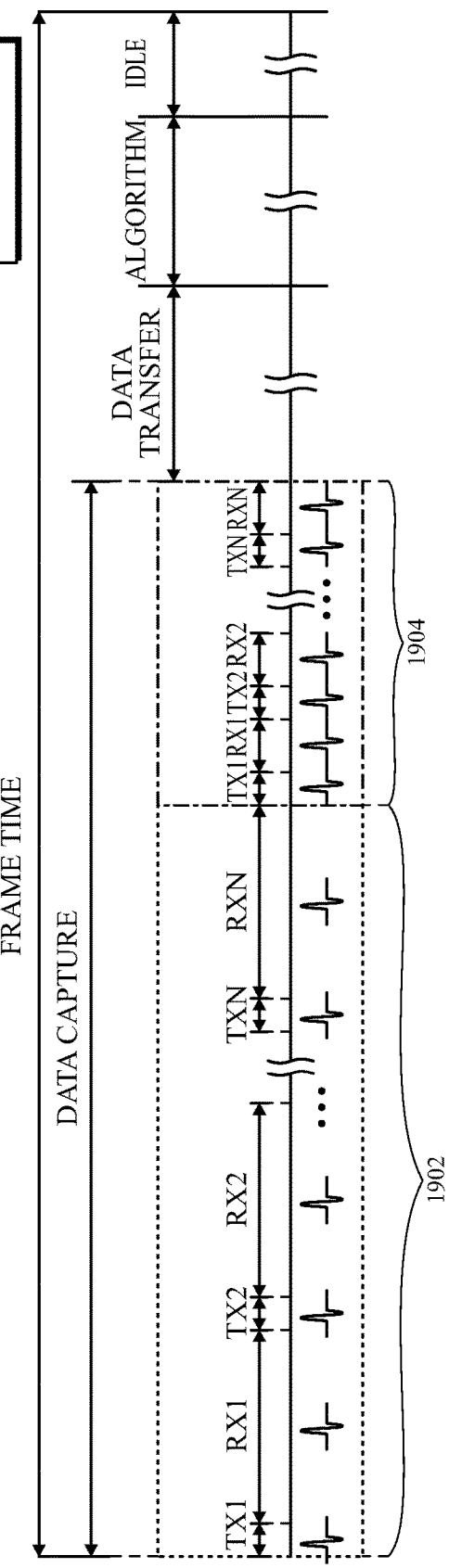

FIGS. 19A-20B illustrate exemplary timing diagrams for performing acoustic touch and force sensing according to examples of the disclosure. FIGS. 19A-20B can further be understood in conjunction with the various examples of circuitry configurations described with regards to FIGS. 21-27 below. FIGS. 19A and 19B illustrate timing diagrams for a sequential acoustic touch and force sensing mode of operation. Specifically, FIGS. 19A and 19B illustrate a frame time 1900 that can correspond to a complete sequence of events for a touch and force sensing operation. In some examples, the frame time 1900 can begin with a touch capture phase 1902 followed by a force capture phase 1904 such that the two phases do not overlap in time. In some examples, the force capture phase 1904 can be followed by the touch capture phase 1902 (e.g., the force capture phase can be performed first). In some examples, touch capture phase 1902 and force capture phase 1904 can be followed by a data transfer period 1906 (e.g., transferring measured touch and force data to be processed off-chip). In some examples, an algorithm period 1908 can be provided for processing touch and force data for an algorithm that can be used to determine information about touch location and force based on the data measured during the touch capture 1902 and force capture 1904. In some examples, the algorithm 1908 can be performed on separate circuitry or a processor residing on a different chip from the touch and force sense circuitry. In some examples, the frame time can include an idle period 1910 in which no touch and force measurement, data transfer, or algorithm calculations are performed. In some examples, the data transfer period 1906, the algorithm period 1908, or both, can be pipelined or interleaved with the detection without departing from the scope of the present disclosure. In some examples, the transducer can be grounded (e.g., by transmitter circuitry that has grounding capability of switches that can selectively couple the transducer's electrodes to ground) during the idle period 1910. In some examples, the algorithm to analyze the touch and force data can be performed on the same chip as acoustic touch/force sensing circuit used for the touch and force measurements, and algorithm period 1908 can come before data transfer period 1906. In such an example, the data being sent during the data transfer period 1906 after the algorithm period can be the algorithm results. Alternatively both the raw measurement data and the algorithm results can be transmitted during the data transfer period 1906 when algorithm period 1908 is performed on the same circuitry as the touch and force sense circuitry. In some examples, each of touch capture phase 1902 and force capture phase 1904 can include driving and sensing a subset of one or more of a group of transducers. For example, the touch capture phase shows sequentially performing measurements on four transducers, XDUCER1, XDUCER2, XDUCER3, XDUCER 4. These four illustrated transducers can correspond to transducers 502A-502D illustrated in FIG. 5A above. It should be understood that the timing diagrams illustrated in FIGS. 19A-19B can be applied for any number of transducers being used for acoustic touch and force sensing according to examples of the disclosure. Furthermore, the sequence of the detection from multiple transducers can be arranged in a different order from the one illustrated without departing from the scope of the present disclosure. In addition, the sequence of detection of the multiple transducers can be changed in different frames without departing from the scope of the present disclosure. In yet other examples, a subset of the transducers can be sampled in each frame rather than sampling all of the transducers in every frame without departing from the scope of the present disclosure. FIG. 19A shows multiple measurements represented by measurement timing slices 1912 that can be used to obtain an average value for touch capture and force capture. For example, eight touch measurements for XDUCER 1 can be averaged, followed by eight measurements each for XDUCER2-XDUCER4, and then similarly eight force measurements of each of XDUCER1-XDUCER4 can be performed. For example, each measurement timing slice 1912 can include a transmit (Tx) function 1914 (e.g., driving a signal onto the transducer to produce an acoustic wave) and a receive (Rx) function 1916 (e.g., receiving reflected signals corresponding to respective touch or force measurements). In some examples, the transmit (Tx) and receive (Rx) functions can be followed by a pulse ring down period 1918 (e.g., to allow ringing signals, as described above with reference to FIG. 8A, to stop). In some examples, the pulse ring down period 1918 can prevent successive measurements from interfering with each other. FIG. 19A illustrates eight measurement time slices 1912 for each transducer measurement averaging operation. However, it should be understood that averaging can used with a different number of measurements than eight, (e.g., as long as there are two or more measurements to average) without departing from the scope of the disclosure. Moreover, the number of measurement averages may be different during touch capture phase 1902 and force capture phase 1904 (e.g., measurements from the touch capture phase 1902 can be averaged over more measurements than in the force capture phase 1904, and vice versa). In some examples, the touch capture phase 1902 can have a longer duration than force capture phase 1904 as illustrated in FIG. 19B. In some examples, the difference in durations of the touch capture phase 1902 and force capture phase 1904 can relate to the difference in distance that an acoustic wave travels in the touch phase 1902 (e.g., across the cover glass 601 or 611 above) as compared to the distance that an acoustic wave travels in the force phase 1904 (e.g., through the thickness of deformable material 604 or 614 above). To illustrate this point, FIG. 19B illustrates an exemplary timing diagram where the respective receive durations (Rx1-RxN) for the force phase 1904 measurements are shorter than the respective receive duration (Rx1-RxN) for the touch phase 1902 measurements as described immediately above. As a result, FIG. 19B illustrates that the total duration for the force phase 1904 can be shorter than the total duration of the touch phase 1902 even when the same total numbers of transmit and receives are performed during each phase. It should be understood that the duration of various phases illustrated in the timing diagrams of FIGS. 19A-19B, e.g., touch capture 1902, force capture 1904, data transfer 1906, algorithm 1908, idle 1910, etc. are not necessarily drawn to scale and are provided for the purposes of illustration.

In some examples, force detections for each of the transducers XDUCER1-XDUCER4 can be performed simultaneously to reduce the total duration of force measurements during the force phase 1904. In such an example, each transducer XDUCER1-XDUCER4 can be provided with a transmit circuit to drive the transducer and an analog front end to receive the force measurement signals (e.g., from reflections in the deformable material 604 or 614 above coupled to each individual transducer e.g., 502A-502D above). In some examples, a single transmit circuit can be used to sequentially drive each individual transducer XDUCER1-XDUCER4 with a slight time delay between driving each transducer, and then simultaneously capture the force measurement signals at four analog front ends from each of the transducers XDUCER1-XDUCER4 to reduce the time for force detection.

Figure 20A:
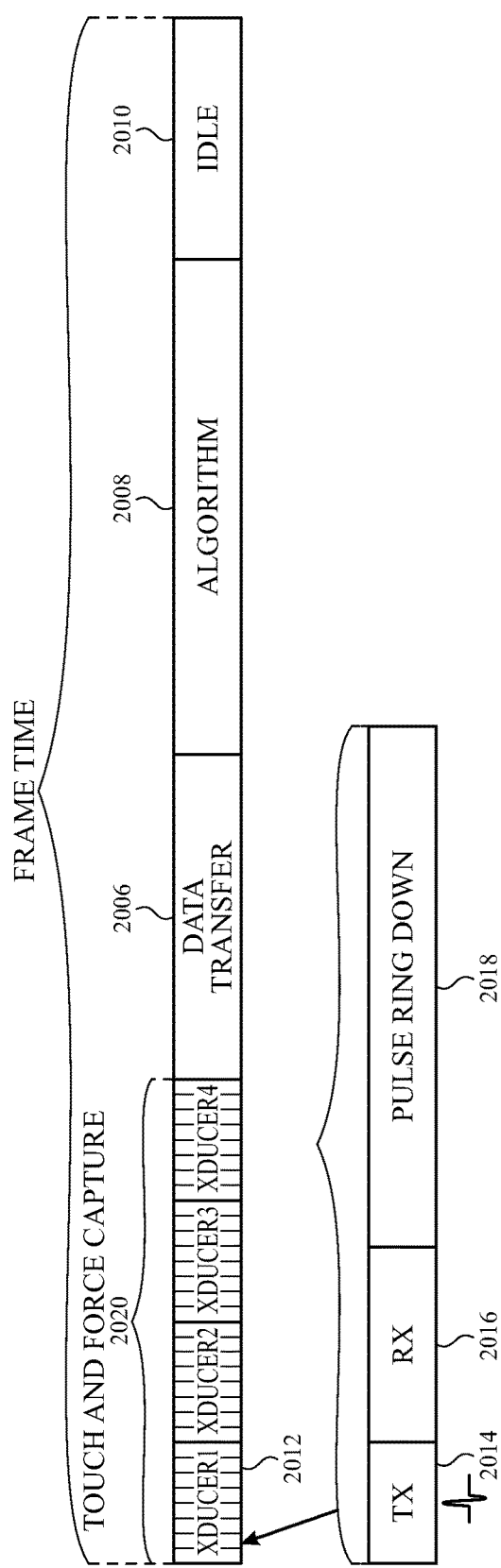
Figure 20B:
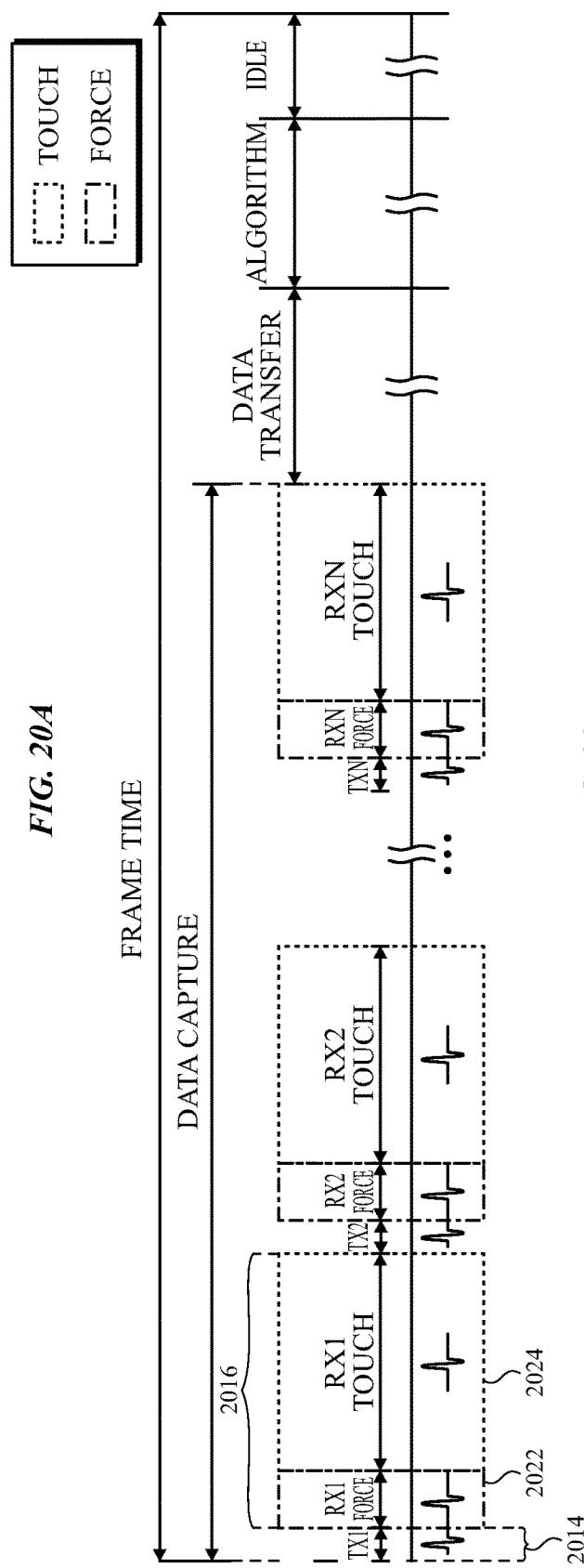

FIGS. 20A and 20B illustrate timing diagrams for a combined acoustic touch and force sensing mode of operation. Specifically, in contrast to the mode of operation illustrated in FIGS. 19A-19B, in the mode of operation illustrated in FIGS. 20A and 20B, the touch and force capture phases are combined into a touch and force capture phase 2020. This can be accomplished by performing a force receive function 2022 and a touch receive function 2024 as illustrated in FIG. 20B during a single combined Rx function 2016. In some examples, the force and touch receive functions can both be performed sequentially after a single transmit (Tx) function 2014 because reflections associated with force measurement can arrive at the transducer and any ringing associated with the force measurement can settle before any reflections associated with touch measurement are received at the transducer (e.g., as described with reference to FIG. 7 above). In some examples, the timing illustrated in FIGS. 20A and 20B can most preferably be used when signals for the force sensing occur during a dead zone for touch signals from touch sensing. For example, if reflections in a deformable material (e.g., 604 or 614 above) used for force sensing are sufficiently attenuated before reflected touch measurement signals can return to the transducer, then the two operations can be performed sequentially based on a single Tx function 2014. In other words, depending on the geometries and material properties of the deformable materials (e.g., 604 or 614 above) and cover glass (e.g., 601 and 611 above), the signals for touch capture and force capture can be temporally isolated in two distinct time windows (e.g., force receive 2022 and touch receive 2024) following a single transmit Tx function 2014. Similar to the description of FIG. 19A-19B above, the frame time shown in FIGS. can include data transfer period 2006, algorithm period 2008, and idle period 2010. As noted above, in some examples, the data transfer period 2006, the algorithm period 2008, or both, can be pipelined or interleaved with the touch and force detection without departing from the scope of the present disclosure. Similar to the description of FIG. 19A above, FIG. 20A shows that averaging can be performed for the combined touch and force captures 2020 as illustrated by measurement time slices 2012. Furthermore, the sequence of the detection from multiple transducers (e.g., XDUCER1, XDUCER2, XDUCER3, and XDUCER4) can be arranged in a different order from the one illustrated without departing from the scope of the present disclosure. In addition the sequence of detection of the multiple transducers can be changed in different frames without departing from the scope of the present disclosure. In yet other examples, a subset of the transducers can be sampled in each frame rather than sampling all of the transducers in every frame without departing from the scope of the present disclosure. As shown in FIG. 20B, receive period 2016 can include both a force receive 2022 and a touch receive 2024. As should be understood from the disclosure above, respective force measurements 2024 can be averaged together and respective touch measurements 2022 can also be averaged together. It should be understood that the duration of various phases illustrated in the timing diagrams of FIGS. 20A-20B, e.g., touch and force capture 2020, data transfer 2006, algorithm 2008, idle 2010, etc. are not necessarily drawn to scale and are provided for the purposes of illustration.

Figure 21:
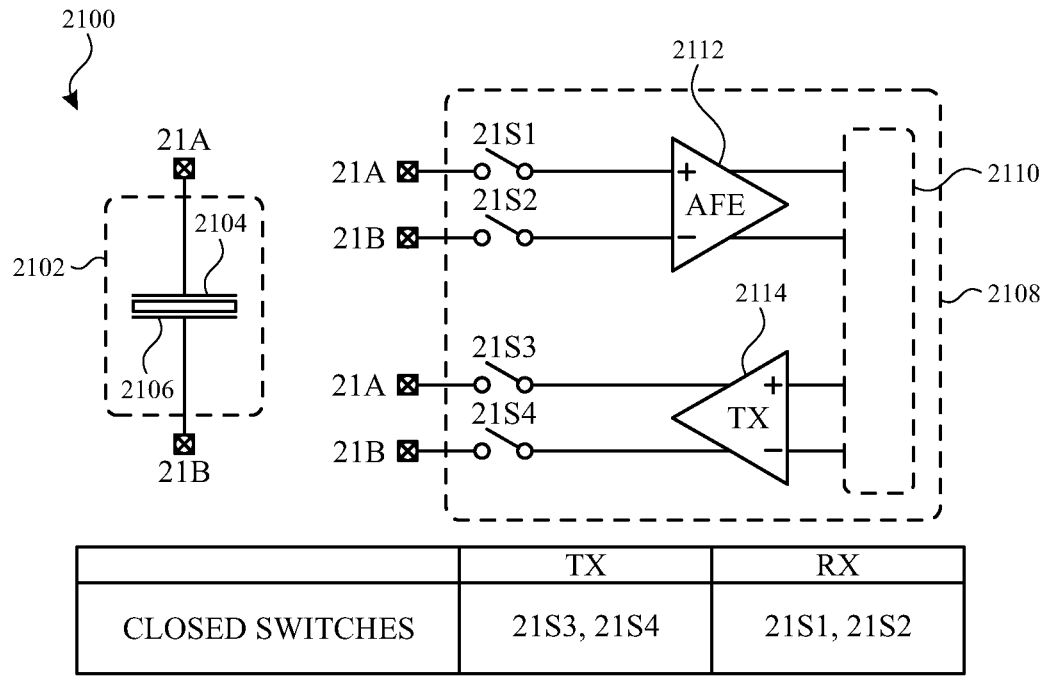
FIGS. 21-27 illustrate exemplary switching configurations for acoustic touch and force sensing systems according to examples of the disclosure.

FIG. 21 illustrates an exemplary switching configuration 2100 for an acoustic touch and force sensing system according to examples of the disclosure. Transducer 2102 can include a pair of electrodes (e.g., electrodes 2104 and 2106) disposed on opposing sides of the transducer that can be used to both drive transducer 2102 and to receive electrical signals generated by transducer 2102 (e.g., in response to a received acoustic signal). In some examples, one of the two electrodes can act as a common electrode (e.g., electrode 2106), and the second of the two electrodes can act as both the drive and sense electrode (e.g., electrode 2104) for the transducer. In some examples, a differential drive and sense scheme can be used by differential driving electrodes 2014 and 2016 and differentially receiving from electrodes 2014 and 2016. Electrode 2104 and electrode 2106 can be connected to touch and force control and readout circuitry 2108 for acoustic touch and force sensing. Touch and force control and readout circuitry 2108 can include analog front end (AFE) amplifier 2112, the output of which can be connected to sense circuitry 2110. Outputs from sense circuitry 2110 can be connected to the inputs of transmitter 2114. In some examples, electrode 2104 and electrode 2106 can be connected to the input terminals of AFE amplifier 2112 via switches 2151 and 21S2, respectively (as indicated by connection labels 21A and 21B). In addition, electrode 2104 and electrode 2106 can be connected to the outputs of transmitter 2114 via switches 21S3 and 21S4, respectively (as also indicated by connection labels 21A and 21B). During a receive (Rx) function, switches 21S1 and 21S2 can be closed, and switches 21S3 and 21S4 can be open. The switch configuration during the Rx function can allow the AFE 2112 to receive electrical signals from the electrodes 2104 and 2106 of transducer 2102. During a transmit (Tx) function switches 21S3 and 21S4 can be closed, and switches 21S1 and 21S2 can be open. The switch configuration during the Tx function can allow transmitter 2114 to drive the electrodes 2104 and 2106 of transducer 2102 to generate an acoustic wave. Notably, exemplary switching configuration 2100 is compatible with the modes of operation illustrated in FIGS. 19A-20B. In some examples, sense circuitry 2110 can include one or more of digital-to-analog converters (DAC) 402A, filter 402B, gain and offset correction circuit 412, demodulation circuit 414, filter 416, analog-to-digital converter (ADC) 418, input/output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 2110 can be on a different chip from the AFE 2112, transmitter 2114, and switches 21S1-21S4. In some examples, inputs of AFE amplifier 2112 can be connected to a first transducer for receiving, and the outputs of transmitter 2114 can be connected to a second transducer, different than the first transducer, for transmitting. In some examples, the touch and force control and readout 2108 can be included on a silicon chip. In some examples, the transmit circuitry can be designed to drive higher voltages (or currents) to produce sufficient motion in the transducer to generate an acoustic wave in the surface of a device, and the receive circuitry can be designed for receiving smaller amplitude reflected energy. Accordingly, in some examples, the transmit circuitry and receive circuitry can be included on different silicon chips to avoid interference with the operation of the receive circuitry by the transmit circuitry.

Figure 22:
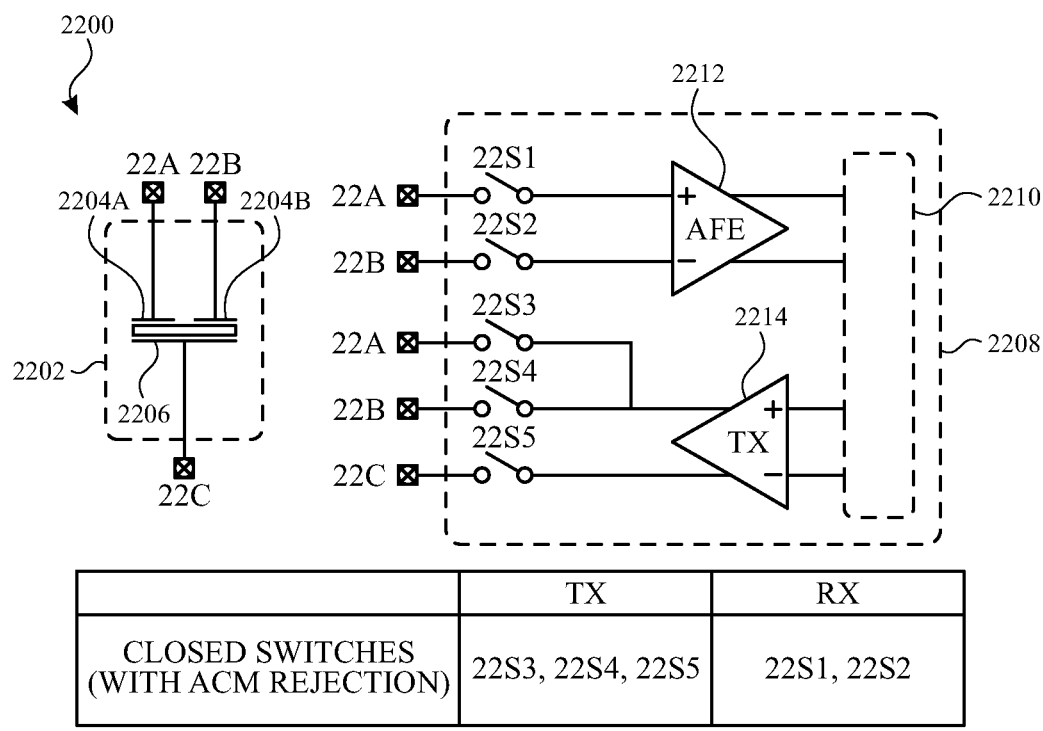

FIG. 22 illustrates an exemplary switching configuration 2200 for an acoustic touch and force sensing system according to examples of the disclosure. Transducer 2202 can include a pair of electrodes (e.g., electrodes 2204A and 2204B) disposed on one side of the transducer and a second electrode (e.g., common electrode 2206) disposed on the opposite side of the transducer. In some examples, the electrode configuration of transducer 2202 can correspond to the electrode configuration illustrated in FIGS. 10A-10B and 11A above. Electrodes 2204A, 2204B, and 2206 can be connected to touch and force control and readout circuitry 2208 for acoustic touch and force sensing. Touch and force control and readout circuitry 2208 can include analog front end (AFE) amplifier 2212, the output of which can be connected to sense circuitry 2210. Outputs from sense circuitry 2210 can be connected to the inputs of transmitter 2214. In some examples, electrodes 2204A and 2204B can be connected to the input terminals of AFE amplifier 2212 via switches 22S1 and 22S2, respectively (as indicated by connection labels 22A and 22B). In addition, electrode 2204A, electrode 2204B, and electrode 2206 can be connected to the outputs of transmitter 2214 via switches 22S3, 23S4, and 22S5, respectively (as indicated by connection labels 22A, 22B, and 22C). In the illustrated configuration, electrode 2204A and electrode 2204B (both on the same side of transducer 2302) can be connected from the same output terminal of transmitter 2214 (as indicated by connection labels 22A and 22B). During a receive (Rx) function, switches 22S1 and 22S2 can be closed, and switches 22S3, 22S4, and 22S5 can be open. In some examples, electrode 2206 can be left floating by the switch configuration during the Rx function, which can correspond to the analog common mode rejection described in FIGS. 14A-14C above. The switch configuration during the Rx function can allow the AFE 2212 to receive electrical signals from the electrodes 2204A and 2204B of transducer 2202. During a transmit (Tx) function switches 22S3, 22S4, and 22S5 can be closed, and switches 22S1 and 22S2 can be open. The switch configuration during the Tx function can allow transmitter 2214 to drive the electrodes 2204A, 2204B, and 2206 of transducer 2202 to create a potential across the transducer and generate an acoustic wave. Notably, exemplary switching configuration 2200 is compatible with the modes of operation illustrated in FIGS. 19A-20B. In some examples, sense circuitry 2210 can include one or more of digital-to-analog converters (DAC) 402A, filter 402B, gain and offset correction circuit 412, demodulation circuit 414, filter 416, analog-to-digital converter (ADC) 418, input/output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 2210 can be on a different chip from AFE 2212, transmitter 2214, and switches 22S1-22S5. In some examples, inputs of AFE amplifier 2212 can be connected to a first transducer for receiving, and the outputs of transmitter 2214 can be connected to a second transducer, different than the first transducer, for transmitting. In some examples, the touch and force control and readout circuitry 2208 can be included on a silicon chip. In some examples, the transmit circuitry can be designed to drive higher voltages (or currents) to produce sufficient motion in the transducer to generate an acoustic wave in the surface of a device, and the receive circuitry can be designed for receiving smaller amplitude reflected energy. Accordingly, in some examples, transmit circuitry and receive circuitry can be included on different silicon chips to avoid interference with the operation of the receive circuitry by the transmit circuitry.

Figure 23:
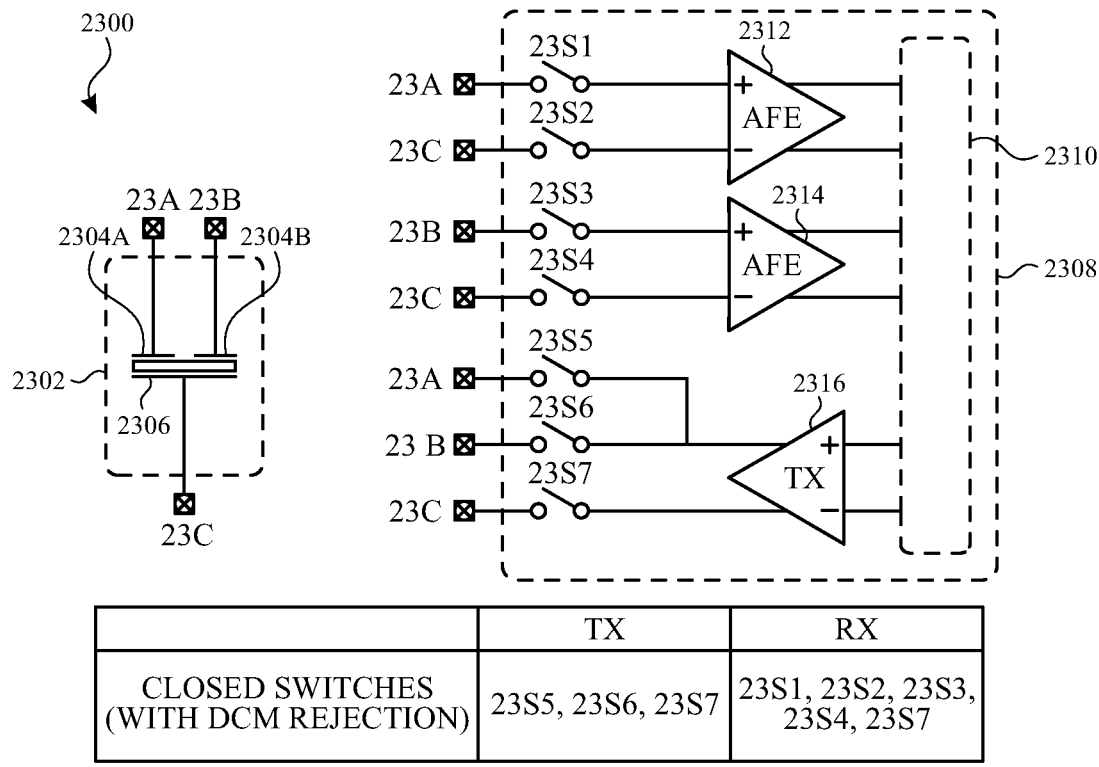

FIG. 23 illustrates an exemplary switching configuration 2300 for an acoustic touch and force sensing system according to examples of the disclosure. Transducer 2302 can include a pair of electrodes (e.g., electrodes 2304A and 2304B) disposed on one side of the transducer and a second electrode (e.g., common electrode 2306) disposed on the opposite side of the transducer. In some examples, the electrode configuration of transducer 2302 can correspond to the electrode configuration illustrated in FIGS. 10A-10B and 11A above. Electrodes 2304A, 2304B, and 2306 can be connected to touch and force control and readout circuitry 2308 for acoustic touch and force sensing. Touch and force control and readout circuitry 2308 can include analog front end (AFE) amplifiers 2312 and 2314, the output of which can be connected to sense circuitry 2310. Outputs from sense circuitry 2310 can be connected to the inputs of transmitter 2316. In some examples, electrodes 2304A and electrode 2306 can be connected to the input terminals of AFE amplifier 2312 via switches 23S1 and 23S2, respectively (as indicated by connection labels 23A and 23C); and electrodes 2304B and electrode 2306 can be connected to the input terminals of AFE amplifier 2314 via switches 23S3 and 23S4, respectively (as indicated by connection labels 23B and 23C). In addition, electrodes 2304A, electrodes 2304B, and electrode 2306 can be connected to the outputs of transmitter 2316 via switches 23S5, 23S6, and 23S7, respectively (as indicated by connection labels 23A, 23B, and 23C). It should be understood that, while not illustrated, electrodes 2304A and 2304B can represent electrode configurations as described above with reference to FIGS. 9-14. In the illustrated configuration, electrodes 2304A and electrodes 2304B can be connected from the same output terminal of transmitter 2316 (as indicated by connection labels 23A and 23B). During a receive (Rx) function, switches 23S1, 23S2, 23S3, 23S4, and 23S7 can be closed, and switches 23S5 and 23S6 can be open. The switch configuration during the Rx function can allow the AFE 2212 to receive electrical signals from the electrodes 2304A, 2304B, and 2306 of transducer 2302, and allow transmitter 2316 to drive electrode 2306 of transducer 2302 to ground or another reference potential. Accordingly, unlike the configuration in FIG. 22, each of the electrodes 2304A and 2304B in FIG. 23 can be read with a common mode signal component included in the measured signal. In some examples, the common mode component can be removed in the digital domain. During a transmit (Tx) function switches 23S5, 23S6, and 23S7 can be closed, and switches 23S1, 23S2, 23S3, and 23S4 can be open. The switch configuration during the Tx function can allow transmitter 2214 to drive the electrodes 2304A, 2304B, and 2306 of transducer 2302 to create a potential across the transducer and generate an acoustic wave. In some examples, the output of switch 23S7 can be tied to ground (e.g., common electrode 2306 can be tied to ground as described above with reference to FIG. 14A). Notably, exemplary switching configuration 2300 is compatible with the modes of operation illustrated in FIGS. 19A—In some examples, sense circuitry 2310 can include one or more of digital-to-analog converters (DAC) 402A, filter 402B, gain and offset correction circuit 412, demodulation circuit 414, filter 416, analog-to-digital converter (ADC) 418, input/output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 2310 can be on a different chip from AFE 2312, AFE 2314, transmitter 2316, and switches 23S1-23S7. In some examples, inputs of AFE amplifiers 2312 and 2314 can be connected to a first transducer for receiving, and the outputs of transmitter 2316 can be connected to a second transducer, different than the first transducer, for transmitting. In some examples, the touch and force control and readout circuitry 2308 can be included on a silicon chip. In some examples, the transmit circuitry can be designed to drive higher voltages (or currents) to produce sufficient motion in the transducer to generate an acoustic wave in the surface of a device, and the receive circuitry can be designed for receiving smaller amplitude reflected energy. Accordingly, in some examples, the transmit circuitry and receive circuitry can be included on different silicon chips to avoid interference with the operation of the receive circuitry by the transmit circuitry.

Figure 24:
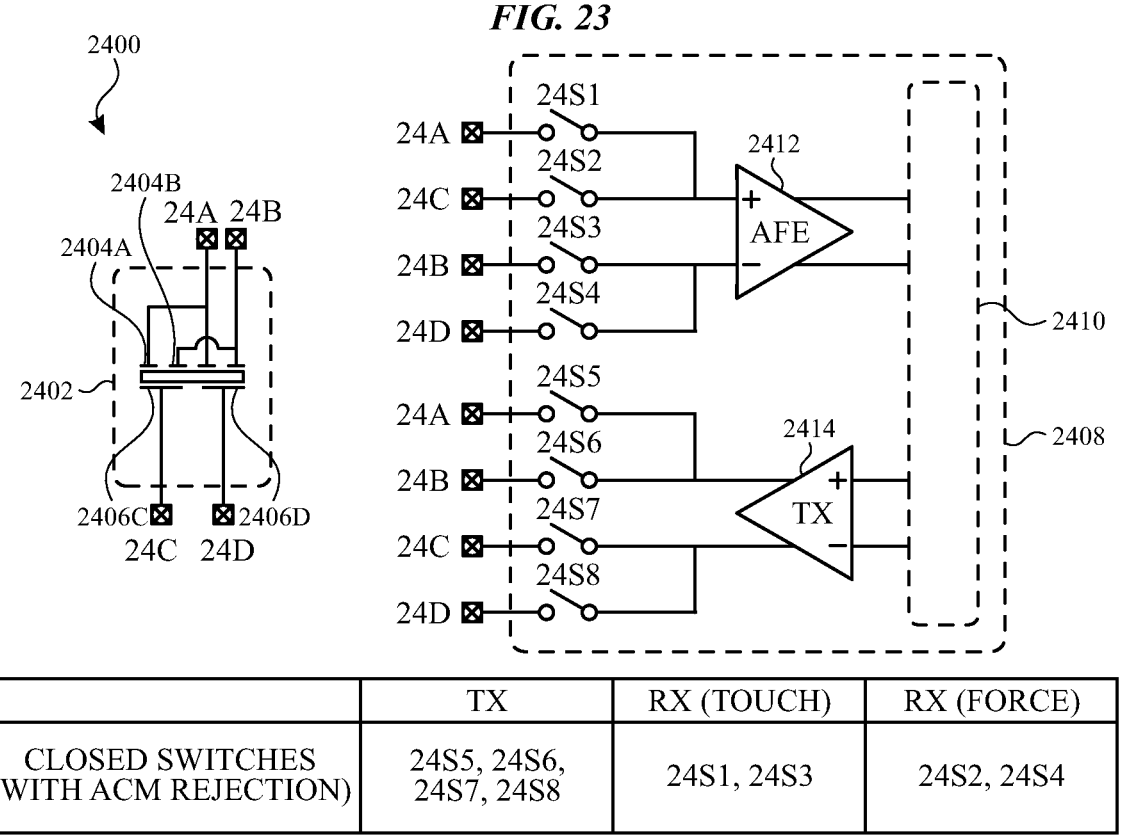

FIG. 24 illustrates an exemplary switching configuration 2400 for an acoustic touch and force sensing system according to examples of the disclosure. Transducer 2402 can include two sets of two electrode differential patterns, electrodes 2404A and 2404B on a first side of the transducer and electrodes 2406C and 2406D on a second side of the transducer. As illustrated, the first side electrodes 2404A can be connected (as indicated by connection label 24A), and first side electrodes 2404B can be connected (as indicated by connection label 24B). It should be understood that, electrodes 2404A, 2404B, 2406C, and 2406D can correspond to the electrode configuration illustrated in FIG. 13A. It should also be understood that the switching scheme illustrated in FIG. 24 can be adapted for different numbers of electrodes on opposing sides of the transducer without departing from the scope of the present disclosure. As illustrated electrodes 2406C/2406D can have a larger electrode size and a corresponding larger electrode pitch, leading each of the electrode pairs to have a different corresponding spatial frequency as described and illustrated in FIGS. 13A and 13B. In some examples, the spatial frequencies corresponding to electrodes 2404A/2404B can be higher than the spatial frequencies corresponding electrodes 2406C/2406D. Electrodes 2404A, 2404B, 2406C, and 2406D can be connected to touch and force control and readout circuitry 2408 for acoustic touch and force sensing. Touch and force control and readout circuitry 2408 can include analog front end (AFE) amplifier 2412, the output of which can be connected to sense circuitry 2410. Outputs from sense circuitry 2410 can be connected to the inputs of transmitter 2414. In some examples, electrodes 2404A and electrode 2406C can both be connected to a first input terminal of AFE amplifier 2412 via switches 24S1 and 24S2, respectively (as indicated by connection labels 2404A and 24C). Electrodes 2404B and electrode 2406D can both be connected to a second input terminal of AFE amplifier 2412 via switches 24S3 and 24S4, respectively (as indicated by connection labels 24B and 24D). In addition, electrodes 2404A and electrodes 2404B can both be connected to a first output terminal of transmitter 2414 via switches 24S5 and 24S6, respectively (as indicated by connection labels 24A and 24B). Electrodes 2406C and electrodes 2406D can both be connected to a second output terminal of transmitter 2414 via switches 24S7 and 24S8, respectively (as indicated by connection labels 24C and 24D). During a touch receive (Rx) function, switches 24S1 and 24S3 can be closed, and switches 24S2, 24S4, 24S5, 24S6, 24S7, and 24S8 can be open. The switch configuration during the touch Rx function can allow the AFE 2412 to receive electrical signals from the electrodes 2404A and 2406B of transducer 2402. At the same time, electrodes 2406C and 2406D can be left floating for accomplishing a common mode rejection function as described with regard to FIGS. 14A-14C above. During a force receive (Rx) function, switches 24S2 and 24S4 can be closed, and switches 24S1, 24S3, 24S5, 24S6, 24S7, and 24S8 can be open. The switch configuration during the force Rx function can allow the AFE 2412 to receive electrical signals from the electrodes 2406C and 2406D of transducer 2402. At the same time, electrodes 2406A and 2406B can be left floating for accomplishing a common mode rejection function as described with regard to FIGS. 14A-14C above. During a transmit (Tx) function switches 24S5, 24S6, 24S7, and 24S8 can be closed, and switches 24S1, 24S2, 24S3, and 24S4 can be open. The switch configuration during the Tx function can allow transmitter 2414 to drive the electrodes 2404A and 2404B (one a first side of the transducer 2402) and electrodes 2406C and 2406D (on the opposite side of transducer 2402) to create a potential across the transducer and generate an acoustic wave. Notably, exemplary switching configuration 2400 is compatible with the modes of operation illustrated in FIGS. 19A—In some examples, sense circuitry 2410 can include one or more of digital-to-analog converters (DAC) 402A, filter 402B, gain and offset correction circuit 412, demodulation circuit 414, filter 416, analog-to-digital converter (ADC) 418, input/output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 2410 can be on a different chip from AFE 2412, transmitter 2414, and switches 24S1-24S8. In some examples, inputs of AFE amplifier 2412 can be connected to a first transducer for receiving, and the outputs of transmitter 2414 can be connected to a second transducer, different than the first transducer, for transmitting. In some examples, the touch and force control and readout circuitry 2408 can be included on a silicon chip. In some examples, the transmit circuitry can be designed to drive higher voltages (or currents) to produce sufficient motion in the transducer to generate an acoustic wave in the surface of a device, and the receive circuitry can be designed for receiving smaller amplitude reflected energy. Accordingly, in some examples, the transmit circuitry and receive circuitry can be included on different silicon chips to avoid interference with the operation of the receive circuitry by the transmit circuitry.

Figure 25:
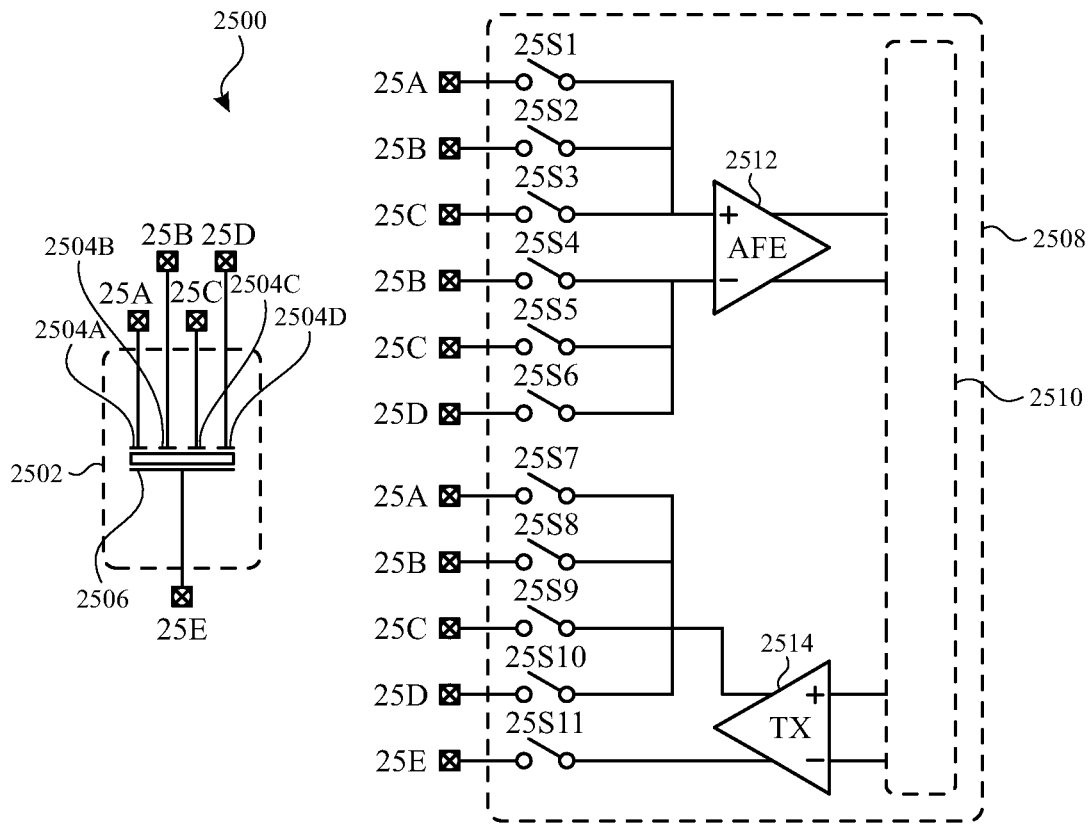

FIG. 25 illustrates an exemplary switching configuration 2500 for an acoustic touch and force sensing system according to examples of the disclosure. Transducer 2502 can include a four spatial differential electrode configuration with electrodes 2504A-2504D disposed on a first side of the transducer and common electrode 2406 disposed on a second side of the transducer. It should be recognizable that the four spatial differential electrode configuration illustrated in FIG. 25 can correspond to the configuration described above with reference to FIG. 11B. Electrodes 2504A, 2504B, 2504C, 2504D, and 2506 can be connected to touch and force control and readout circuitry 2508 for acoustic touch and force sensing. Touch and force control and readout circuitry 2508 can include analog front end (AFE) amplifier 2512, the output of which can be connected to sense circuitry 2510. Outputs from sense circuitry 2510 can be connected to the inputs of transmitter 2514. In some examples, electrodes 2504A, 2504B, and 2504C can be connected to a first input terminal of AFE amplifier 2512 via switches 25S1, 25S2, and 25S3, respectively (as indicated by connection labels 25A-25C). Electrodes 2504B, 2504C, and 2504D can be connected to a second input terminal of AFE amplifier 2512 via switches 25S5, and 25S6, respectively (as indicated by connection labels 25B-25D). In addition, electrodes 2504A, 2504B, 2504C, and 2504D can be connected to a first output terminal of transmitter 2514 via switches 25S7, 25S8, 25S9, and 25S10, respectively (as indicated by connection labels 25A-25D). Electrode 2506 can be connected to a second output terminal of transmitter 2514 via switch 25S11 (as indicated by connection label 25E). It should be understood that the switch scheme of FIG. 25 can be adapted to different electrode configurations, including those disclosed in FIGS. 13A-13B, without departing from the scope of the present disclosure. During a receive (Rx) touch function, switches 25S1, 25S3, 25S4, and can be closed, and switches 25S2, 25S5, 25S7, 25S8, 25S9, 25S10, and 25S11 can be open. The switch configuration during the touch Rx function can allow the AFE 2512 to receive electrical signals from the electrodes 2504A and 2504C at a first terminal of AFE 2512 and to receive electrical signals from electrodes 2504B and 2504D at a second terminal of AFE 2512. In the touch measurement mode, differential measurements are thus taken between adjacent electrodes, which can correspond to a first spatial frequency. During a force receive (Rx) function, switches 25S1, 25S2, 25S5, and 25S6 can be closed, and switches 25S3, 25S4, 25S7, 25S9, 25S10, and 25S11 can be open. The switch configuration during the force Rx function can allow the AFE 2512 to receive electrical signals from the electrodes 2504A and 2504B at a first terminal of AFE 2512 and to receive electrical signals from electrodes 2504C and 2504D at a second terminal of AFE 2512. In some examples, in the force Rx configuration, the electrodes can be measured with a lower pitch because differential measurements are taken between adjacent pairs of electrodes rather than adjacent individual electrodes as shown in the touch Rx configuration above. Thus, the differential measurements in the force Rx configuration can correspond to a second spatial frequency lower than the first spatial frequency. It should be also understood using a lower spatial frequency for the touch Rx and higher spatial frequency for force Rx can also be done without departing from the scope of the present disclosure. In both the force Rx and touch Rx configurations described above, electrodes 2506 can be left floating for accomplishing a common mode rejection function as described with regard to FIGS. 14A-14C above. During a transmit (Tx) function switches 25S7, 25S8, 25S9, 25S10, and 25S11 can be closed, and switches 25S1, 25S2, 25S3, 25S4, 25S5, and 25S6 can be open. The switch configuration during the Tx function can allow transmitter 2514 to drive the electrodes 2504A, 2504B, 2504C, 2504D, and 2206 of transducer 2502 to create a potential across the transducer and generate an acoustic wave. Notably, exemplary switching configuration 2500 is compatible with the modes of operation illustrated in FIGS. 19A-20B. In some examples, sense circuitry 2510 can include one or more of digital-to-analog converters (DAC) 402A, filter 402B, gain and offset correction circuit 412, demodulation circuit 414, filter 416, analog-to-digital converter (ADC) 418, input/ output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 2510 can be on a different chip from AFE 2512, transmitter 2514, and switches 25S1-25S11. In some examples, inputs of AFE amplifier 2512 can be connected to a first transducer for receiving, and the outputs of transmitter 2514 can be connected to a second transducer, different than the first transducer, for transmitting. In some examples, the touch and force control and readout circuitry 2508 can be included on a silicon chip. In some examples, the transmit circuitry can be designed to drive higher voltages (or currents) to produce sufficient motion in the transducer to generate an acoustic wave in the surface of a device, and the receive circuitry can be designed for receiving smaller amplitude reflected energy. Accordingly, in some examples, the transmit circuitry and receive circuitry can be included on different silicon chips to avoid interference with the operation of the receive circuitry by the transmit circuitry. In some examples, each of the four electrodes 2504A, 2504B, 2504C, and 2504D can be separately read by four analog front ends (e.g., as illustrated and described in more detail with regard to FIGS. 31A-31B below) to simultaneously measure the signals of each of the four electrodes.

Figure 26:
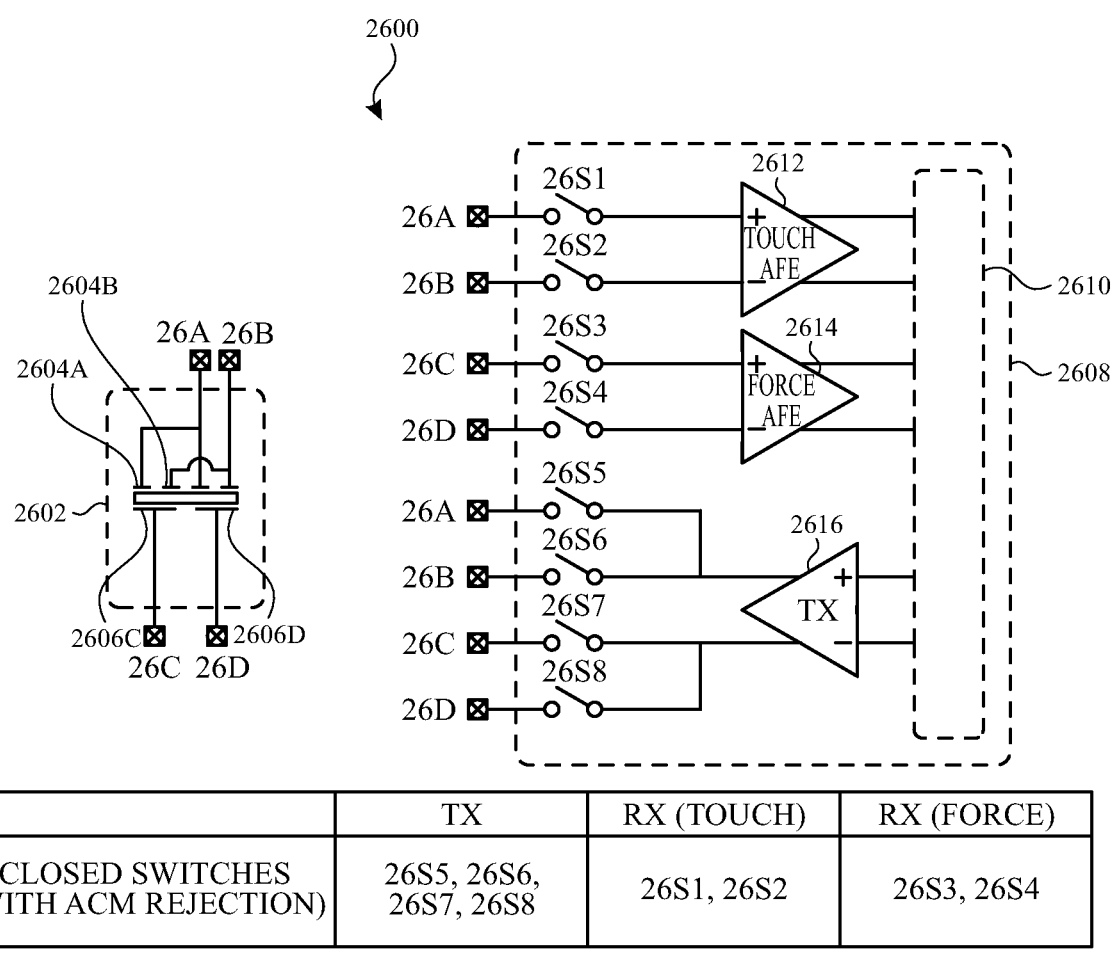

FIG. 26 illustrates an exemplary switching configuration 2600 for an acoustic touch and force sensing system according to examples of the disclosure. Transducer 2602 can include two sets of two electrode differential patterns, electrodes 2604A and 2604B on a first side of the transducer, and electrodes 2606C and 2606D on a second side of the transducer. As illustrated, the first side electrodes 2604A can be connected (as indicated by connection label 26A), and first side electrodes 2604B can be connected (as indicated by connection label 26B). It should be understood that the switch scheme of FIG. 25 can be adapted to different electrode configurations, including those disclosed in FIGS. 13A-13B, without departing from the scope of the present disclosure. As illustrated electrodes 2606C/2606D can have a larger electrode size and a corresponding larger electrode pitch, leading each of the electrode pairs to have a different corresponding spatial frequencies. In some examples, the spatial frequencies corresponding to electrodes 2604A/2604B can be higher than the spatial frequency corresponding to electrodes 2606C/2606D as illustrated in FIGS. 13A and 13B above. Electrodes 2604A, 2604B, 2606C, and 2606D can be connected to touch and force control and readout circuitry 2608 for acoustic touch and force sensing. Touch and force control and readout circuitry 2608 can include analog front end (AFE) amplifiers 2612 and 2614, the output of which can be connected to sense circuitry 2610. Outputs from sense circuitry 2610 can be connected to the inputs of transmitter 2616. In some examples, electrodes 2604A and 2604B can be connected to the input terminals of AFE amplifier 2612 via switches 26S1 and 26S2, respectively (as indicated by connection labels 26A-26B), and the outputs of electrodes 2604C and 2604D can be connected to the input terminals of AFE amplifier 2614 via switches 26S3 and 26S4, respectively (as indicated by connection labels 26C-26D). In addition, electrodes 2604A, 2604B, 2606C, and 2606D can be connected to the outputs of transmitter 2616 via switches 26S5, 26S6, 26S7, and 26S8, respectively (as indicated by connection labels 26A-26D). In the illustrated configuration, electrodes 2604A and 2604B can be connected from the same output terminal of transmitter 2616 (e.g., a first terminal) (as indicated by connection labels 26A-26B). In the illustrated configuration, electrodes 2606C and 2606D can be connected from the same output terminal of transmitter 2616 (e.g., a second terminal, different from the first terminal) (as indicated by connection labels 26C-26D). During a touch receive (Rx) function, switches 26S1 and 26S2 can be closed, and switches 26S3, 26S4, 26S5, 26S6, 26S7, and 26S8 can be open. The switch configuration during the touch Rx function can allow the touch AFE 2612 to receive electrical signals from the electrodes 2604A and 2604B of transducer 2602. During a force receive (Rx) function, switches 26S3 and 26S4 can be closed, and switches 26S1, 26S2, 26S5, 26S6, 26S7, and 26S8 can be open. The switch configuration during the force Rx function can allow the force AFE 2614 to receive electrical signals from the electrodes 2606C and 2606D of transducer 2602. As mentioned in various examples above, the electrodes that are not being read (e.g., 2606C and 2606D during the touch Rx and 2606A and 2606B during the force Rx) can be left floating to allow for common mode rejection as described above with regard to FIGS. 14A-14C. During a transmit (Tx) function switches 26S5, 26S6, 26S7, and 26S8 can be closed, and switches 26S1, 26S2, 26S3, and 26S4 can be open. The switch configuration during the Tx function can allow transmitter 2616 to drive the electrodes 2604A, 2604B, 2606C, and 2606D of transducer 2602 to create a potential across the transducer 2602 and generate an acoustic wave. Notably, exemplary switching configuration 2600 is compatible with the modes of operation illustrated in FIGS. 19A-20B. In some examples, sense circuitry 2610 can include one or more of digital-to-analog converters (DAC) 402A, filter 402B, gain and offset correction circuit 412, demodulation circuit 414, filter 416, analog-to-digital converter (ADC) 418, input/output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 2610 can be on a different chip from touch AFE 2612, AFE2614, transmitter 2616, and switches 26S1-21S8. In some examples, inputs of AFE amplifiers 2612 and 2614 can be connected to a first transducer for receiving, and the outputs of transmitter 2616 can be connected to a second transducer, different than the first transducer, for transmitting. In some examples, the touch and force control and readout circuitry 2608 can be included on a silicon chip. In some examples, the transmit circuitry can be designed to drive higher voltages (or currents) to produce sufficient motion in the transducer to generate an acoustic wave in the surface of a device, and the receive circuitry can be designed for receiving smaller amplitude reflected energy. Accordingly, in some examples, the transmit circuitry and receive circuitry can be included on different silicon chips to avoid interference with the operation of the receive circuitry by the transmit circuitry.

Figure 27:
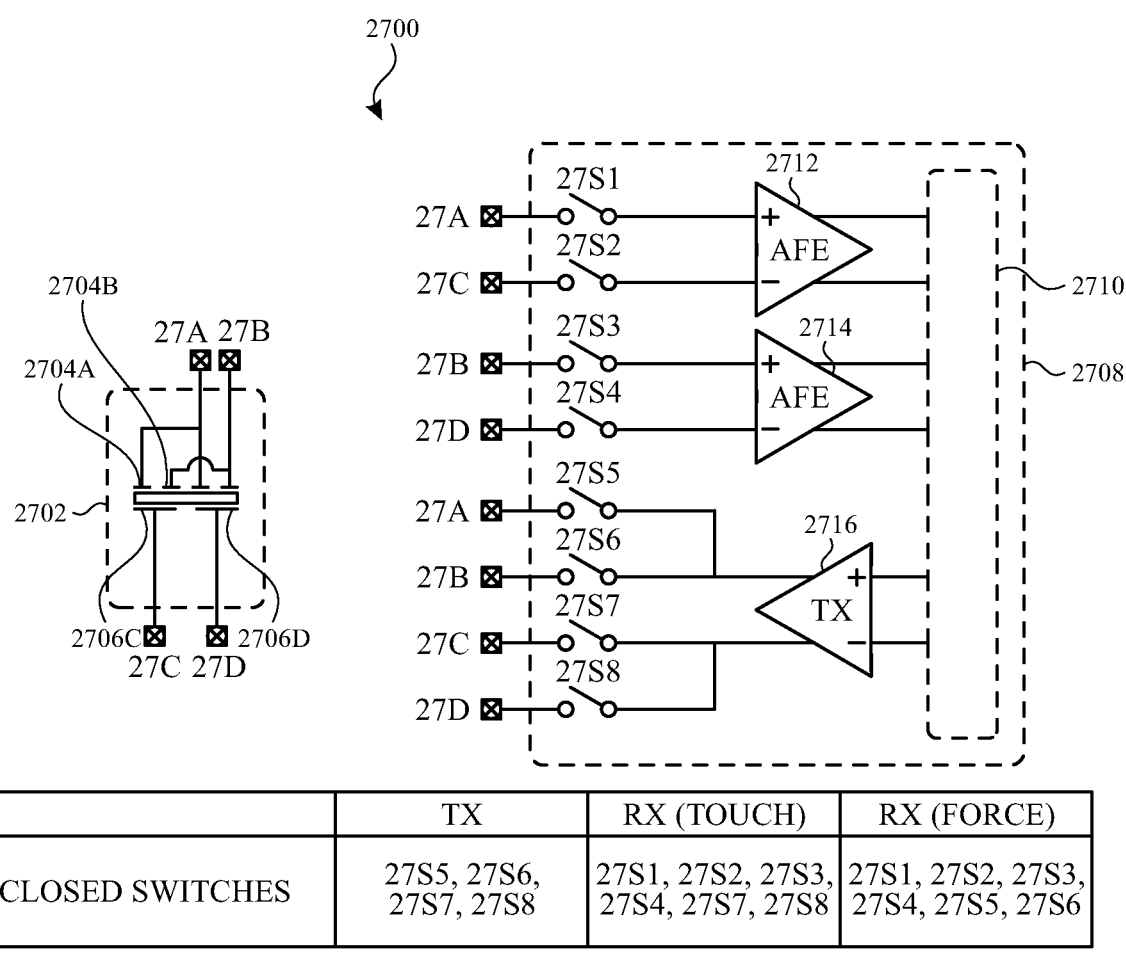

FIG. 27 illustrates an exemplary switching configuration 2700 for an acoustic touch and force sensing system according to examples of the disclosure. Transducer 2702 can include two sets of two electrode differential patterns, electrodes 2704A and 2704B on a first side of the transducer, and electrodes 2706C and 2706D on a second side of the transducer. As illustrated, the first side electrodes 2704A can be connected (as indicated by connection label 27A), and first side electrodes 2704B can be connected (as indicated by connection label 27B). It should be understood that, while not illustrated, electrodes 2704A, 2704B, 2706C, and 2706D can represent electrode configurations as described above with reference to FIGS. 9-14. As illustrated electrodes 2706C/2706D can have a larger electrode size and a corresponding larger electrode pitch, leading each of the electrode pairs to have a different corresponding spatial frequency. In some examples, the spatial frequencies corresponding to electrodes 2704A/2704B can be higher than the spatial frequency corresponding to electrodes 2706C/2706D. Electrodes 2704A, 2704B, 2706C, and 2706D can be connected to touch and force control and readout circuitry 2708 for acoustic touch and force sensing. Touch and force control and readout circuitry 2708 can include analog front end (AFE) amplifiers 2712 and 2714, the output of which can be connected to sense circuitry 2710. The output of sense circuitry 2710 can be connected to the inputs of transmitter 2716. In some examples, electrodes 2704A and 2704C can be connected to the input terminals of AFE amplifier 2712 via switches 27S1 and 27S2, respectively (as indicated by connection labels 27A and 27C), and electrodes 2704B and 2704D can be connected to the input terminals of AFE amplifier 2714 via switches 27S3 and 27S4, respectively (as indicated by connection labels 27B and 27D). In addition, electrodes 2704A, 2704B, 2706C, and 2706D can be connected to the outputs of transmitter 2716 via switches 27S5, 27S6, 27S7, and 27S8, respectively (as indicated by connection labels 27A-27D). It should be understood that, while not illustrated, electrodes 2704A and 2704B can represent electrode configurations as described above with reference to FIGS. 9-14. In the illustrated configuration, electrodes 2704A and 2704B can be connected from the same output terminal of transmitter 2716 (e.g., a first terminal) (as indicated by connection labels 27A-27B). In the illustrated configuration, electrodes 2706C and 2706D can be connected from the same output terminal of transmitter 2716 (e.g., a second terminal, different from the first terminal) (as indicated by connection labels 27C-27D). During a touch receive (Rx) function, switches 27S1, 27S2, 27S3, 27S4, 27S7, and 27S8 can be closed, and switches 27S5 and 27S6 can be open. The switch configuration during the touch Rx function can allow the AFE 2712 to receive electrical signals from the electrodes 2704A and 2706C of transducer 2702, AFE 2714 to receive electrical signals from the electrodes 2704B and 2706D of transducer 2702, and transmitter 2716 to drive the electrodes 2706C and 2706D with a ground or reference potential for single ended measurement of electrodes 2706A and 2706B. During a force receive (Rx) function, switches 27S1, 27S2, 27S3, 27S4, 27S5, and 27S6 can be closed, and switches 27S7 and 27S8 can be open. The switch configuration during the force Rx function can allow the AFE 2714 to receive electrical signals from the electrodes 2704B and 2706D of transducer 2702, AFE 2714 to receive electrical signals from the electrodes 2704B and 2706D of transducer 2702, and transmitter 2716 to drive the electrodes 2704A and 2704B of transducer 2702 with ground or another reference potential for single ended measurement of electrodes 2704C and 2704D. During a transmit (Tx) function switches 27S5, 27S6, 27S7, and 27S8 can be closed, and switches 27S1, 27S2, 27S3, and 27S4 can be open. The switch configuration during the Tx function can allow transmitter 2716 to drive the electrodes 2704A, 2704B, 2706C, and 2706D of transducer 2702 to create an electric potential across the transducer 2702 and generate an acoustic wave. Notably, exemplary switching configuration 2700 is compatible with the modes of operation illustrated in FIGS. 19A-20B. In some examples, sense circuitry 2710 can include one or more of digital-to-analog converters (DAC) 402A, filter 402B, gain and offset correction circuit 412, demodulation circuit 414, filter 416, analog-to-digital converter (ADC) 418, input/output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 2710 can be on a different chip from AFE 2712, AFE 2714, transmitter 2716, and switches 27S1-27S8. In some examples, inputs of AFE amplifiers 2712 and 2714 can be connected to a first transducer for receiving, and the outputs of transmitter 2716 can be connected to a second transducer, different than the first transducer, for transmitting. In some examples, the touch and force control and readout circuitry 2708 can be included on a silicon chip. In some examples, the transmit circuitry can be designed to drive higher voltages (or currents) to produce sufficient motion in the transducer to generate an acoustic wave in the surface of a device, and the receive circuitry can be designed for receiving smaller amplitude reflected energy. Accordingly, in some examples, the transmit circuitry and receive circuitry can be included on different silicon chips to avoid interference with the operation of the receive circuitry by the transmit circuitry.

It should be understood that the common electrode described above with reference to FIGS. 21-23 and 25 (e.g., electrodes 2106, 2206, 2306, and 2506, respectively) can be floating during the receive (Rx) function to cancel out common mode signals (e.g., as described above with reference to electrode 1407 of FIGS. 14B and 14C).

FIGS. 28A-30B illustrate exemplary timing diagrams for acoustic touch and force sensing according to examples of the disclosure. As will be discussed in further detail below, the timing diagrams 29A-29B and 30A-30B below closely resemble the timing diagrams 19A-19B and 20A-20B above, respectively. The main difference between these diagrams is that the following timing diagrams are presented with quadrature spatial differential sensing in mind as described with regard to FIGS. 15A-18C above, where each touch Rx function includes a measurement of an in-phase touch measurement, and a quadrature touch measurement that can be used to overcome spatial nulls in acoustic differential sensing as described in detail in the disclosure above.

Figure 28A:
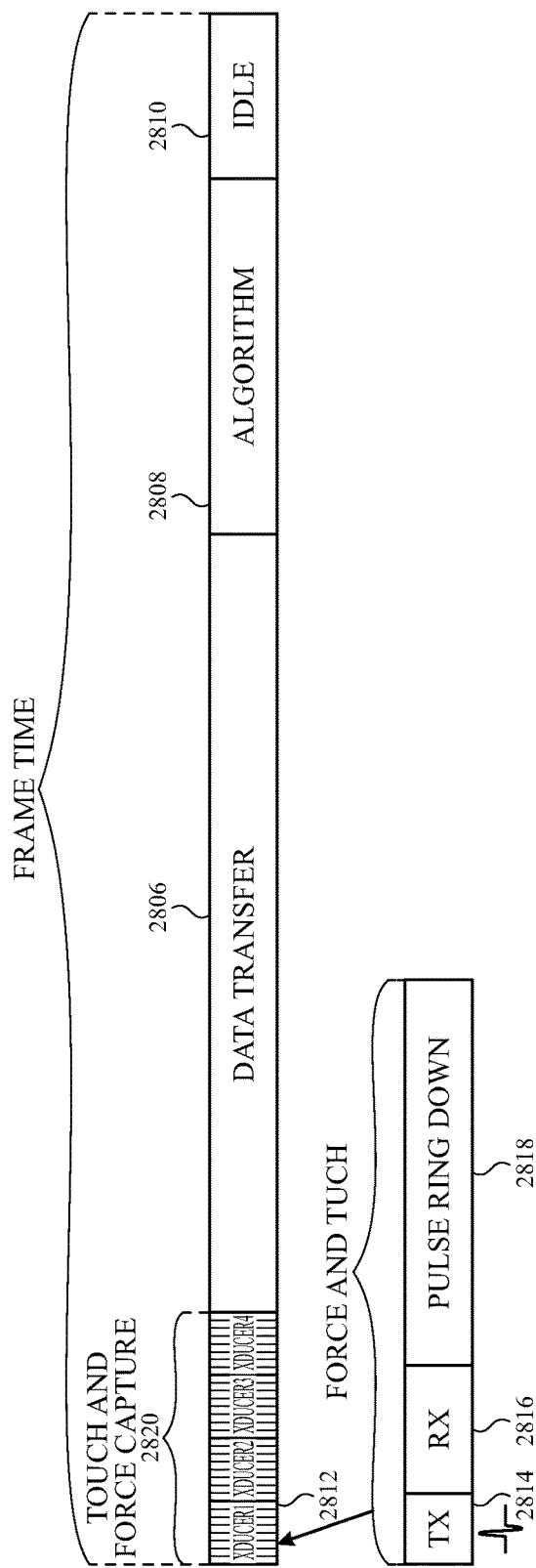
Figure 28B:
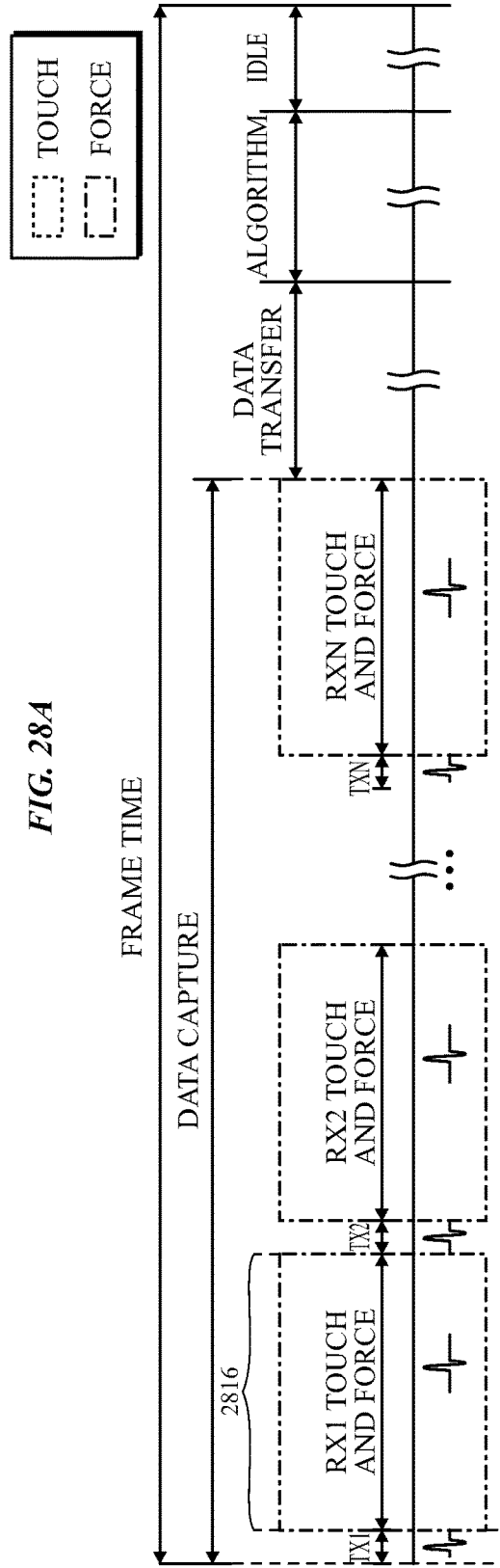

FIGS. 28A and 28B illustrate exemplary timing diagrams for a quadrature acoustic touch and force sensing mode of operation. Specifically, in this mode of operation the touch and force capture phases are combined. In other words, force and touch receive (Rx) functions 2816 can be performed simultaneously (e.g., not sequentially as described with reference to FIGS. 19A-20B above). This can be accomplished by including an analog front end (AFE) amplifier for each sensing electrode in an acoustic touch and force sensing system (e.g., as described in further detail below with reference to FIGS. 31A and 31B). These simultaneous force and touch receive (Rx) functions 2816 can be performed after a single transmit (Tx) function 2814. Because force and touch receive (Rx) functions 2816 can be performed simultaneously, the duration of a touch and force capture 2820 in any given frame can be shorter in duration than in the touch and force sensing modes illustrated in FIGS. 19A-20B. It should be understood that the duration of functions illustrated in the timing diagrams (e.g., data transfer 2808) are not necessarily drawn to scale. It should be understood that the duration of various phases illustrated in the timing diagrams of FIGS. 28A-28B, e.g., touch and force capture 2820, data transfer 2806, algorithm 2808, idle 2810, etc. are not necessarily drawn to scale and are provided for the purposes of illustration. In some examples, the data transfer period 2806, the algorithm period 2808, or both, can be pipelined or interleaved with the detection without departing from the scope of the present disclosure.

FIGS. 29A and 29B illustrate timing diagrams for a quadrature acoustic touch and force sensing mode of operation. Specifically, FIGS. 29A and 29B illustrate a touch capture phase 2902 followed by a force capture phase 2904 such that the two phases do not overlap in time. In some examples, the force capture phase 2904 can be followed by the touch capture phase 2902 (e.g., the force capture phase can be performed first). In some examples, the force capture phase 2904 can be shorter in duration than the touch capture phase 2902. As described above with regard to FIGS. 19A-19B each of touch capture phase 2902 and force capture phase 2904 can include multiple measurement time slices 2912 that can be used to obtain multiple repeated measurements for averaging. For example, each measurement timing slice 2912 can include a transmit (Tx) function 2914 (e.g., driving a signal onto the transducer to produce an acoustic wave) and a receive (Rx) function 2916 (e.g., receiving reflected signals corresponding to respective touch or force measurements). As will be described in more detail below regarding FIGS. 32-34, a quadrature acoustic touch sensing operation can utilize two separate measurements (e.g., in-phase and quadrature) to eliminate spatial nulls in the touch sensing measurements. In FIG. 29A, for each transducer XDUCER1-XDUCER4 during the touch capture phase, sixteen measurement time slices 2912 are shown. These sixteen total time slices shown can correspond to an averaging of eight measurements for in-phase measurement and eight measurements for quadrature measurement. Thus, while FIG. 29A illustrates sixteen measurement time slices 2912 for touch capture and eight measurement time slices force capture, it should be understood that eight sample averages are being illustrated for both the touch capture and force capture. However, it should be understood that the number of averages can be different from eight (e.g., as long as there are two or more measurements to average) without departing form the scope of the disclosure. Moreover, the number of averages used during touch capture phase 2902 can be different from the number of averages used during the force capture phase 2904. Furthermore, the sequence of the detection from multiple transducers can be arranged in a different order from the one illustrated without departing from the scope of the present disclosure. In addition, the sequence of detection of the multiple transducers can be changed in different frames without departing from the scope of the present disclosure. In yet other examples, a subset of the transducers can be sampled in each frame rather than sampling all of the transducers in every frame without departing from the scope of the present disclosure. In some examples, the measurement time slices 2912 during the touch capture phase 2902 can have a longer duration than measurement time slices 2912 during the force capture phase 2904 as illustrated in FIG. 29B. In some examples, the difference in durations of the touch capture phase 2902 and the force capture phase 2904 can relate to the difference in distance that an acoustic wave travels in the touch phase (e.g., across the cover glass 601 or 611 above) as compared to the distance that an acoustic wave travels in the force phase 2904 (e.g., through the thickness of deformable material 604 or 614 above). To illustrate this point, FIG. 29B illustrates an exemplary timing diagram where the respective receive durations (Rx1-RxN) for the force phase 2904 measurements are shorter than the respective receive duration (Rx1-RxN) for the touch phase 2902 measurements as described immediately above. As a result, FIG. 29B illustrates that the total duration for the force phase 2904 can be shorter than the total duration of the touch phase 2902 even when the same total numbers of transmit and receives are performed during each phase (e.g., when half as many averages are taken for touch capture 2902 and force capture 2904 in the case of quadrature touch measurements). It should be understood that the duration of various phases illustrated in the timing diagrams of FIGS. 29A-29B, e.g., touch capture 2902, force capture 2904, data transfer 2906, algorithm 2908, idle 2910, etc. are not necessarily drawn to scale and are provided for the purposes of illustration.

In some examples, force detections for each of the transducers XDUCER1-XDUCER4 can be performed simultaneously to reduce the total duration of force measurements during the force phase 2904. In such an example, each transducer XDUCER1-XDUCER4 can be provided with a transmit circuit to drive the transducer and an analog front end to receive the force measurement signals (e.g., from reflections in the deformable material 604 or 614 above coupled to each individual transducer e.g., 502A-502D above). In some examples, a single transmit circuit can be used to sequentially drive each individual transducer XDUCER1-XDUCER4 with a slight time delay between driving each transducer, and then simultaneously capture the force measurement signals at four analog front ends from each of the transducers XDUCER1-XDUCER4 to reduce the time for force detection.

Figure 30A:
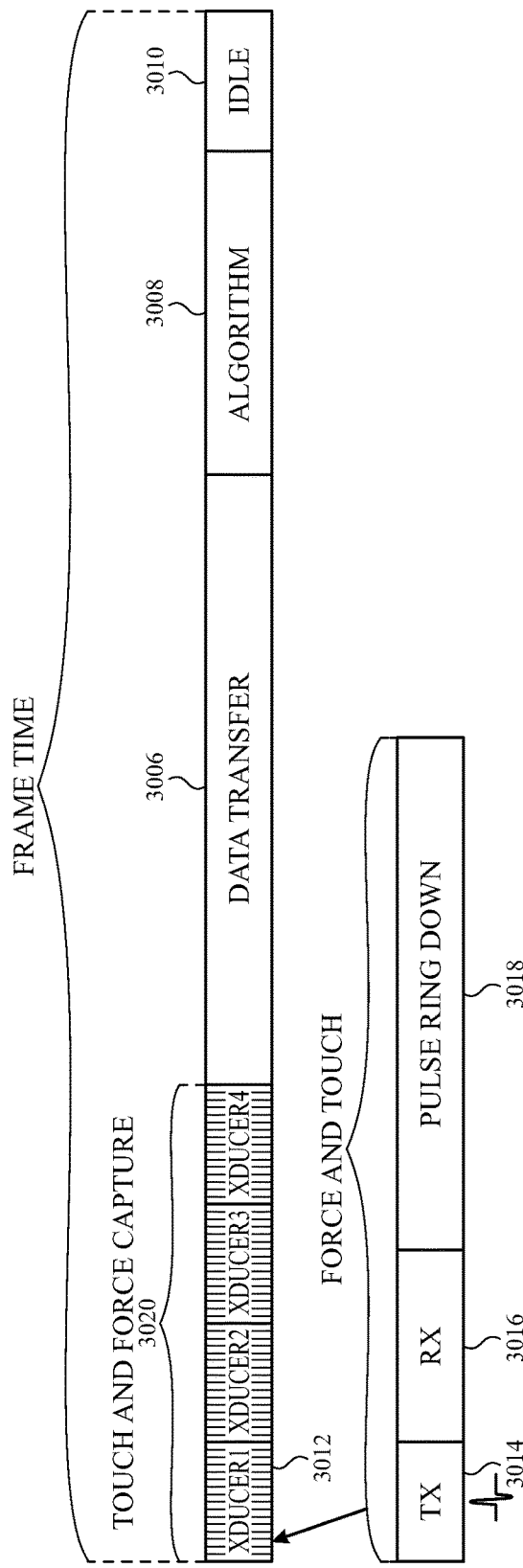
Figure 30B:
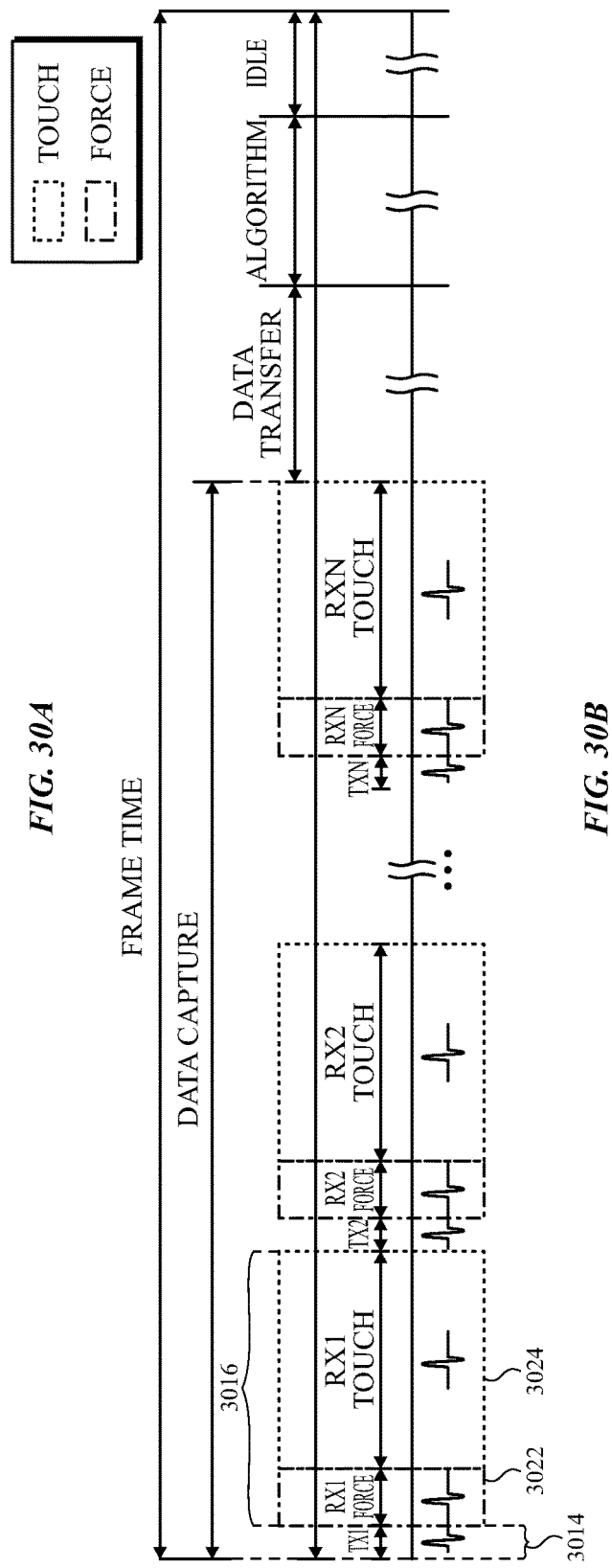

FIGS. 30A and 30B illustrate timing diagrams for a quadrature acoustic touch and force sensing mode of operation. Specifically, in the mode of operation illustrated in FIGS. 30A and 30B, the touch and force capture phases are combined into a touch and force capture phase 3020. This can be accomplished by performing a force receiving function 3022 and a touch receive function 3024 as illustrated in FIG. 30B during a single combined Rx function 3016 (e.g., as described above with reference to FIG. 20B). In some examples, the force and touch receive functions can be performed after a single transmit (Tx) function 3014 because force reflections arrive at the transducer and any ringing associated with the force measurement can settle before touch reflections associated with touch measurement are received at the transducer (e.g., as described with reference to FIG. 7 above). In some examples, the timing illustrated in FIGS. 30A and 30B can most preferably be used when signals for the force sensing occur during a dead zone for touch signals from touch sensing. In other words, depending on the geometries and material properties of the deformable material (e.g., 604 or 614 above) and cover glass (e.g., 601 and 611 above), the signals for touch capture and force capture can be temporally isolated in two distinct time windows (e.g., force receive 3022 and touch receive 3024) following a single Tx function 3014.

Similar to the description of FIGS. 19A-20B and 28A-29B above, FIG. 30A shows that the combined touch and force capture phase 3020 can include multiple measurement time slices 3012 that can be used to obtain multiple measurements for averaging. For example, each measurement timing slice 3012 can include a transmit (Tx) function 2914 (e.g., driving a signal onto the transducer to produce an acoustic wave) and a receive (Rx) function 2916 (e.g., receiving reflected signals corresponding to both touch and force measurements). The sixteen total measurement time slices 3012 shown in FIG. 30A can correspond to an averaging of eight measurements for in-phase measurement, eight measurements for quadrature measurement, and sixteen measurements for the force measurement (which can be taken regardless of whether the touch measurement is associated with in-phase or quadrature). As should be understood from the disclosure above, respective force measurements 3024 can be averaged together and respective touch measurements 3022 (grouped by in-phase and quadrature measurements) can also be averaged together. In some examples, the duration of force receive function 3022 can be shorter than touch receive function 3024. Although FIG. 30 described averaging of eight measurements for touch and sixteen measurements for force, it should be understood that averaging can used with a different number of measurements than eight, (e.g., as long as there are two or more measurements to average) without departing from the scope of the disclosure. Furthermore, the sequence of the detection from multiple transducers can be arranged in a different order from the one illustrated without departing from the scope of the present disclosure. In addition, the sequence of detection of the multiple transducers can be changed in different frames without departing from the scope of the present disclosure. In yet other examples, a subset of the transducers can be sampled in each frame rather than sampling all of the transducers in every frame without departing from the scope of the present disclosure. It should be understood that the duration of various phases illustrated in the timing diagrams of FIGS. 30A-30B, e.g., touch and force capture 3020, data transfer 3006, algorithm 3008, idle 3010, etc. are not necessarily drawn to scale and are provided for the purposes of illustration. In some examples, the data transfer period 3006, the algorithm period 3008, or both, can be pipelined or interleaved with the detection without departing from the scope of the present disclosure.

Figure 31A:
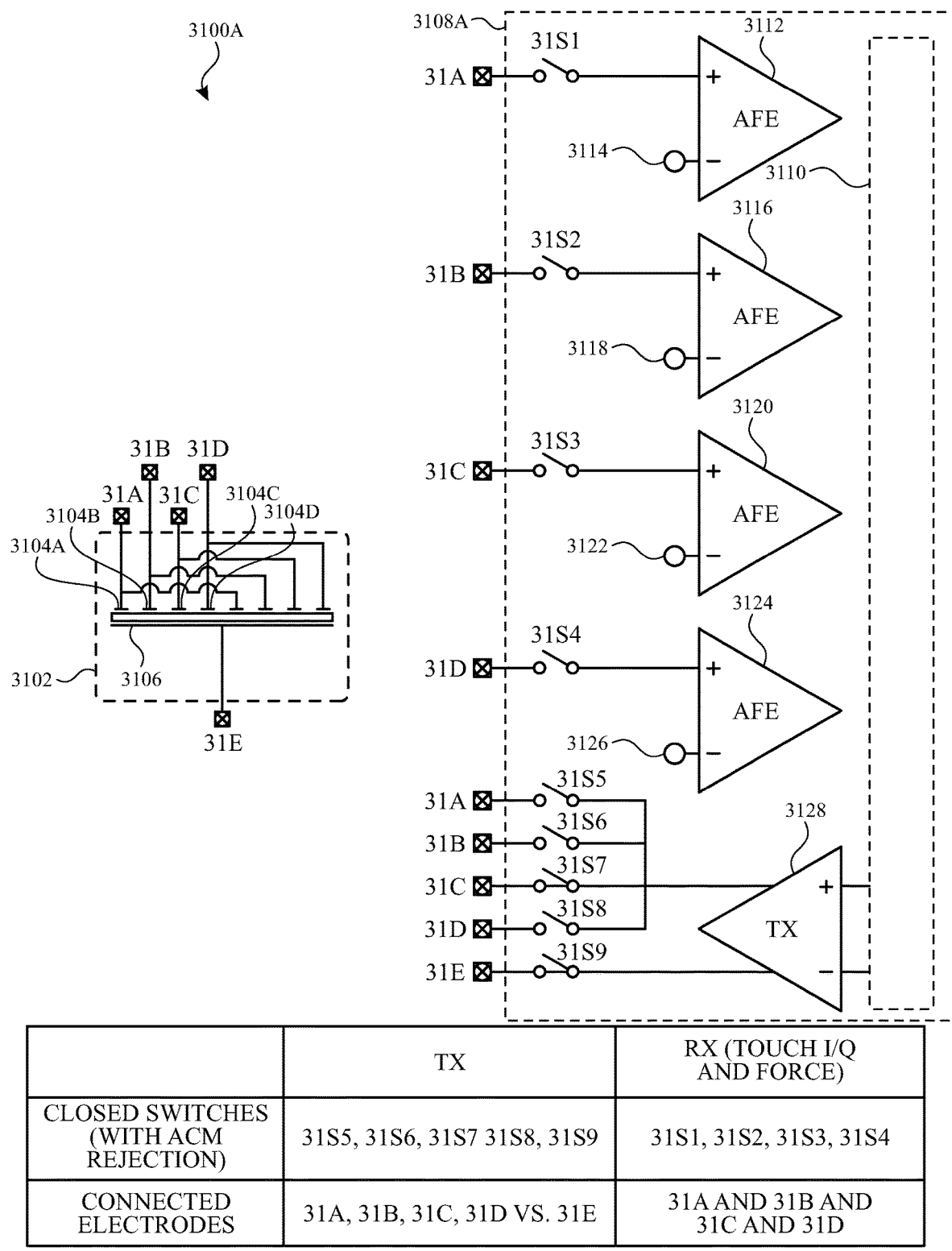
FIGS. 31A-34 illustrate exemplary switching configurations for quadrature acoustic touch and force sensing systems according to examples of the disclosure.
Figure 31B:
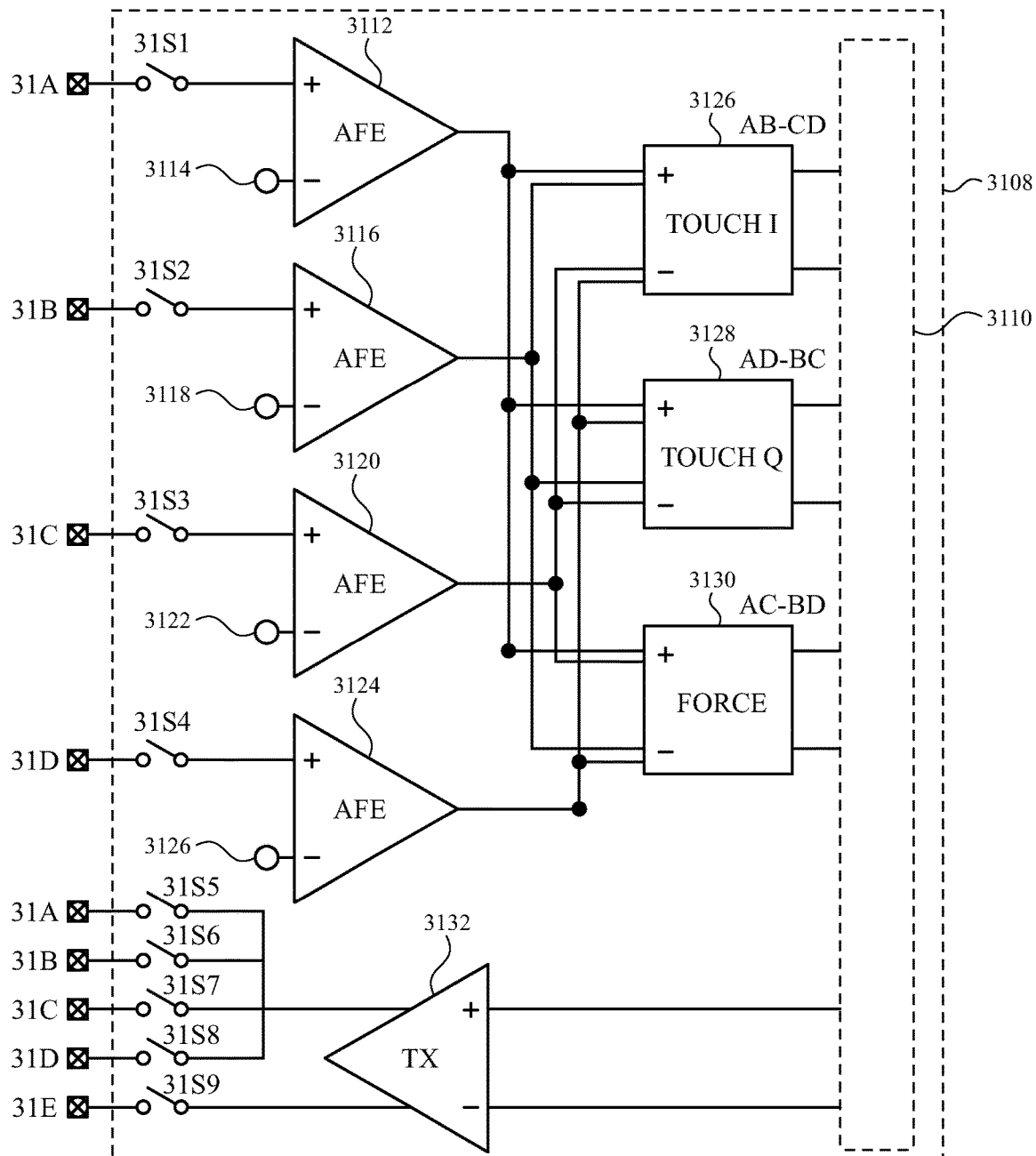
Figure 31C:
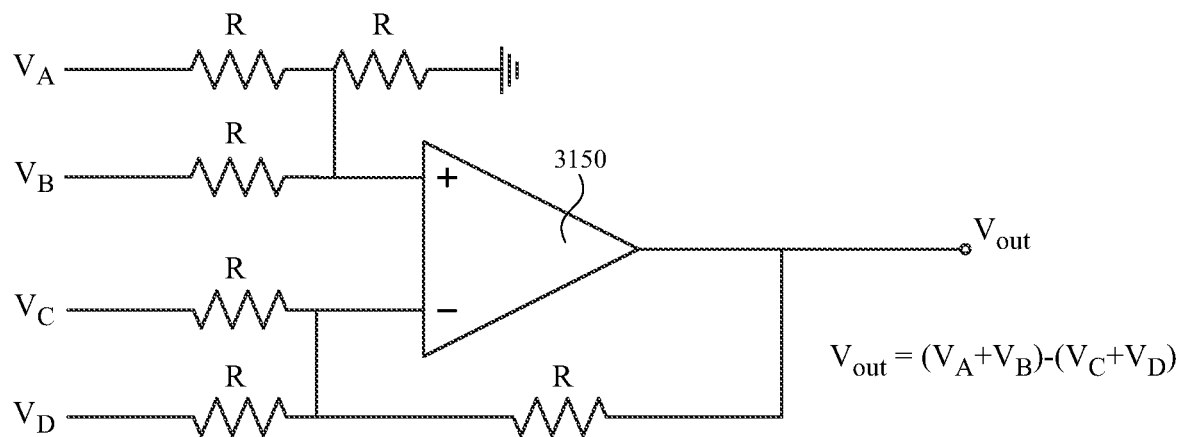

FIGS. 31A-31C illustrate exemplary switching configurations for quadrature acoustic touch and force sensing systems according to examples of the disclosure. Transducer 3102 illustrated in FIG. 31A can include a four spatial differential electrode configuration with electrodes 3104A-3104D disposed on a first side of the transducer and common electrode 3106 disposed on a second side of the transducer. It should be recognizable that the four spatial differential electrode configuration illustrated in FIG. 31 can correspond to the configuration described above with reference to FIG. 11B. The outputs/inputs of electrodes 3104A, 3104B, 3104C, 3104D, and 3106 can be connected to touch and force control and readout circuitry 3108A or 3108B of either FIG. 31A or 31B, respectively, for acoustic touch and force sensing.

Touch and force control and readout circuitry 3108A of FIG. 31A can include four analog front end (AFE) amplifiers 3112, 3116, 3120, and 3124, the output of which can be connected to sense circuitry 3110. The output of sense circuitry 3110 can be connected to the inputs of transmitter 3128. In some examples, electrode 3104A can be connected to a first input terminal of AFE amplifier 3112 via switch 31S1, the output of electrode 3104B can be connected to a first input terminal of AFE amplifier 3116 via switch 31S2, the output of electrode 3104C can be connected to a first input terminal of AFE amplifier 3120 via switch 31S3, and the output of electrode 3104D can be connected to a first input terminal of AFE amplifier 3124 via switch 3154 (as indicated by connection labels 31A-31D, respectively). The second terminal of AFE amplifiers 3112, 3116, 3120, and 3124 can each connected to ground or any desired reference voltage source. In addition, electrodes 3104A, 3104B, 3104C, and 3104D can be connected to a first output terminal of transmitter 3128 via switches 31S5, 31S6, 31S7, and 31S8, respectively (as indicated by connection labels 31A-31D). Electrode 3106 can be connected to a second output terminal of transmitter 3106 via switch 31S9 (as indicated by connection 31E). During a combined touch and force receive (Rx) function, switches 31S1, 31S2, 31S3, and 31S4 can be closed, and switches 31S5, 31S6, 31S7, 31S8, and 31S9 can be open. The switch configuration during the combined touch and force Rx function can allow each AFE 3112, 3116, 3120, and 3124 to receive a signal from electrodes 3104A, 3104B, 3104C, and 3104D, respectively. During a transmit (Tx) function switches 31S5, 31S6, 31S7, 31S8, and 31S9 can be closed, and switches 31S1, 31S2, 31S3, and 31S4 can be open. The switch configuration during the Tx function can allow transmitter 3128 to drive the electrodes 3104A, 3104B, 3104C, 3104D, and 3106 of transducer 2202 to create an electric potential across transducer 3102 and generate an acoustic wave. Notably, exemplary switching configuration 3100A is compatible with the mode of operation illustrated in FIGS. 28A-28B (e.g., the configuration that allows signals for in-phase touch, quadrature touch, and force to be sensed simultaneously). In some examples, sense circuitry 3110 can include one or more of digital-to-analog converters (DAC) 402A, filter 402B, gain and offset correction circuit 412, demodulation circuit 414, filter 416, analog-to-digital converter (ADC) 418, input/output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 3110 can be on a different chip from AFE 3112, AFE 3116, AFE 3120, AFE 3124, transmitter 3128, switches 31S1-31S9, and sources 3114, 3118, 3122, and 3126. In some examples, inputs of AFE amplifiers 3112, 3116, 3120, and 3124 can be connected to a first transducer for receiving, and the outputs of transmitter 3128 can be connected to a second transducer, different than the first transducer, for transmitting. In some examples, the transmit and receive circuitry 3110 can be included on a silicon chip. In some examples, the transmit circuitry can be designed to drive higher voltages (or currents) to produce sufficient motion in the transducer to generate an acoustic wave in the surface of a device, and the receive circuitry can be designed for receiving smaller amplitude reflected energy. Accordingly, in some examples, the transmit circuitry and receive circuitry can be included on different silicon chips to avoid interference with the operation of the receive circuitry by the transmit circuitry. In some examples, common electrode 3106 can be floating during the receive (Rx) function to cancel out common mode signals (e.g., as described above with reference to electrode 1407 of FIGS. 14B and 14C).

Touch and force control and readout circuitry 3108B of FIG. 31B is configured similarly to touch and force control and readout circuitry 3108A of FIG. 31A with the exception of analog signal combination blocks 3126, 3128, and 3130. Each of these blocks can include circuitry (e.g., an inverting summer) for combining the signals measured by the AFEs 3112, 3116, 3120, and 3124 to generate in-phase touch, quadrature touch, and force measurements. The formula for the electrode combinations is illustrated above each respective block 3126 (e.g., AB-CD), 3128 (e.g., AD-BC), and 3130 (e.g., AC-BD). As illustrated, the outputs of AFE amplifiers 3112 and 3116 can be combined to produce signal AB, the outputs of amplifiers 3112 and 3120 can be combined to produce signal AC, and so-on, to create all of the signal combinations AB, AC, AD, BC, BD, and CD that are used by the analog signal combination blocks 3126, 3128, and 3130 to generate the in-phase touch, quadrature touch, and force measurements simultaneously. The outputs of the AFE amplifiers 3112, 3116, 3120, and 3124 are shown with respective connections to the combination blocks to provide the electrode combinations for forming an in-phase touch (Touch I), quadrature touch (Touch Q) and force signal in parallel. In the figure, connections between intersecting lines are indicated by large black dots at the crossing point and lines crossing without large black dots have no connection. It should be understood that the AFE outputs are shown directly driving each of the combination blocks 3126, 3128, and 3130 buffers (not shown) can be placed between the AFEs and each of the combination block inputs. Touch I circuitry 3130 can be configured to determine the difference between force signals AB and CD, and feed that difference to sense circuitry 3110. Similarly, the outputs of AFE amplifiers 3112 and 3124 can be combined (e.g., AD) and connected to a first input of touch Q circuitry 3132, and the outputs of AFE amplifiers 3116 and 3120 can be combined (e.g., BC) and connected to a second input of touch Q circuitry 3132. Touch Q circuitry 3132 can be configured to determine the difference between touch signals AD and BC, and feed that difference to sense circuitry 3110. In some examples, the functions performed at touch circuitry 3110 and 3112 can be performed simultaneously. The remaining elements of touch and force control and readout circuitry 3108B can operate as described with reference to touch and force control and readout circuitry 3108A of FIG. 31A above.

FIG. 31C illustrates an exemplary circuit configuration for combination blocks 3126, 3128, and 3130 in FIG. 31B above. In particular, the input voltages $V_A$, $V_B$, $V_C$, and $V_D$ as shown in FIG. 31C can correspond to the outputs of AFEs 3112, 3116, 3120, and 3124, respectively, and are arranged to match the input order shown connected to combination block 3126 in 31B above. As shown in FIG. 31C, resistors all having a value R can be arranged with the operational amplifier 3150 such that the output voltage $V_{out}$ is equal to $(V_A+V_B)-(V_C+V_D)$. This result corresponds to the output (e.g., AB-CD) for combination block 3126 that can be used for in-phase touch as described above in FIG. 31B. It should be understood that the same configuration can be used to form the signals output signals AD-BC for quadrature touch and AC-BD for force touch at combination blocks 3128 and 3130. As shown in FIG. 31C, the output of the combination blocks can be single ended, although a differential output is shown for blocks 3126, 3128, and 3130 above. Furthermore, the exact configuration shown in FIG. 31C can be replaced with alternative circuit configurations that can add and subtract the voltage signals $V_A$, $V_B$, $V_C$, and $V_D$ to produce the in-phase touch, quadrature touch, and force signals without departing from the scope of the present disclosure. The configuration shown in FIG. 31C is not limiting and is provided only to provide one example of a combination circuit that can be used to produce the desired signals for the purpose of illustration.

Figure 32:
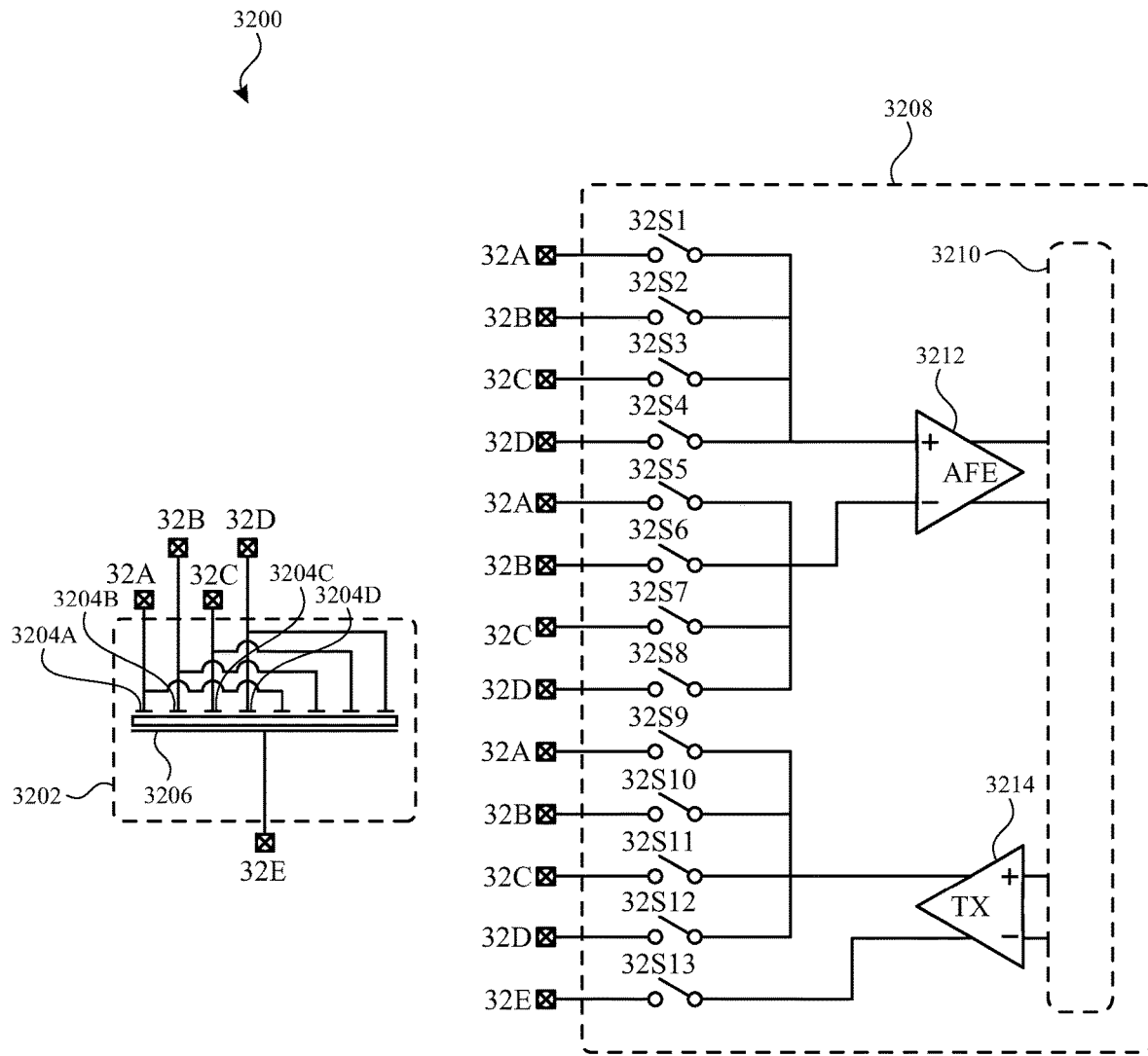

FIG. 32 illustrates exemplary switching configuration 3200 for quadrature acoustic touch and force sensing systems according to examples of the disclosure. Transducer 3202 can include a four spatial differential electrode configuration with electrodes 3204A-3204D disposed on a first side of the transducer and electrode 3206 disposed on a second side of the transducer. It should be recognizable that the four spatial differential electrode configuration illustrated in FIG. 32 can correspond to the configuration described above with reference to FIG. 11B. Electrodes 3204A, 3204B, 3204C, 3204D, and 3206 can be connected to touch and force control and readout circuitry 3208 for acoustic touch and force sensing. Touch and force control and readout circuitry 3208 can include analog front end (AFE) amplifier 3212, the output of which can be connected to sense circuitry 3210. The output of sense circuitry 3210 can be connected to the inputs of transmitter 3214. In some examples, electrodes 3204A, 3204B, 3204C, and 3204D can be connected to a first input terminal of AFE amplifier 3212 via switches 32S1, 32S2, 32S3, and 32S4, respectively (as indicated by connection labels 32A-32D). Electrodes 3204A, 3204B, 3204C, and 3204D can also be connected to a second input terminal of AFE amplifier 3212 via switches 32S5, 32S6, 32S7, and 32S8, respectively (also as indicated by connection labels 32A-32D). Similarly, electrodes 3204A, 3204B, 3204C, and 3204D can be connected to a first output terminal of transmitter 3214 via switches 32S9, 32S10, 32S11, and 32S12, respectively (also as indicated by connection labels 32A-32D). Electrode 3206 can be connected to a second output terminal of transmitter 3214 via switch 32S13 (as indicated by connection label 32E). During an in-phase touch receive (Rx) function (Touch-I), switches 32S1, 32S2, 32S7, and 32S8 can be closed, and switches 32S3, 32S4, 32S5, 32S6, 32S9, 32S10, 32S11, 32S12, and 32S13 can be open. The switch configuration during the in-phase touch Rx function can allow the AFE 3212 to receive combined electrical signals from the electrodes 3204A and 3204B at a first terminal of AFE 3212 and to receive combined electrical signals from electrodes 3204C and 3204D at a second terminal of AFE 3212. This can allow sense circuitry 3210 to detect the in-phase touch signal from the electrodes corresponding to a differential measurement of 32A, 32B vs. 32C, 32D (e.g., as shown in FIG. 18A above). During a quadrature touch Rx (Touch-Q) function, switches 32S1, 32S4, 32S6, and 32S7 can be closed, and switches 32S2, 32S3, 32S5, 32S8, 32S9, 32S10, 32S11, 32S12, and 32S13 can be open. The switch configuration during the quadrature touch Rx function can allow the AFE 3212 to receive combined electrical signals from the electrodes 3204A and 3204D at a first input of AFE 3212 and to receive combined electrical signals from electrodes 3204B and 3204C at a second terminal of AFE 3212. This can allow sense circuitry 3210 to detect the quadrature touch signal from the electrodes corresponding to a differential measurement of 32A, 32D vs. 32B, 32C (e.g., as shown in FIG. 18B above). During a force receive (Rx) function, switches 32S1, 32S3, 32S6, and 32S8 can be closed, and switches 32S2, 32S4, 32S5, 32S7, 32S9, 32S10, 32S11, 32S12, and 32S13 can be open. The switch configuration during the force Rx function can allow the AFE 3212 to receive electrical signals from the electrodes 3204A and 3204C at a first terminal of AFE 3212 and to receive electrical signals from electrodes 3204B and 3204D at a second terminal of AFE 3212. This can allow sense circuitry 3210 to detect the force signal from the electrodes corresponding to a differential measurement of 32A, 32C vs. 32B, 32D (e.g., as illustrated in FIG. 18C above). In the arrangement shown in FIG. 32, the force Rx function can be associated with a spatial frequency that is twice the spatial frequency of the in-phase touch and quadrature touch Rx functions. During each of the Rx functions, the electrode 3206 can be left floating for performing common mode rejection as described above with regarding to FIGS. 14A-14C. During a transmit (Tx) function switches 32S9, 32S10, 32S11, 32S12, and 32S13 can be closed, and switches 32S1-31S8 can be open. The switch configuration during the Tx function can allow transmitter 3214 to drive the electrodes 3204A, 3204B, 3204C, 3204D, and 3206 of transducer 3202 to create an electric potential across transducer 3206 and generate an acoustic wave. Notably, exemplary switching configuration 3200 is compatible with the modes of operation illustrated in FIGS. 29A-30B. In some examples, additional AFE amplifiers can be incorporated to reduce the total time for reading all of the touch and force electrode groupings. For example, a second AFE amplifier can be incorporated such that a first AFE amplifier can be dedicated for touch detection, and the second AFE amplifier can be dedicated for force detection. In some examples, sense circuitry 3210 can include one or more of digital-to-analog converters (DAC) 402A, filter 402B, gain and offset correction circuit 412, demodulation circuit 414, filter 416, analog-to-digital converter (ADC) 418, input/output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 3210 can be on a different chip from AFE 3212, transmitter 3214, and switches 32S1-32S13. In some examples, AFE amplifier 3212 can be connected to a first transducer for receiving, and the outputs of transmitter 3214 can be connected to a second transducer, different than the first transducer, for transmitting. In some examples, the touch and force control and readout circuitry 3208 can be included on a silicon chip. In some examples, the transmit circuitry can be designed to drive higher voltages (or currents) to produce sufficient motion in the transducer to generate an acoustic wave in the surface of a device, and the receive circuitry can be designed for receiving smaller amplitude reflected energy. Accordingly, in some examples, the transmit circuitry and receive circuitry can be included on different silicon chips to avoid interference with the operation of the receive circuitry by the transmit circuitry.

Figure 33:
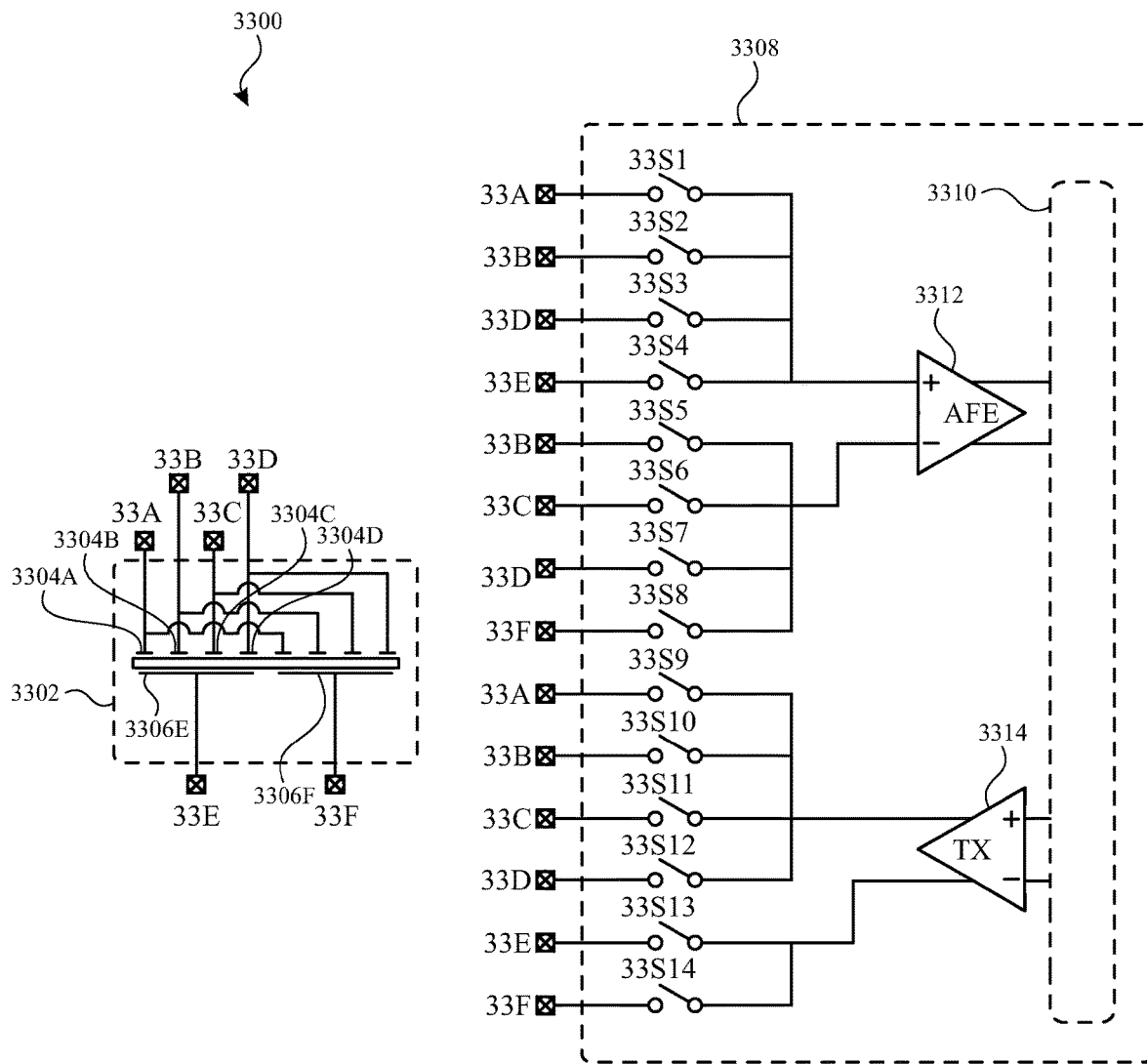

FIG. 33 illustrates exemplary switching configuration 3300 for quadrature acoustic touch and force sensing systems according to examples of the disclosure. Transducer 3302 can include a four spatial differential electrode configuration with electrodes 3304A-3304D disposed on a first side of the transducer and electrodes 3306E and 3306F disposed on a second side of the transducer. It should be recognizable that the spatial differential electrode configuration illustrated in FIG. 33 can correspond to the configuration described above with reference to FIG. 11B above. Electrodes 3304A, 3304B, 3304C, 3304D, 3306E, and 3306F can be connected to touch and force control and readout circuitry 3308 for acoustic touch and force sensing. Touch and force control and readout circuitry 3308 can include analog front end (AFE) amplifier 3312, the output of which can be connected to sense circuitry 3310. Outputs from sense circuitry 3310 can be connected to the inputs of transmitter 3314. In some examples, electrodes 3304A, 3304B, 3304D, and 3304E can be connected to a first input terminal of AFE amplifier 3312 via switches 33S1, 33S2, 33S3, and 33S4, respectively (as indicated by connection labels 33A-33D). Electrodes 3304B, 3304C, 3304D, and 3304F can also be connected to a second input terminal of AFE amplifier 3312 via switches 33S5, 33S6, 33S7, and 33S8, respectively (as indicated by connection labels 33B, 33C, 33D, and 33F). In addition, electrodes 3304A, 3304B, 3304C, and 3304D can be connected to a first output terminal of transmitter 3314 via switches 33S9, 33S10, 33S11, and 33S12, respectively (as indicated by connection labels 33A-33D). Electrodes 3306E and 3306F can be connected to a second output terminal of transmitter 3314 via switches 33S13 and 33S14, respectively (as indicated by connection labels 33E-33F). During an in-phase touch receive (Rx) function (Touch-I), switches 33S1, 33S2, 33S6, and 33S7 can be closed, and switches 33S3, 33S4, 33S5, 33S8, 33S9, 33S10, 33S11, 33S12, 33S13, and 33S13 can be open. The switch configuration during the touch I Rx function can allow the AFE 3312 to receive electrical signals from the electrodes 3304A and 3304B at a first terminal of AFE 3312 and to receive electrical signals from electrodes 3304C and 3304D at a second terminal of AFE 3312. This can allow sense circuitry 3310 to detect the in-phase touch signal from the electrodes corresponding to a differential measurement of 33A, 33B vs. 33C, 33D. During a quadrature touch receive (Rx) function (Touch-Q), switches 33S1, 33S3, 33S5, and 33S6 can be closed, and switches 33S2, 33S4, 33S7, 33S8, 33S9, 33S10, 33S11, 33S12, 33S13, and 33S14 can be open. The switch configuration during the quadrature touch Rx function can allow the AFE 3312 to receive electrical signals from the electrodes 3304A and 3304D at a first terminal of AFE 3312 and to receive electrical signals from electrodes 3304B and 3304C at a second terminal of AFE 3312. This can allow sense circuitry 3310 to detect the quadrature touch signal from the electrodes corresponding to a differential measurement of 33A, 33D vs 33B, 33C. During a force receive (Rx) function, switches 33S4 and 33S8 can be closed, and switches 33S1, 33S2, 33S3, 33S5, 33A6, 33S7, 33S9, 33S10, 33S11, 33S12, 33S13, and 33S14 can be open. The switch configuration during the force Rx function can allow the AFE 3312 to receive electrical signals from the electrodes 3304E and 3304F. This can allow sense circuitry 3310 to detect the force signal from the electrodes corresponding to a differential measurement of E vs. F. During each of the Rx functions, the electrode opposite side electrodes (e.g., E and F while A, B, C, D are being sensed, or A, B, C, and D while E and F are being sensed) can be left floating for performing common mode rejection as described above with regard to FIGS. 14A-14C above. It should be understood from the disclosure above that the pitch of the 3306E and 3306F can correspond to a lower spatial frequency (e.g., half of the spatial frequency) for force touch measurements compared to in-phase touch and quadrature touch measurements. During a transmit (Tx) function switches 33S9-33S14 can be closed, and switches 33S1-33S8 can be open. The switch configuration during the Tx function can allow transmitter 3314 to drive the electrodes 3304A, 3304B, 3304C, 3304D, 3306E, and 3306F of transducer 3302 to produce an electric potential across the transducer 3302 and generate an acoustic wave. Notably, exemplary switching configuration 3300 is compatible with the modes of operation illustrated in FIGS. 29A—In some examples, additional AFE amplifiers can be incorporated to make this configuration compatible with the mode of operation illustrated in FIGS. 28A and 28B (e.g., as described with reference to FIGS. 31A and 31B). In some examples, a second AFE amplifier can be incorporated such that a first AFE amplifier can be dedicated for touch detection, and the second AFE amplifier can be dedicated for force detection. In some examples, sense circuitry 3310 can include one or more of digital-to-analog converters (DAC) 402A, filter 402B, gain and offset correction circuit 412, demodulation circuit 414, filter 416, analog-to-digital converter (ADC) 418, input/output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 3310 can be on a different chip from AFE 3312, transmitter 3314, and switches 33S1-33S14. In some examples, inputs of AFE amplifier 3312 can be connected to a first transducer for receiving, and the outputs of transmitter 3314 can be connected to a second transducer, different than the first transducer, for transmitting. In some examples, the touch and force control and readout circuitry 3308 can be included on a silicon chip. In some examples, the transmit circuitry can be designed to be driven by higher voltages (or currents) to produce sufficient motion in the transducer to generate an acoustic wave in the surface of a device, and the receive circuitry can be designed for receiving smaller amplitude reflected energy. Accordingly, in some examples, the transmit circuitry and receive circuitry can be included on different silicon chips to avoid interference with the operation of the receive circuitry by the transmit circuitry.

Figure 34:
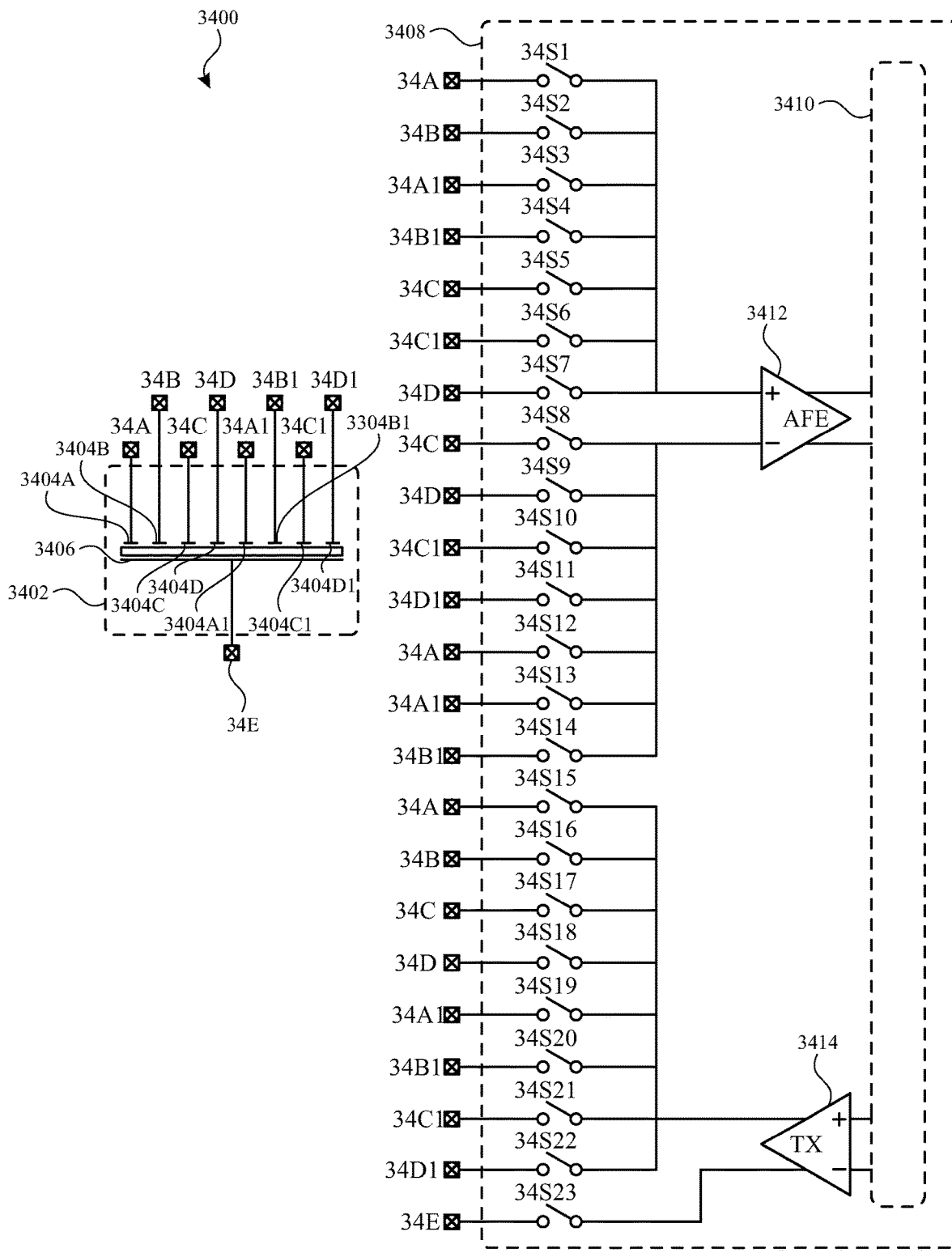

FIG. 34 illustrates exemplary switching configuration 3400 for quadrature acoustic touch and force sensing systems according to examples of the disclosure. Transducer 3402 can include a eight spatial differential electrode configuration with electrodes 3404A, 3404B, 3404C, 3404D, 3404A1, 3404B1, 3404C1, and 3404D1 disposed on a first side of the transducer and electrode 3406 on a second side of the transducer. Electrodes 3404A, 3404B, 3404C, 3404D, 3404A1, 3404B1, 3404C1, 3404D1, and 3406 can be connected to touch and force control and readout circuitry 3408 for acoustic touch and force sensing. Touch and force control and readout circuitry 3408 can include analog front end (AFE) amplifier 3412, the output of which can be connected to sense circuitry 3410. Outputs from sense circuitry 3410 can be connected to the inputs of transmitter 3414. In some examples, electrodes 3404A, 3404B, 3404A1, 3404B1, 3404C, 3404C1, and 3404D can be connected to a first input terminal of AFE amplifier 3412 via switches 34S1, 34S2, 34S3, 34S4, 34S5, 34S6, and 34S7, respectively (as indicated by connection labels 34A, 34B, 34A1, 34B1, 34C, 34C1, and 34D). Electrodes 3404C, 3404D, 3404C1, 3404D1, 3404A, 3404A1, and 3404B1 can also be connected to a second input terminal of AFE amplifier 3412 via switches 34S8, 34S9, 34S10, 34S11, 34S12, 34S13, and 34S14, respectively (as indicated by connection labels 34C, 34D, 34C1, 34D1, 34A, 34A1, and 34B1). Similarly, electrodes 3404A, 3404B, 3404C, 3404D, 3404A1, 3404B1, 3404C1, and 3404D1 can be connected to a first output terminal of transmitter 3314 via switches 34S15, 34S16, 34S17, 34S18, 34S19, 34S20, 34S21, and 34S22, respectively (as indicated by connection labels 34A, 34B, 34C, 34D, 34A1, 34B1, 34C1, and 34D1). Electrode 3406 can be connected to a second output terminal of transmitter 3314 via switch 33S23 (as indicated by connection label 34E). It should be understood that, while not illustrated, electrodes 3404A, 3404B, 3404C, 3404D, 3404A1, 3404B1, 3404C1, and 3404D1 can represent electrode configurations as described above with reference to FIGS. 17A-17C. During an in-phase touch receive (Rx) function (Touch-I), switches 34S1, 34S2, 34S3, 34S4, 34S8, 34S9, 34S10, and 34S11 can be closed, and switches 34S5-34S7, and 34S12-34S23 can be open. The switch configuration during the in-phase touch Rx function can allow the AFE 3412 to receive electrical signals from the electrodes 3404A, 3404B, 3404A1, and 3404B1 at a first terminal of AFE 3312 and to receive electrical signals from electrodes 3404C, 3404D, 3404C1, and 3404D1 at a second terminal of AFE 3412. This can allow sense circuitry 3410 to detect the in-phase touch signal from the electrodes corresponding to a differential measurement of ABA1B1 and CDC1D1. During a quadrature touch receive (Rx) function (Touch-Q), switches 34S2, 34S4, 34S5, 34S6, 34S9, 34S11, 34S12, and 34S13 can be closed, and switches 34S1, 34S3, 34S7, 34S8, and 34S14-34S23 can be open. The switch configuration during the quadrature touch Rx function can allow the AFE 3412 to receive electrical signals from the electrodes 3404B, 3404B1, 3404C, and 3404C1 at a first terminal of AFE 3412 and to receive electrical signals from electrodes 3404A, 3404A1, 3404D, and 3404D1 at a second terminal of AFE 3412. This can allow sense circuitry 3410 to detect the quadrature touch signal from the electrodes corresponding to a differential measurement of BCB1C1 vs ADA1D1. During a force receive (Rx) function, switches 34S1, 34S2, 34S5, 34S7, 34S10, 34S11, 34S13, and 34S14 can be closed, and switches 34S3, 34S4, 34S6, 34S8, 34S9, 34S12 and 34S15-34S23 can be open. The switch configuration during the force Rx function can allow the AFE 3412 to receive electrical signals from the electrodes 3404A, 3404B, 3404C, and 3404D at a first terminal of AFE 3412 and to receive electrical signals from electrodes 3404A1, 3404B1, 3404C1, and 3404D1 at a second terminal of AFE 3412. This can allow sense circuitry 3410 to detect the force signal from the electrodes corresponding to a differential measurement of ABCD and A1B1C1D1. During each of the Rx functions, the electrode 3406 can be left floating for performing common mode rejection as described above with regarding to FIGS. 14A-14C. During a transmit (Tx) function switches 34S15-34S23 can be closed, and switches 34S1-34S14 can be open. The switch configuration during the Tx function can allow transmitter 3414 to drive the electrodes 3404A, 3404B, 3404C, 3404D, 3404A1, 3404B1, 3404C1, 3404D1, and 3306E of transducer 3302 to generate an acoustic wave. Notably, exemplary switching configuration 3400 is compatible with the modes of operation illustrated in FIGS. 29A-30B. Similar to the example illustrated in FIG. 33 above, the switching scheme illustrated in FIG. 34 can measure force at a spatial frequency that is half the spatial frequency of the in-phase touch and quadrature touch measurements. However, unlike FIG. 33 above, differential measurement electrodes 3404A-3404D1 all can be disposed on one side of the transducer 3406. This configuration can simplify forming electrical connections to all of the transducer electrodes (e.g., 3404A-3404D1 and 3406) from one side of transducer. Since electrodes 3404A-3404D1 are already on one side of the transducer 3402, only electrode 3406 would need to be routed to the opposite side to achieve the goal of single-sided connections described immediately above. On the other hand, in FIG. 33 above, both electrodes 3306E and 3306F would need to be routed to the opposite side of transducer 3302 to achieve the same result. This benefit comes with a trade-off of more total electrodes on the transducer (nine in FIG. 34 compared to six in FIG. 33) and correspondingly more switches for connecting to increased number of electrodes. In some examples, additional AFE amplifiers (e.g., eight in total) can be incorporated to make this configuration compatible with the mode of operation illustrated in FIGS. 28A and 28B (e.g., as described with reference to FIGS. 31A and 31B). In some examples, a second AFE amplifier can be incorporated such that a first AFE amplifier can be dedicated for touch detection, and the second AFE amplifier can be dedicated for force detection. In some examples, sense circuitry 3410 can include one or more of digital-to-analog converters (DAC) 402A, filter 402B, gain and offset correction circuit 412, demodulation circuit 414, filter 416, analog-to-digital converter (ADC) 418, input/output (I/O) circuit 420, acoustic scan control circuit 422, force detection circuit 424, processor SoC 430, host processor 432, auxiliary processor 434, and/or any other sense circuitry described above with reference to FIG. 4. In some examples, sense circuitry 3410 can be on a different chip from AFE 3412, transmitter 3414, and switches 24S1-34S23. In some examples, inputs of AFE amplifier 3412 can be connected to a first transducer for receiving, and the outputs of transmitter 3414 can be connected to a second transducer, different than the first transducer, for transmitting. In some examples, the touch and force control and readout circuitry 3408 can be included on a silicon chip. In some examples, the transmit circuitry can be designed to drive higher voltages (or currents) to produce sufficient motion in the transducer to generate an acoustic wave in the surface of a device, and the receive circuitry can be designed for receiving smaller amplitude reflected energy. Accordingly, in some examples, the transmit circuitry and receive circuitry can be included on different silicon chips to avoid interference with the operation of the receive circuitry by the transmit circuitry.

Figure 35A:
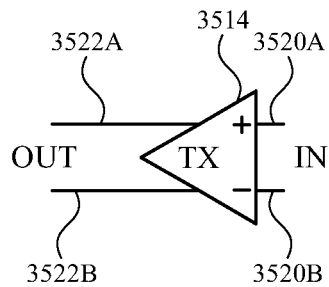
FIGS. 35A-36B illustrate exemplary transmitter configurations for acoustic touch and force sensing systems according to examples of the disclosure.
Figure 35B:
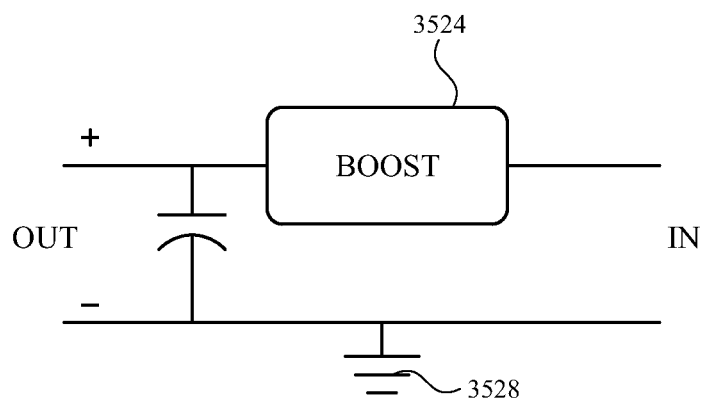

FIGS. 35A-35B illustrate an exemplary transmitter configuration for acoustic touch and force sensing systems according to examples of the disclosure. The exemplary transmitter can represent any of the various Tx blocks described in FIGS. 21-27 and 31-34 above. It should be understood that the exemplary Tx block is provided only for the purposes of illustration, and that any circuit configuration capable of driving a piezoelectric transducer to produce acoustic waves can be used without departing from the scope of the present disclosure. Specifically, FIG. 35A illustrates transmitter 3514 with inputs 3520A and 3520B and outputs 3522A and 3522B. FIG. 35B illustrates a detailed configuration of transmitter 3514 of FIG. 35A illustrating a boost converter configuration for providing the Tx drive signal. In the illustration, the boost circuit 3524 can boost the input voltage to a suitable drive voltage for the transistor. In the illustrated voltage boost configuration of FIG. 35B, a single ended output can be formed as the negative output terminal is connected to ground 3528. Accordingly, a differential drive for the transducer can be provided using switches to invert the polarity of the drive signals as will be shown in FIG. 36B below.

Figure 36A:
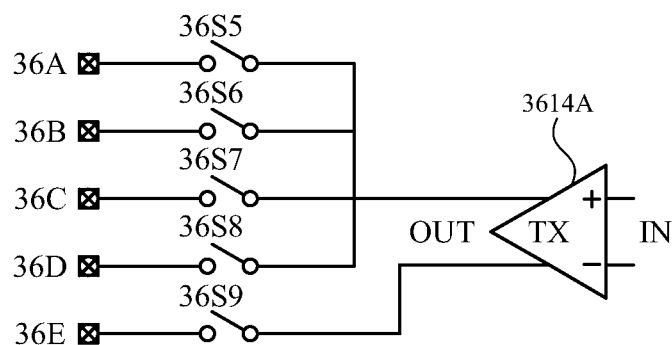
Figure 36B:
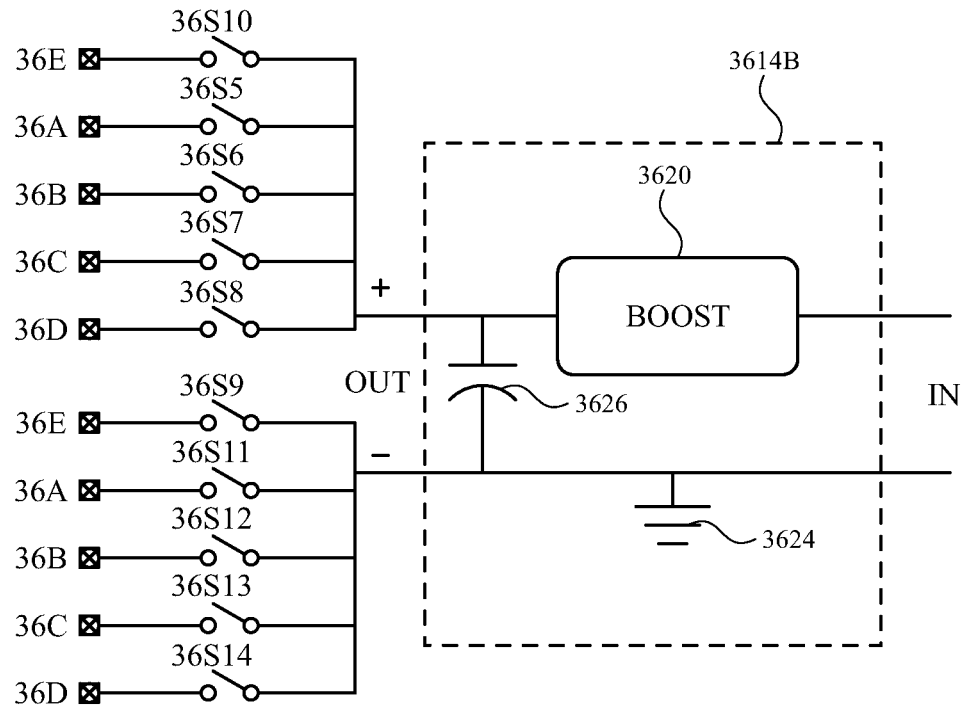

FIGS. 36A-36B illustrate exemplary transmitter configurations for acoustic touch and force sensing systems according to examples of the disclosure. Specifically, FIG. 36A repeats the Tx 3614 Tx configuration shown in FIGS. 31A-31B and FIG. 32 for a transducer with four electrodes 36A-36D on one side and one electrode 36E on the opposite side. As described in FIGS. 31A-31B and FIG. 32, during the transmit phase for the configuration in 36A, all of the switches 36S5-36S9 can be closed, and a differential signal can be driven by the differential Tx 3614 across the two sides of a transducer such as 3102 or 3202 above. As described, the switch configuration shown in FIG. 36A can be used with a fully differential transmit circuit 3614, but is provided here primarily as a reference point for the switch configuration shown in FIG. 36B that can be used to provide differential drive to the transducer using a single ended boost converter as described in FIG. 36A above.

FIG. 36B illustrates a switching configuration for providing a differential drive signal based on a single-ended output Tx configuration such as the exemplary Tx configuration 3514 described in FIG. 36A. The boost converter 3614B can be identical to the boost converter described above in FIG. 35B. Switches 36S5, 36S6, 36S7, 36S8, and 36S9 can correspond directly to the switches having the same numbers as shown in FIG. 36A above. Thus, when those switches are closed, the positive output of the boost converter 3614B can be connected to electrodes on one side of the transducer, while ground 3624 can be connected to the opposite side of the transducer. Switches 36S10, 36S11, 36S12, 36S13, and 36S14 can provide analogous connections to the switches 36S5-36S9, but with the opposite polarity. By switching back and forth between these closing switches 36S5-36S9 (while opening the others) and closing switches 36S10-36S14 (while opening the others), a differential drive can be applied to a transducer based on a single ended voltage boost configuration as illustrated in FIGS. 35B and 36B. More generally, the switching principle illustrated in FIG. 36B can be applied to create a differential drive for a transducer from any single ended source having a sufficient output voltage to drive the transducer to produce acoustic waves as described throughout the disclosure.

Figure 37A:
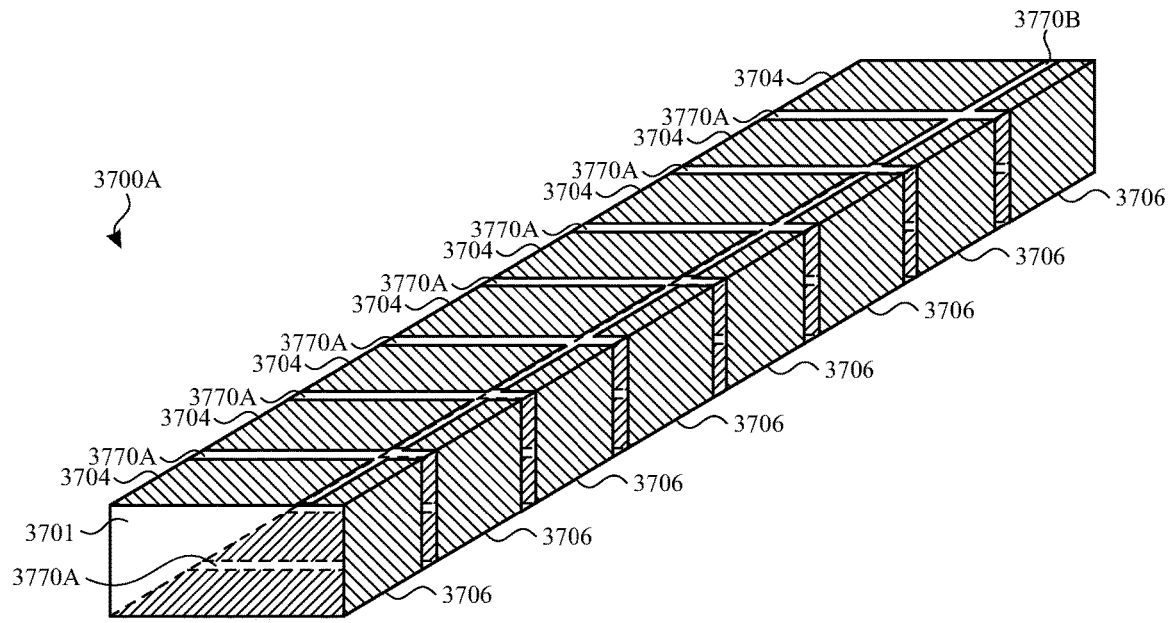
FIGS. 37A-37Q illustrate exemplary transducers according to examples of the disclosure.
Figure 37B:
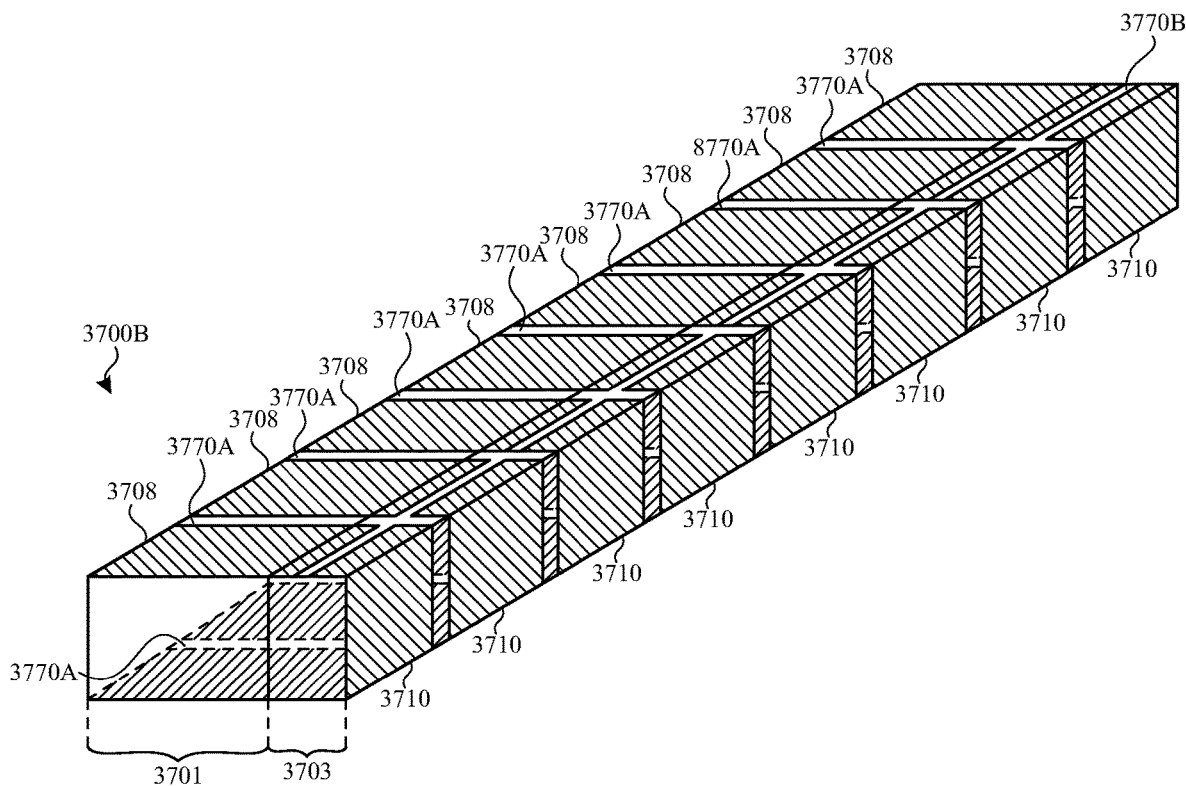
Figure 37C:
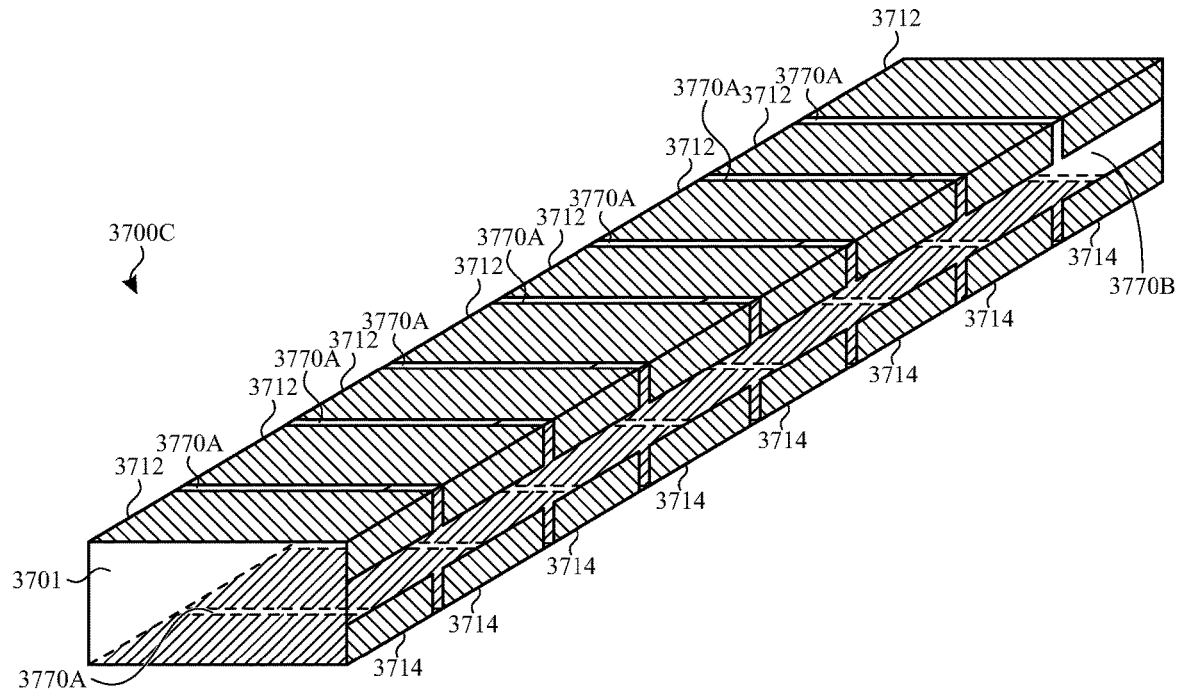
Figure 37D:
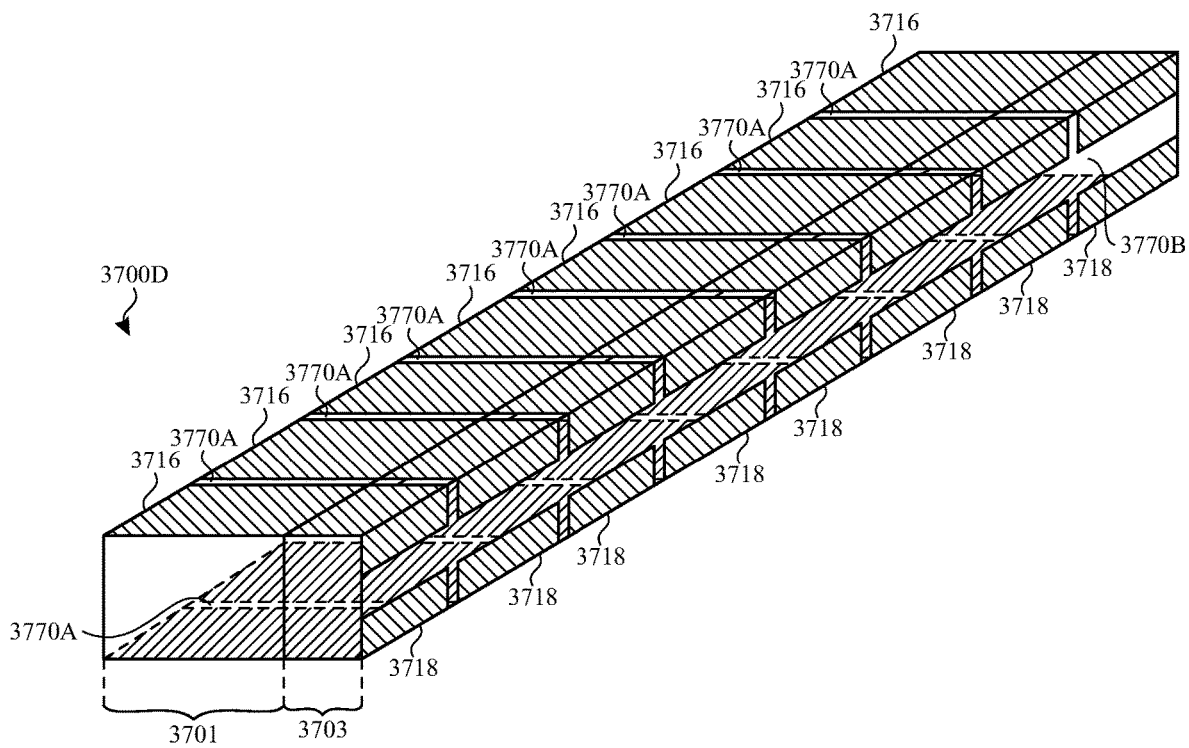
Figure 37E:
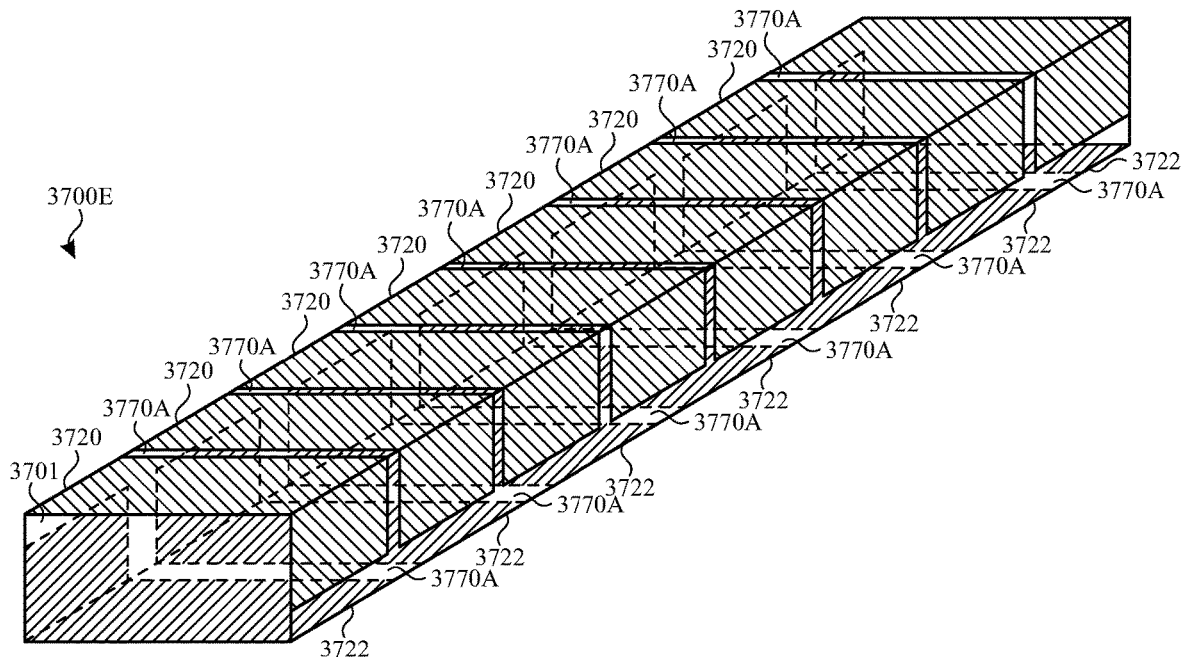
Figure 37F:
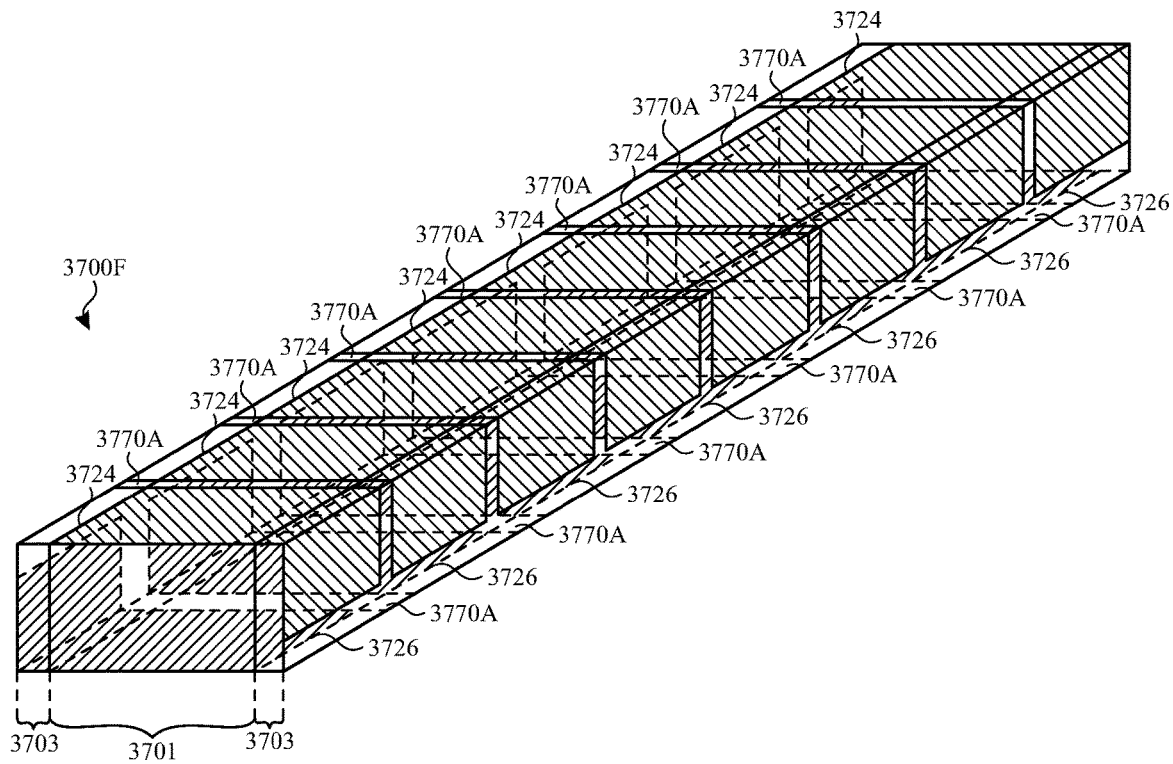
Figure 37G:
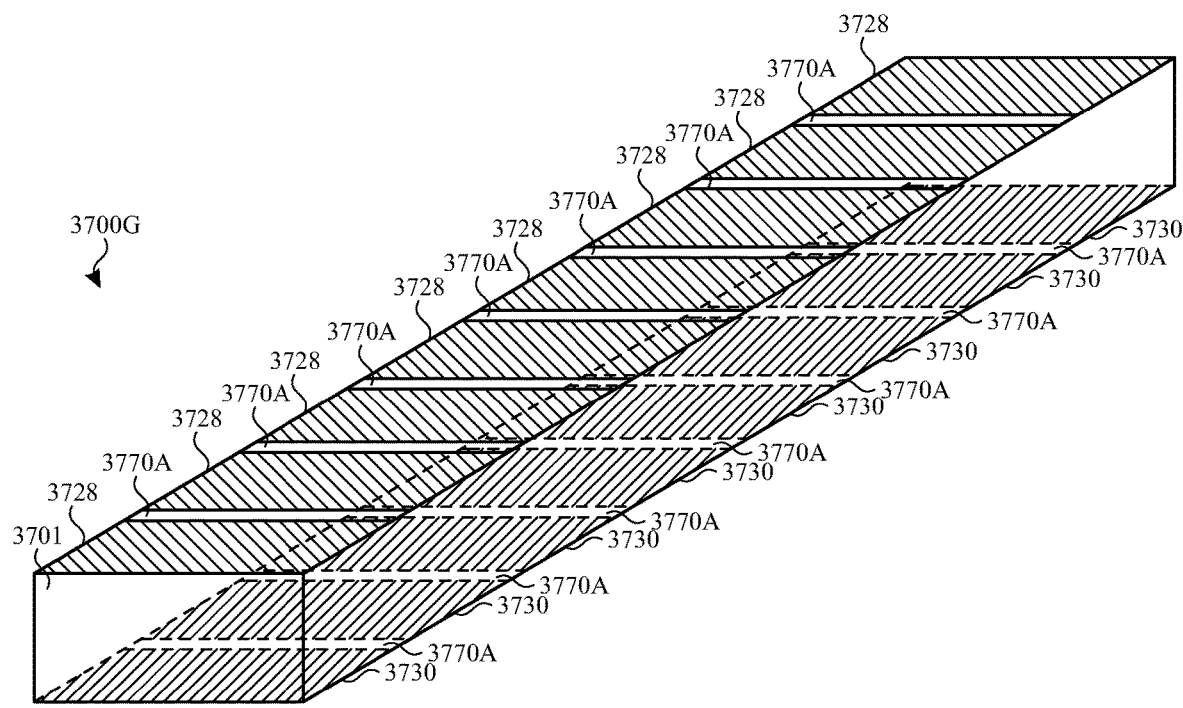
Figure 37H:
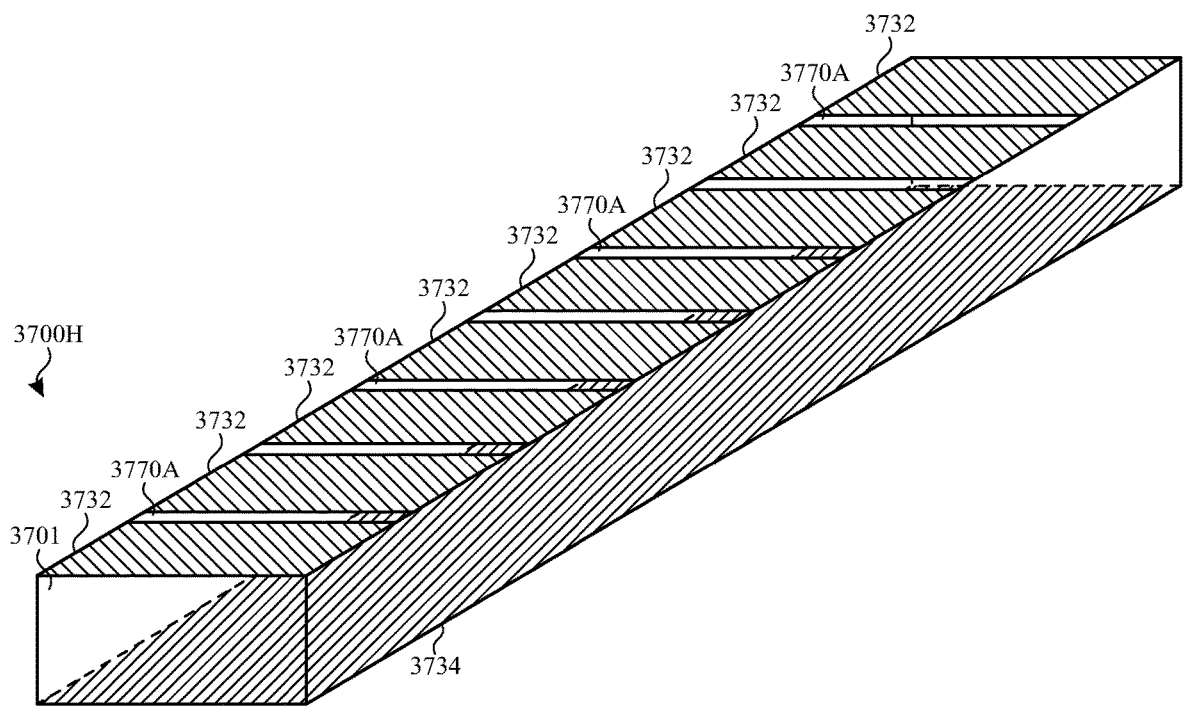
Figure 37I:
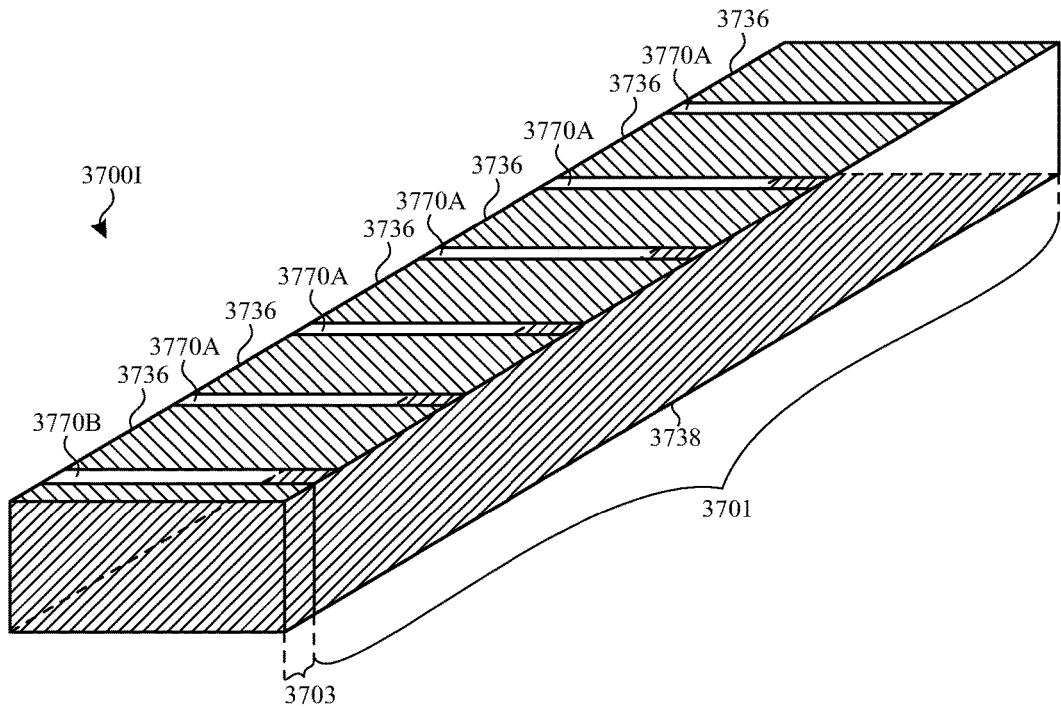
Figure 37J:
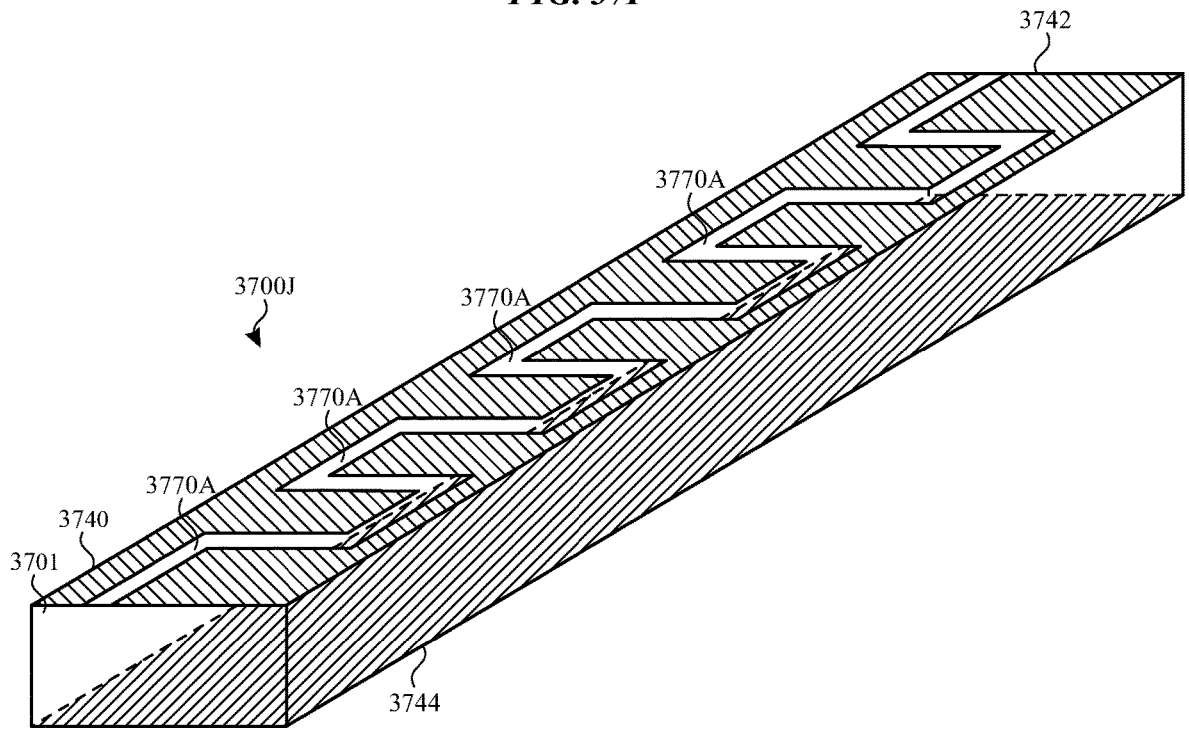
Figure 37K:
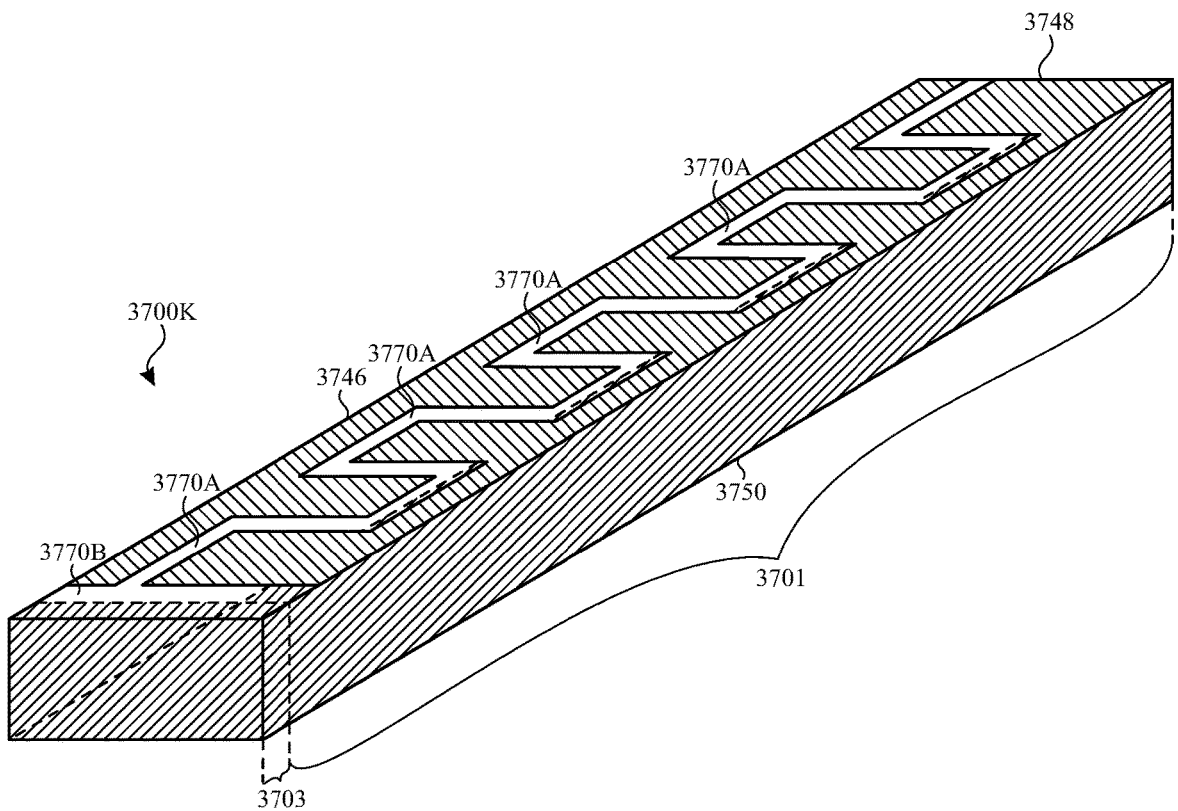
Figure 37L:
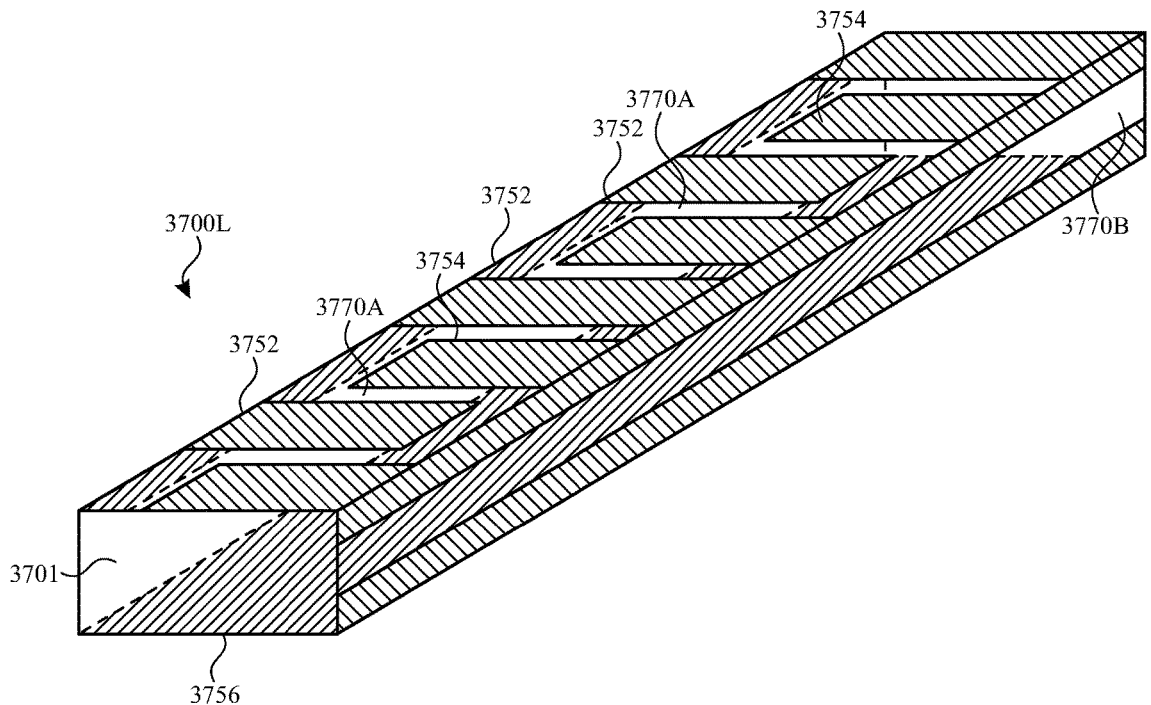
Figure 37M:
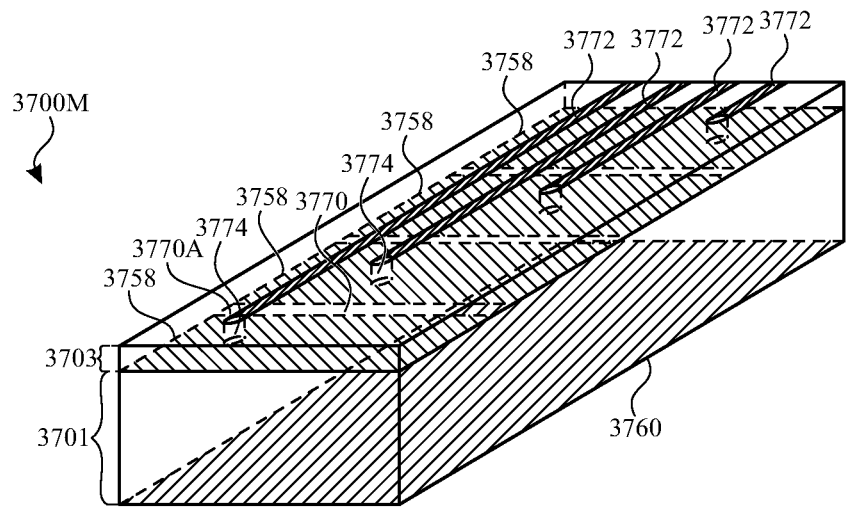
Figure 37N:
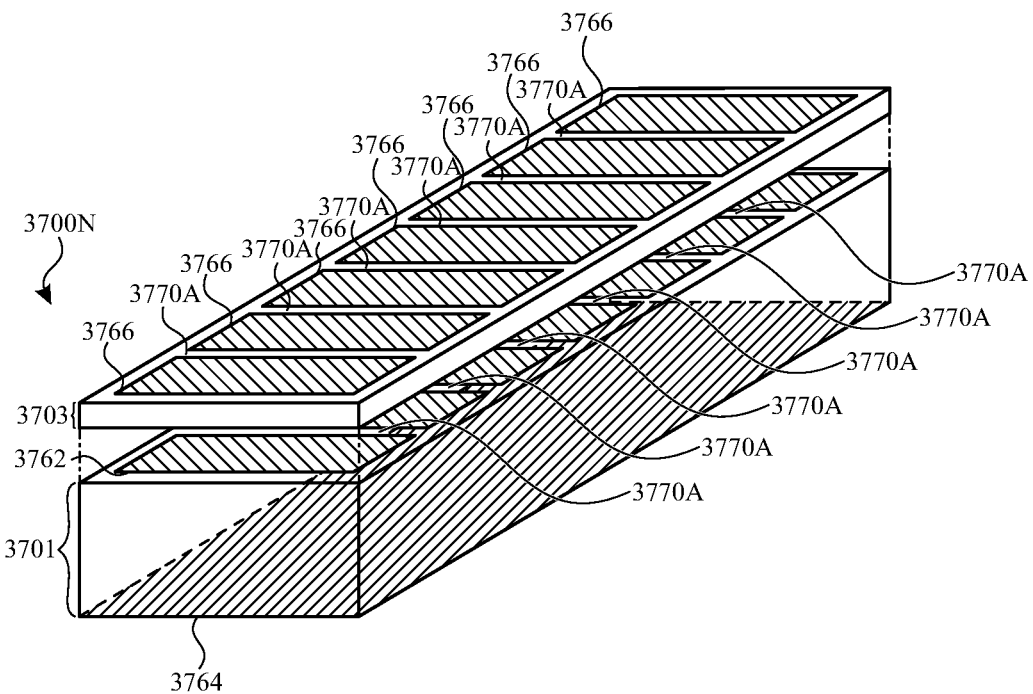
Figure 37O:
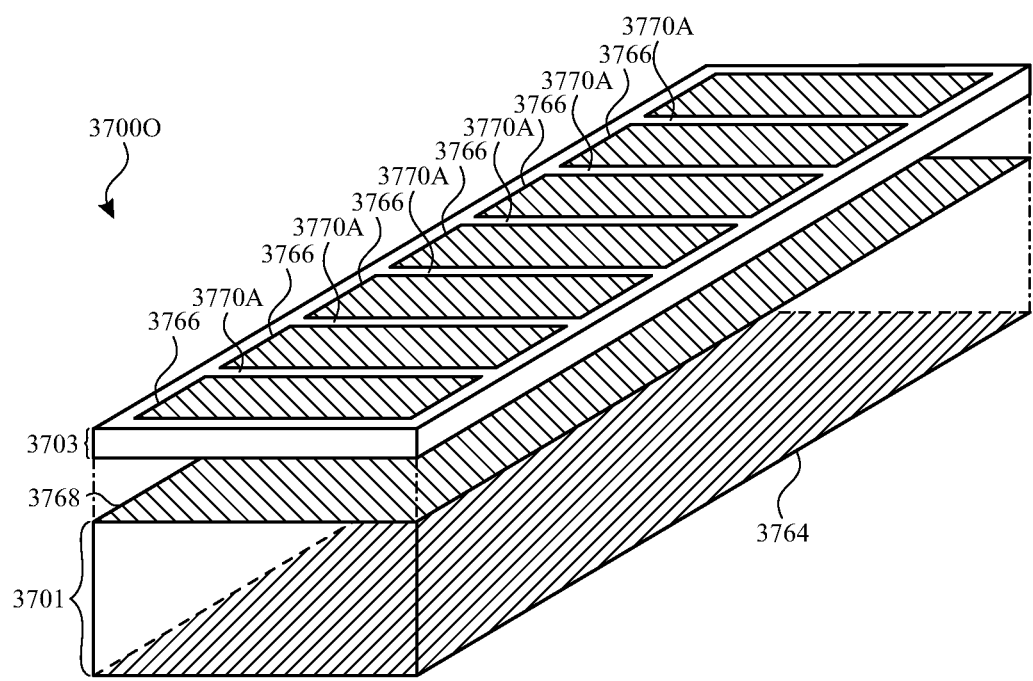
Figure 37P:
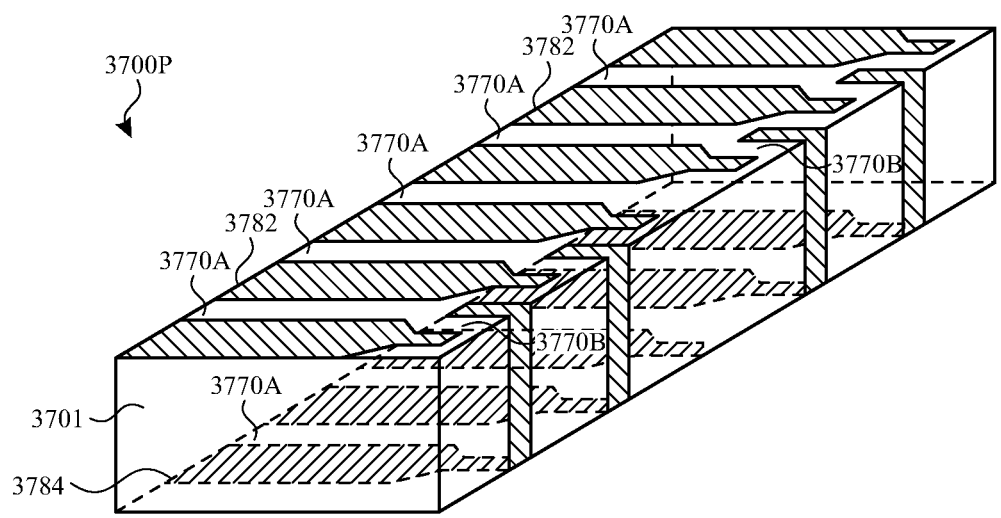
Figure 37Q:
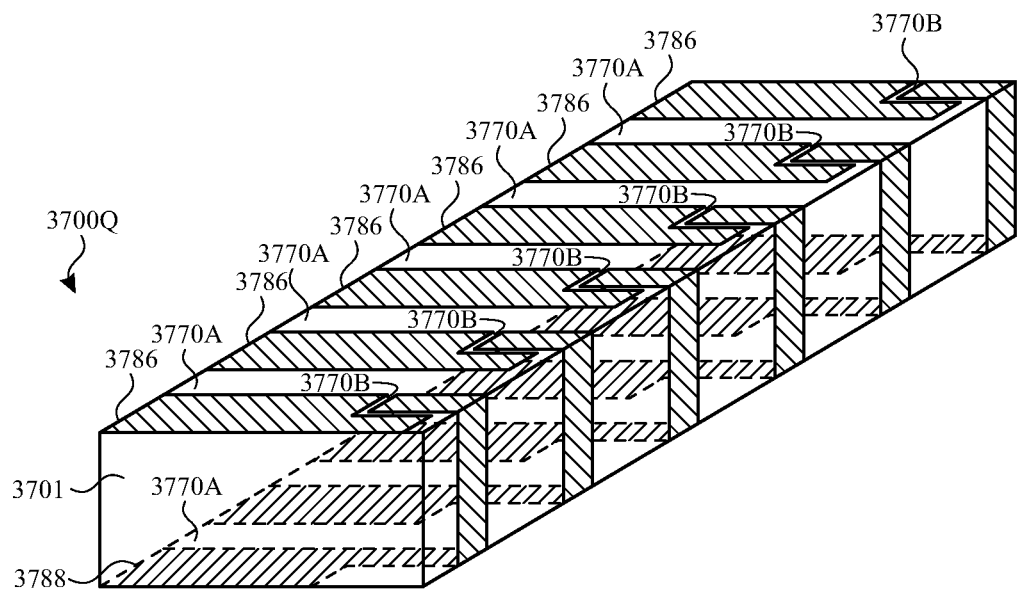

FIGS. 37A-37Q illustrate exemplary pixelated transducers 3700A-Q according to examples of the disclosure. As described herein, a pixelated transducer replaces one or both conventional electrodes of a transducer (e.g., first electrode 332 and/or second electrode 334 in FIG. 3C) into multiple electrodes. The pixelated transducers 3700A-M can, for example, include a piezoelectric material 3701 and a plurality of separated electrodes. In some examples (e.g., illustrated in FIGS. 37H-37N), an electrode layer on one side of piezoelectric material 3701 can be pixelated (including a plurality of separated electrodes). In some examples (e.g., illustrated in FIGS. 37A-37G), a first electrode layer on a first side of piezoelectric material 3701 and a second electrode layer on a second side of piezoelectric material 3701 can be pixelated. In some examples, the pitch of the upper electrodes can be the same as the pitch of the lower electrodes. In some examples, the pitch of the upper electrodes can be different than the pitch of the lower electrodes. In some examples, the transducer can further include an insulating material 3703, such as an epoxy or another suitable non-conductive material (e.g., plastic, ceramic, etc.). Insulating material 3703 can provide a surface for wraparound or other connections of the electrodes of pixelated transducers 3700A-M. Additionally, using an insulating material 3703 can reduce noise in the piezoelectric material and maximize the active area of the piezoelectric material 3701. The various exemplary pixelated transducers 3700A-M are described below.

FIG. 37A illustrates an exemplary pixelated transducer 3700A according to examples of the disclosure. Pixelated transducer 3700A includes first and second pixelated electrode layers (also referred to as upper and lower pixelated layers based on the orientation illustrated in FIG. 37A). For example, pixelated transducer 3700A can include a plurality of upper electrodes 3704 disposed on a first side of the piezoelectric material 3701 (e.g., top side illustrated in FIG. 37A) and a plurality of lower electrodes 3706 disposed on a second side of piezoelectric material 3701 (e.g., bottom side illustrated in FIG. 37A). In the pixelated arrangement of FIG. 37A, adjacent upper electrodes 3704 can be separated from one another by gaps 3770A and adjacent lower electrodes 3706 can also be separated from one another by gaps 3770A. The lower electrodes 3706 can wrap around from the second side of piezoelectric material 3701 to the first side of piezoelectric material 3701, for example. The lower electrodes 3706 wrapping around the piezoelectric material 3701 can be separated from corresponding upper electrodes by gaps 3770B. Wrapping around the lower electrodes 3706 to the first side of the transducer 3700A can allow for simplified connections between the transducer and a touch and/or force sensing circuit (e.g., via flex circuit, interposer, direct bonding, etc.).

FIG. 37B illustrates another exemplary pixelated transducer 3700B according to examples of the disclosure. Pixelated transducer 3700B can correspond to pixelated transducer 3700A, except pixelated transducer 3700B can include an insulating material 3703, which can be used, for example, for bringing the electrodes on the second side of the transducer to the first side of the transducer. The insulating material 3703 can also be used for the connection area between the transducer and the touch and/or force sensing circuit. For example, pixelated transducer 3700B can include a plurality of upper electrodes 3708 disposed on a first side of the piezoelectric material 3701 and a first side of insulating material 3703 (e.g., top side illustrated in FIG. 37B) and a plurality of lower electrodes 3710 disposed on a second side of piezoelectric material 3701 and a second side of insulating material 3703 (e.g., bottom side illustrated in FIG. 37B). In the pixelated arrangement of FIG. 37B, adjacent upper electrodes 3708 can be separated from one another by gaps 3770A and adjacent lower electrodes 3710 can also be separated from one another by gaps 3770A. The lower electrodes 3710 can wrap around from the second side of pixelated transducer 3700B to the first side of the transducer 3700B. Unlike lower electrodes 3706 of pixelated transducer 3700A that wrap around piezoelectric material 3701, lower electrodes 3710 can wrap around insulating material 3703 and can terminate on the first side of insulating material 3703. Using an insulating material for the wraparound and/or connection can result in improved stimulation and sensing of the transducer. For example, a differential signal applied or received across piezoelectric material 3701 can have different properties when applied to two opposing sides of piezoelectric material 3701 than when the differential signal is applied to or received from three sides of piezoelectric material 3701 (including applying signals to/receiving signals from electrodes on the first side of piezoelectric material 3701 in FIG. 37A). The lower electrodes 3710 wrapping around the pixelated transducer 3700B (e.g., wrapping around the insulating material 3703) can be separated from corresponding upper electrodes 3708 by gaps 3770B. Wrapping around the lower electrodes 3710 from the second side of pixelated transducer 3700B to the first side of pixelated transducer 3700B can allow for simplified connections between the transducer and a touch and/or force sensing circuit (e.g., via flex circuit, interposer, direct bonding, etc.). It should be understood that pixelated transducers 3700A-B can be similarly implemented with upper electrodes wrapping around from a first side of piezoelectric material 3701 to a second side of piezoelectric material 3701 instead of implemented with lower electrodes wrapping around as illustrated in FIGS. 37A-B.

FIG. 37C illustrates another exemplary pixelated transducer 3700C according to examples of the disclosure. Pixelated transducer 3700C can correspond to pixelated transducer 3700A implemented with both upper electrodes and lower electrodes wrapping around to a common, third side of piezoelectric material 3701 rather than to a first side (or second side) of piezoelectric material 3701. Connection between pixelated transducer 3700C and touch and/or force circuitry can be made on the third side of piezoelectric material 3701. For example, transducer 3700 can include a plurality of upper electrodes 3712 disposed on a first side of the piezoelectric material 3701 (e.g., top side illustrated in FIG. 37C) and a plurality of lower electrodes 3714 disposed on a second side of piezoelectric material 3701 (e.g., bottom side illustrated in FIG. 37C). In the pixelated arrangement of FIG. 37C, adjacent upper electrodes 3712 can be separated from one another by one or more gaps 3770A and adjacent lower electrodes 3714 can also be separated from one another by gaps 3770A. The upper electrodes 3712 and lower electrodes 3714 can wrap around from the first side (top side) and from the second side (bottom side) of piezoelectric material 3701, respectively, to a common, third side of piezoelectric material 3701 (e.g., front right side illustrated in FIG. 37C). A portion of upper electrodes 3712 and a portion of lower electrodes 3714 wrapping around to the third side of piezoelectric material 3701 can be separated from each other by gaps 3770B. Wrapping around the upper electrodes 3712 and the lower electrodes 3714 to the third side of piezoelectric material 3701 can allow for simplified connections between the transducer and a touch and/or force sensing circuit (e.g., via flex circuit, interposer, direct bonding, etc.).

FIG. 37D illustrates another exemplary transducer 3700D according to examples of the disclosure. Pixelated transducer 3700D can correspond to pixelated transducer 3700C, except pixelated transducer 3700D can include an insulating material 3703 for wraparound and/or connection. For example, pixelated transducer 3700D can include a plurality of upper electrodes 3716 disposed on a first side of piezoelectric material 3701 (e.g., top side illustrated in FIG. 37D) and a plurality of lower electrodes 3718 disposed on a second side of piezoelectric material 3701 (e.g., bottom side illustrated in FIG. 37D). In the pixelated arrangement of FIG. 37D, adjacent upper electrodes 3716 can be separated from one another by gaps 3770A and adjacent lower electrodes 3718 can also be separated from one another by gaps 3770A. Upper electrodes 3716 can extend from the first side of piezoelectric material 3701 to the first side of the insulating material 3703 and lower electrodes 3718 can extend from the second side of piezoelectric material 3701 to the second side of the insulating material 3703. The upper electrodes 3716 and lower electrodes 3718 can wrap around from the first side and the second side of transducer 3700D, respectively, to a common, third side of transducer 3700D (e.g., front right side illustrated in FIG. 37D). Unlike upper electrodes 3712 and lower electrodes 3714 of transducer 3700C, upper electrodes 3716 and lower electrodes 3718 can wrap around and/or terminate on the common third side of insulting material 3703, rather than on the piezoelectric material 3701. Using an insulating material for the wraparound and/or connection can result in improved stimulation and sensing of the transducer as discussed above with respect to FIG. 37B. The upper electrodes 3716 and lower electrodes 3718 wrapping around the pixelated transducer 3700D (e.g., by way of the insulating material 3703) can be separated from one another by gaps 3770B. Wrapping around the electrodes 3716 and 3718 from the first and second sides of pixelated transducer 3700D to the third side of the pixelated transducer 3700D can allow for simplified connections between the transducer and a touch and/or force sensing circuit (e.g., via flex circuit, interposer, direct bonding, etc.) on the side of pixelated transducer 3700D. It should be understood that pixelated transducers 3700C-D can be similarly implemented with upper and lower electrodes wrapping to a common, fourth side of the transducer (e.g., opposite the third side) instead of wrapping around to the common, third side of the transducer as illustrated in FIGS. 8C-D.

FIG. 37E illustrates another exemplary pixelated transducer 3700E according to examples of the disclosure. Pixelated transducer 3700E can correspond to pixelated transducer 3700C implemented with the upper electrodes and lower electrodes wrapping around to different third and fourth sides of piezoelectric material 3701 rather than to a common third (or fourth) side of piezoelectric material 3701. For example, transducer 3700E can include a plurality of upper electrodes 3720 disposed on a first side of the piezoelectric material 3701 (e.g., top side illustrated in FIG. 37E) and a plurality of lower electrodes 3722 disposed on a second side of piezoelectric material 3701 (e.g., bottom side illustrated in FIG. 37E). In the pixelated arrangement of FIG. 37E, adjacent upper electrodes 3720 can be separated from one another by gaps 3770A and adjacent lower electrodes 3722 can also be separated from one another by gaps 3770A. The upper electrodes 3720 can wrap around from the first side (top side) of piezoelectric material 3701 to a third side of piezoelectric material 3701 (e.g., front right side illustrated in FIG. 37E) and lower electrodes 3722 can wrap around from the second side (bottom side) of piezoelectric material 3701 to a fourth side of piezoelectric material 3701 (e.g. back left side illustrated in FIG. 37E), for example. The upper electrodes 3720 and lower electrodes 3722 wrapping around the piezoelectric material 3701 can be on mutually exclusive sides of the piezoelectric material, and thereby separated from one another. Connections between the transducer and a touch and/or force sensing circuit (e.g., via flex circuit, interposer, direct bonding, etc.) can be made on the sides of piezoelectric material 3701 rather than on the top or bottom of piezoelectric material 3701.

FIG. 37F illustrates another exemplary pixelated transducer 3700F according to examples of the disclosure. Pixelated transducer 3700F can correspond to pixelated transducer 3700E, except pixelated transducer 3700F can include insulating material 3703 disposed on two opposite sides of the piezoelectric material 3701. For example, pixelated transducer 3700F can include a plurality of upper electrodes 3724 disposed on a first side of the piezoelectric material 3701 (e.g., top side illustrated in FIG. 37F) and a plurality of lower electrodes 3726 disposed on a second side of the piezoelectric material 3701 (e.g., bottom side illustrated in FIG. 37F). Pixelated transducer 3700F can include an insulating material 3703 disposed on a third side of piezoelectric material 3701 and on a fourth side of piezoelectric material 3701, for example. In the pixelated arrangement of FIG. 37F, adjacent upper electrodes 3724 can be separated from one another by gaps 3770A and adjacent lower electrodes 3726 can also be separated from one another by gaps 3770A. The upper electrodes 3724 can wrap around from the first side (top side) of piezoelectric material 3701 to a third side (e.g., front right side illustrated in FIG. 37F) by way of insulating material 3703 and lower electrodes 3726 can wrap around from the second side (bottom side) of piezoelectric material 3701 to a fourth side (e.g., back left side illustrated in FIG. 37F) by way of insulating material 3703. Unlike the electrodes 3720 and 3722 of transducer 3700E, electrodes 3724 and 3726 can each wrap around insulating material 3703 and can terminate on insulating material 3703. Using an insulating material for the wraparound connection can result in improved stimulation and sensing of the transducer as described above. Wrapping around the upper electrodes 3724 from the first side to the third side and wrapping around the lower electrodes 3726 from the second side to the fourth side can allow for connections between the transducer and a touch and/or force sensing circuit (e.g., via flex circuit, interposer, direct bonding, etc.) via the sides of pixelated transducer 3700F. It should be understood that pixelated transducers 3700E-F can be similarly implemented with upper electrodes wrapping to a fourth side of the transducer and lower electrodes wrapping to a third side of the transducer instead of upper electrodes wrapping to a third side of the transducer and lower electrodes wrapping to a fourth side of the transducer as illustrated in FIGS. 8E-F.

FIG. 37G illustrates another exemplary pixelated transducer 3700G according to examples of the disclosure. Pixelated transducer 3700G can correspond to pixelated transducer 3700A implemented without a wraparound. For example, transducer 3700G can include a plurality of upper electrodes 3728 disposed on a first side of the piezoelectric material 3701 (e.g., top side illustrated in FIG. 37G) and a plurality of lower electrodes 3730 disposed on a second side of piezoelectric material 3701 (e.g., bottom side illustrated in FIG. 37G). In the pixelated arrangement of FIG. 37G, adjacent upper electrodes 3728 can be separated from one another by one or more gaps 3770A and adjacent lower electrodes 3730 can also be separated from one another by gaps 3770A. A connection can be made to touch and/or force circuitry via a flex circuit (which can be bonded to transducer 3700G by an adhesive (e.g., epoxy).

FIG. 37H illustrates another exemplary pixelated transducer 3700H according to examples of the disclosure. Pixelated transducer 3700H can correspond to pixelated transducer 3700G implemented with pixelated electrodes on one side and a single continuous electrode on the second side. For example, transducer 3700H can include a plurality of upper electrodes 3732 disposed on a first side of piezoelectric material 3701 (e.g., top side illustrated in FIG. 37H) and a lower electrode 3734 disposed on a second side of piezoelectric material 3701 (e.g., bottom side illustrated in FIG. 37H). Adjacent upper electrodes 3732 can be separated from one another by gaps 3770A. It should be understood that although pixelated transducer 3700H is illustrated with pixelated upper electrodes 3732 and a single lower electrode, a pixelated transducer can similarly be implemented with a single continuous upper electrode and pixelated lower electrodes.

FIG. 37I illustrates another exemplary pixelated transducer 3700I according to some examples of the disclosure. Pixelated transducer 3700I can correspond to pixelated transducer 3700H implemented such that the lower electrode wraps around piezoelectric material 3701 by way of an insulating material 3703 to a first side (e.g., top side) from a second side (e.g., bottom side). In some examples, insulating material 3703 can be omitted and the lower electrode can wrap piezoelectric material 3701. For example, transducer 3700I can include a plurality of upper electrodes 3736 disposed on a first side of the transducer 3700I (e.g., top side illustrated in FIG. 37I) and a lower electrode 3738 disposed on a second side of the transducer 3700I (e.g., bottom side illustrated in FIG. 37I). In the pixelated arrangement of FIG. 37I, the upper electrodes 3736 can be separated from one another by gaps 3770A. In some examples, the lower electrode 3738 can wrap around from the second side (e.g., bottom side) of the transducer 3700I to the first side (e.g., top side) of the transducer 3700I by way of insulating material 3703. In some examples, a via through the insulating material 3703 can be used instead of the wraparound. Using an insulating material for the wraparound (or via) connection can result in improved stimulation and sensing of the transducer as described above. The lower electrode 3738 wrapping around pixelated transducer 3700I (e.g., wrapping around the insulating material 3703) can leave a gap 3770B between the lower electrode 3738 and one of the upper electrodes 3738, for example. Wrapping around the lower electrode 3738 from the second side of the pixelated transducer 3700I to the first side of the transducer 3700I can allow for simplified connections between the transducer and a touch and/or force sensing circuit (e.g., via flex circuit, interposer, direct bonding, etc.). It should be understood that pixelated transducer 3700I can instead be implemented with a single continuous upper electrode wrapping around from a first side of piezoelectric material 3701 to a second side of piezoelectric material 3701 and pixelated lower electrodes.

FIG. 37J illustrates another exemplary pixelated transducer 3700J according to examples of the disclosure. For example, transducer 3700J can include a first upper electrode 3740 and a second upper electrode 3742 disposed on a first side of piezoelectric material 3701 (e.g., top side as illustrated in FIG. 37J) and a lower electrode 3744 disposed on a second side of piezoelectric material 3701 (e.g., bottom side as illustrated in FIG. 37J). The first upper electrode 3740 and the second plurality of upper electrode 3742 can have interlocking shapes separated from one another by gaps 3770A, for example.

FIG. 37K illustrates another exemplary pixelated transducer 3700K according to examples of the disclosure. Pixelated transducer 3700K can correspond to pixelated transducer 3700J implemented with the lower electrode wrapping around from a second side (e.g., bottom side) of the transducer to a first side (e.g., top side) of the transducer by way of an insulting material 3703. In some examples, the insulated material 3703 can be omitted. Transducer 3700K can include a first upper electrode 3746 and a second upper electrode 3748 disposed on a first side of the transducer 3700K (e.g., top side as illustrated in FIG. 37K) and a lower electrode 3750 disposed on a second side of the transducer 3700K (e.g., bottom side as illustrated in FIG. 37K). The first upper electrode 3746 and the second upper electrode 3748 can have interlocking shapes separated by gaps 3770A, for example. In some examples, lower electrode 3750 can wrap around from the second side (bottom side) of the transducer 3700K to the first side (top side) of the transducer 3700K, for example. The lower electrode 3750 wrapping around the transducer 3700K (e.g., wrapping around the insulating material 3703) can be disposed to leave gap 3770B between lower electrode 3750 and upper electrodes 3746 and 3748. Using an insulating material for the wraparound and/or connection can result in improved stimulation and sensing of the transducer as described above. Wrapping around lower electrode 3750 to the first side of the pixelated transducer 3700K from the second side of pixelated transducer 3700K can allow for simplified connections between the transducer and a touch and/or force sensing circuit (e.g., via flex circuit, interposer, direct bonding, etc.) In some examples, a via through insulating material 3703 can be used instead of a wraparound. Although lower electrodes 3744 and 3750 are illustrated as single continuous electrodes in FIGS. 8J and 8K, in some examples, lower electrodes 3744 and 3750 can be implemented with pixelated electrodes. It should be understood that pixelated transducers 3700J and 3700K can be similarly implemented with a single upper electrode wrapping around to the second side of the transducer from a first side of the transducer and with two interlocking lower electrodes on the second side of the transducer.

FIG. 37L illustrates another exemplary pixelated transducer 3700L according to examples of the disclosure. Pixelated transducer 3700L can correspond to pixelated transducer 3700J implemented with one of the upper electrodes and the lower electrode wrapping around to a common, third side of piezoelectric material 3701. In some examples the second of the upper electrodes can also wrap around to a fourth side of piezoelectric material, allowing for side connections to the pixelated transducer. For example, transducer 3700 can include a first upper electrode 3752 and a second upper electrode 3754 disposed on a first side of piezoelectric material 3701 (e.g., top side as illustrated in FIG. 37L) and a lower electrode 3756 disposed on a second side of piezoelectric material 3701 (e.g., bottom side as illustrated in FIG. 37L). The first upper electrode 3752 and the second upper electrode 3754 can have interlocking shapes separated from each other by gaps 3770A, for example, with the connection between topside portions of the respective upper electrode connected by wrapping to a different side of piezoelectric material 3701. For example, the portions of second upper electrode 3754 on the first side of piezoelectric material 3701 can wrap around and be connected together on a different side of piezoelectric material 3701 (third side). The portions of first upper electrode 3752 on the first side of piezoelectric material 3701 can wrap around and be connected together on a different side of piezoelectric material 3701 (fourth side). In some examples, the second upper electrode 3754 and the lower electrode 3756 can wrap from the first side (top side) and second side (bottom side), respectively, of the piezoelectric material 3701 to a third, common side of the piezoelectric material 3701 (e.g., a front right side as illustrated in FIG. 37L). In some examples, a portion of lower electrode 3756 and a portion of the second upper electrode 3754 wrapping around to the third side of piezoelectric material 3701 can be separated from one another by gap 3770B. Wrapping the first upper electrode 3752, second upper electrode 3754 and/or the lower electrode 3756 around the piezoelectric material 3701 to the third and/or fourth side of the piezoelectric material 3701 can allow for simplified connections between the transducer and a touch and/or force sensing circuit (e.g., via flex circuit, interposer, direct bonding, etc.) on the sides of pixelated transducer 3700L. Although one lower electrode 3756 is illustrated in FIG. 37L, in some examples, lower electrode 3756 can be implemented with pixelated lower electrodes in a similar manner as the pixelated top electrode in FIG. 37L. Pixelated transducer 3700L can also be implemented with wraparounds on an insulating material on one or both sides of the transducer.

FIG. 37M illustrates another exemplary pixelated transducer 3700M according to examples of the disclosure. Pixelated transducer 3700M can correspond to pixelated transducer 3700H implemented upper electrodes connected to touch and/or force sensing circuitry by post-processing connections. For example, pixelated transducer 3700M can include a plurality of upper electrodes 3758 between a first side of piezoelectric material 3701 (e.g., top side as illustrated in FIG. 37M) and a lower electrode 3760 disposed on a second side of the piezoelectric material 3701 (e.g., bottom side as illustrated in FIG. 37M). In the pixelated arrangement of FIG. 37M, the upper electrodes 3758 can be separated from one another by gaps 3770A. Upper electrodes 3758 can be coupled to routing 3772 by way of vias 3774. The upper electrodes 3758 and the routing 3772 can be separated by the insulating material 3703, for example. The post-processing (metal-insulator) can be performed on the transducer wafer and then individual pixelated transducers can be cut. The electrodes, vias and metal routings can be patterned using photolithography, for example. Connecting the upper electrodes 3762 to routing 3772 can allow for simplified connections between the pixelated transducer 3700M and a touch and/or force sensing circuit (e.g., via flex circuit, interposer, direct bonding, etc.). In some examples, the routing can continue on another surface (e.g., cover glass) before a connection to the touch and/or force sensing circuit. Although one lower electrode 3760 is illustrated, in some examples, lower electrode 3760 can be pixelated in a similar manner as upper electrodes 3758.

FIGS. 37N and 37O illustrate exploded views of exemplary pixelated transducers 3700N and 3700O according to examples of the disclosure. Pixelated transducer 3700N can correspond to pixelated transducer 3700H implemented with an insulating material 3703 disposed over the upper electrodes. Electrodes disposed above the insulating material 3703 can be capacitively coupled to upper electrodes for driving and sensing the transducer (e.g., electrodes on a flex circuit can be bonded via an epoxy or other adhesive).

Figure 3C:
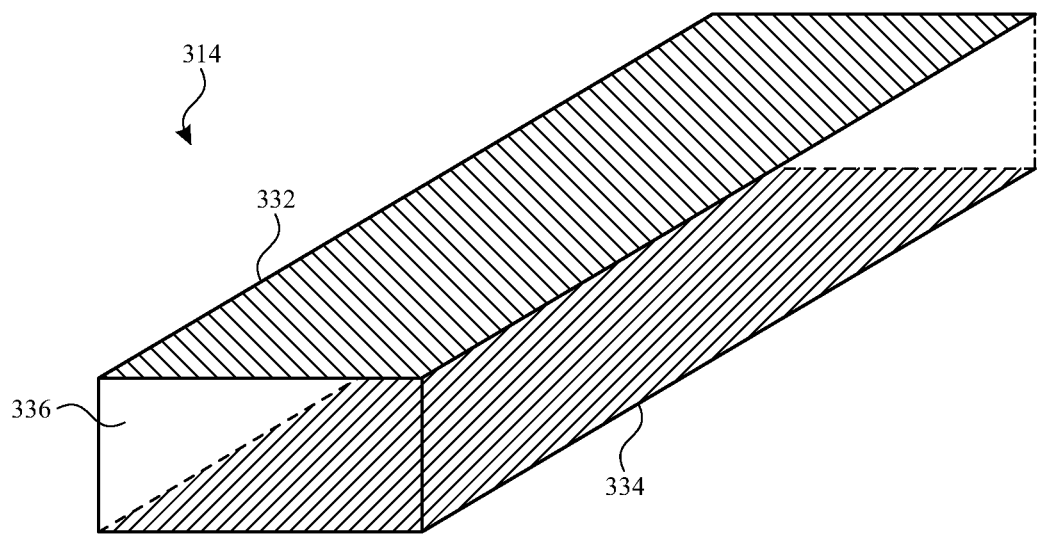
FIG. 3C illustrates a transducer without pixelated electrodes according to examples of the disclosure.

Pixelated transducer 8O can correspond to a non-pixelated transducer 314 of FIG. 3C with an insulating material 3703 disposed over the upper electrode. Electrodes disposed above the insulating material 3703 can be capacitively coupled to upper electrodes for driving and/or sensing the transducer in a localized manner to achieve a pixelated effect (e.g., electrodes on a flex circuit can be bonded via an epoxy or other adhesive). In particular, electrodes disposed above insulating material 3703 for pixelated transducer 8N can be capacitively coupled to upper electrodes for driving and sensing, and electrodes disposed above insulating material 3703 for pixelated transducer 8O can be capacitively coupled to upper electrodes for common mode driving.

Transducer 3700N can include a plurality of upper electrodes 3762 disposed on a first side of an insulating material 3703 (e.g., top side as illustrated in FIG. 37N) and a lower electrode 3764 disposed on a second side of a piezoelectric material 3701 (e.g., bottom side as illustrated in FIG. 37N). The plurality of upper electrodes 3762 can be separated from one another by gaps 3770A. Insulating material 3703 can be disposed on top of the upper electrode layer and multiple electrodes 3766 can be disposed on top of the insulating material 3703. Electrodes 3766 can, in some examples, correspond in size, shape and relative location to upper electrodes 3762. In some examples, the plurality of upper electrodes 3762 can be driven or sensed via capacitive coupling between the upper electrodes 3762 and electrodes 3766. In some examples, electrodes 3766 can be part of a flex circuit to connect the transducer with a touch and/or force sensing circuit. In some examples, post-processing (metal-insulator) can be performed on the transducer wafer to dispose the insulator and patterned mental electrodes on the piezoelectric material. The individual transducers can then be cut from the wafer. In some examples, in order to enable capacitive coupling via insulating material 3703, the insulating material can be very thin and/or have large dielectric constant for high-efficiency capacitive coupling. The electrodes can be patterned using photolithography, for example. Transducer 3700O can include a single upper electrode 3768 rather than pixelated upper electrodes 3762. The single upper electrodes 3766 capacitively coupled to the pixelated electrodes 3766 can result in capacitive coupling therebetween for common mode driving of the pixelated transducer 3700O. In some examples, upper electrode 3768 of FIG. 37O can be removed and electrodes 3766 can be used to drive and sense the transducer using differential driving techniques and spatial differential receiving techniques.

Although lower electrode 3764 is illustrated as a single electrode, in some examples, lower electrode 3764 can be pixelated or mimic a pixelated electrode on the second side of the transducer in addition or instead of the electrodes on the first side of the transducer as illustrated in FIGS. 37N and 37O.

The electrodes of transducers described herein (pixelated or not) can, in some examples, correspond to the full area of the side of the piezoelectric material on which it is disposed (e.g., to maximize the active area of the transducer). In some examples, the electrodes can correspond to less than the full area of the side of the piezoelectric material. The electrodes of the pixelated transducers can be patterned using photolithography or dicing, for example. The upper electrodes and lower electrodes can have same or different dimensions or pitch, for example. In some examples, electrodes on the same layer (e.g., the upper electrode layer or the lower electrode layer) can have varying dimensions and/or different sized gaps between each other. Likewise, the gaps between adjacent upper electrodes and the gaps between adjacent lower electrodes can have different sizes. The dimensions and pitch of the electrodes can be tuned to meet the requirements of spatial differential receiving for touch and/or force.

Additionally, it should be understood that although a wraparound using an insulating material is illustrated in many of the above examples, (e.g., FIGS. 37B, 37D, 37F, etc.), in some examples, electrodes can be brought from one side of the transducer to another side by a via through the insulating material.

Although the pixelated electrodes (and wraparounds) in the above illustrations have a generally rectangular shape, the pixelated electrode (and wraparounds) are not limited to this shape. FIGS. 37P and 37Q illustrate pixelated transducers with different shaped electrodes according to examples of the disclosure. Pixelated transducer 3700P of FIG. 37P can correspond to the pixelated transducer of FIG. 37A, for example, however, implemented with different shaped electrodes. For example, upper electrodes 3782 can be partially rectangular like upper electrodes 3704 in FIG. 37A, but unlike upper electrodes 3704, upper electrodes 3782 taper and narrow to make space for a wrapped around portion of lower electrode 3784. Lower electrode 3784 can similarly be partially rectangular and also taper before wrapping around. Adjacent upper electrodes 3782 can be separated from one another by 3770A. Adjacent lower electrodes 3784 can be separated from one another by 3770A. Upper electrodes 3782 and corresponding lower electrodes 3784 can be separated from each other by gaps 3770B. Pixelated transducer 3700Q of FIG. 37Q can correspond to the pixelated transducer of FIG. 37A, for example, however, implemented with different shaped electrodes. For example, upper electrodes 3786 can be partially rectangular like upper electrodes 3704 in FIG. 37A, but unlike upper electrodes 3704, upper electrodes 3782 can narrow to make space for a wrapped around portion of lower electrode 3788. Lower electrode 3788 can similarly be partially rectangular and also can narrow before wrapping around. Adjacent upper electrodes 3786 can be separated from one another by 3770A. Adjacent lower electrodes 3788 can be separated from one another by 3770A. Upper electrodes 3786 and corresponding lower electrodes 3786 can be separated from each other by gaps 3770B.

It should be understood the pixelated transducers 3700A-Q are exemplary and other configurations are possible.

It should further be understood that different pixel groupings, electrode pitches, and spatial frequencies (and frequency ratios) than the examples explicitly described throughout the disclosure above can be used without departing from the scope of the present disclosure.

In some exemplary configurations such as general differential receiving, without spatial differential receiving, a transducer can be implemented without pixelated electrodes. For example, FIG. 3C illustrates a transducer without pixelated electrodes according to examples of the disclosure. Transducer 314 can include a piezoelectric material 336 with a first electrode 332 on a first side of piezoelectric material 336 (e.g., top side) and a second electrode 334 on a second side of piezoelectric material 336 (e.g., bottom side). The first electrode 332 and second electrode 334 can be stimulated (e.g., differentially) to transmit ultrasonic waves and can be sensed to receive ultrasonic waves for touch and/or force sensing as described herein. In contrast, spatial differential sensing can require at least pixelated electrodes on at least one side of the transducer. In particular, spatial differential sensing can allow for different receiving configurations (e.g., sensing different pixelated electrode or electrode groups) tuned to receive ultrasonic signal contributions tuned to touch reflections and or force reflections. Thus, the tuning of spatial differential receiving can allow for differentiating of touch and force reflections when overlapping with one another and/or improve detection of touch and/or force reflections even when the touch and force reflections do not overlap.

Therefore, according to the above, some examples of the disclosure are directed to an acoustic touch sensing system, comprising: a transducer; a differential electrode configuration coupled to the transducer; and an amplifier coupled to at least one electrode of the differential electrode configuration, wherein the differential electrode configuration is configured to reject a spatial common mode signal. Additionally or alternatively to one or more of the examples disclosed above, in some examples, the differential electrode configuration is configured with an alternating pattern of electrodes. Additionally or alternatively to one or more of the examples disclosed above, in some examples, the alternating pattern of electrodes has a pitch corresponding to a first spatial frequency. Additionally or alternatively to one or more of the examples disclosed above, in some examples, the switching circuitry is further configured to: group two or more electrodes of the differential electrode configuration in a first grouping configuration having a first pitch; and group two or more electrodes of the differential electrode configuration in a second grouping configuration having a second pitch, different from the first pitch. Additionally or alternatively to one or more of the examples disclosed above, in some examples, the switching circuitry is further configured to: group four or more electrodes of the differential electrode configuration in a first grouping configuration having a first pitch and a first spatial phase; and group the four or more electrodes of the differential electrode configuration in a second grouping configuration having the first pitch and a second spatial phase, different from the first spatial phase. Additionally or alternatively to one or more of the examples disclosed above, in some examples, the switching circuitry is further configured to: group the four or more electrodes of the differential electrode configuration in a third grouping configuration having a second pitch, different from the first pitch. Additionally or alternatively to one or more of the examples disclosed above, in some examples, the first pitch corresponds to a first spatial frequency, and the second pitch corresponds to a second spatial frequency, different from the first spatial frequency.

Some examples of the disclosure are directed to a method comprising: transmitting an acoustic wave from a transducer; receiving a reflected acoustic wave at two electrodes arranged in a differential configuration; and compensating for a spatial common mode signal using the received signal from the differential electrode configuration. Additionally or alternatively to one or more of the examples disclosed above, in some examples, the differential electrode configuration is configured with an alternating pattern of electrodes. Additionally or alternatively to one or more of the examples disclosed above, in some examples, the alternating pattern of electrodes has a pitch corresponding to a first spatial frequency. Additionally or alternatively to one or more of the examples disclosed above, in some examples, the method further comprises: grouping two or more electrodes of the differential electrode configuration in a first grouping configuration having a first pitch; and grouping two or more electrodes of the differential electrode configuration in a second grouping configuration having a second pitch, different from the first pitch. Additionally or alternatively to one or more of the examples disclosed above, in some examples, the method further comprises: grouping four or more electrodes of the differential electrode configuration in a first grouping configuration having a first pitch and a first spatial phase; and grouping four or more electrodes of the differential electrode configuration in a second grouping configuration having the first pitch and a second spatial phase, different from the first spatial phase.

Some examples of the disclosure are directed to a non-transitory computer-readable storage medium having stored therein instructions, which when executed by a processor cause the processor to perform a method comprising: transmitting an acoustic wave from a transducer; receiving a reflected acoustic wave at two electrodes arranged in a differential configuration; and compensating for a spatial common mode signal using the received signal from the differential electrode configuration. Additionally or alternatively to one or more of the examples disclosed above, in some examples, the differential electrode configuration is configured with an alternating pattern of electrodes. Additionally or alternatively to one or more of the examples disclosed above, in some examples, the alternating pattern of electrodes has a pitch corresponding to a first spatial frequency. Additionally or alternatively to one or more of the examples disclosed above, in some examples, the method further comprises: grouping two or more electrodes of the differential electrode configuration in a first grouping configuration having a first pitch; and grouping two or more electrodes of the differential electrode configuration in a second grouping configuration having a second pitch, different from the first pitch. Additionally or alternatively to one or more of the examples disclosed above, in some examples, the method further comprises: grouping four or more electrodes of the differential electrode configuration in a first grouping configuration having a first pitch and a first spatial phase; and grouping four or more electrodes of the differential electrode configuration in a second grouping configuration having the first pitch and a second spatial phase, different from the first spatial phase.

Some examples of the disclosure are directed to An acoustic touch sensing system, comprising: a transducer, a differential electrode configuration coupled to the transducer; switching circuitry configured to: couple the differential electrode configuration to drive circuitry configured to drive the transducer to produce an acoustic wave during a drive phase; and couple the differential electrode configuration to sense circuitry configured to receive electrical signals from the transducer during a sensing phase; and an amplifier coupled to at least two electrode of the differential electrode configuration, wherein the differential electrode configuration is configured to reject a spatial common mode signal. Additionally or alternatively to one or more of the examples disclosed above, in some examples, the acoustic touch sensing system further comprises: a first electrode and a second electrode are disposed on a first side of the transducer; and a third electrode is disposed on the second side of the transducer; wherein: the first electrode are coupled together during the drive mode; and the first electrode and the second electrode are coupled differentially to the sense circuitry during the sensing mode. Additionally or alternatively to one or more of the examples disclosed above, in some examples, the third electrode is grounded during the sensing mode and the third electrode is differentially driven with the coupled first and second electrode in the driving mode. Additionally or alternatively to one or more of the examples disclosed above, in some examples, the third electrode is floating during the sensing mode and the third electrode is differentially driven with the coupled first and second electrode in the driving mode.

Some examples of the disclosure are directed to a method comprising: coupling a differential electrode configuration to drive circuitry configured to drive a transducer to produce an acoustic wave during a drive phase and coupling the differential electrode configuration to sense circuitry configured to receive electrical signals from the transducer during a sensing phase, wherein the differential electrode configuration is coupled to the transducer and configured to reject a spatial common mode signal from a received acoustic wave. Additionally or alternatively to one or more of the examples disclosed above, in some examples, the sensing phase comprises a touch sensing phase and a force sensing phase. Additionally or alternatively to one or more of the examples disclosed above, in some examples, the touch sensing phase comprises an in-phase touch sensing phase and a quadrature touch sensing phase, wherein coupling the differential electrode configuration to the sense circuitry during the in-phase touch sensing phase comprises coupling the differential electrode configuration to the sense circuitry in a first electrode grouping and coupling the differential electrode configuration to the sense circuitry during the quadrature touch sensing phase comprises coupling the differential electrode configuration to the sense circuitry in a second electrode grouping, different from the first electrode grouping. Additionally or alternatively to one or more of the examples disclosed above, in some examples, the sensing phase comprises concurrently capturing an in-phase touch measurement, a quadrature touch measurement, and a force measurement. Additionally or alternatively to one or more of the examples disclosed above, in some examples, concurrently capturing comprises, concurrently receiving at least four signals from at least four of the differential electrodes at four sensing circuits and concurrently combining the at least four differential signals in different combinations to produce the in-phase touch measurement, quadrature touch measurement, and force measurement.

Some examples of the disclosure are directed to a non-transitory computer-readable storage medium having stored therein instructions, which when executed by a processor cause the processor to perform a method comprising: coupling a differential electrode configuration to drive circuitry configured to drive a transducer to produce an acoustic wave during a drive phase and coupling the differential electrode configuration to sense circuitry configured to receive electrical signals from the transducer during a sensing phase, wherein the differential electrode configuration is coupled to the transducer and configured to reject a spatial common mode signal from a received acoustic wave. Additionally or alternatively to one or more of the examples disclosed above, in some examples, the sensing phase comprises a touch sensing phase and a force sensing phase. Additionally or alternatively to one or more of the examples disclosed above, in some examples, the touch sensing phase comprises an in-phase touch sensing phase and a quadrature touch sensing phase, wherein coupling the differential electrode configuration to the sense circuitry during the in-phase touch sensing phase comprises coupling the differential electrode configuration to the sense circuitry in a first electrode grouping and coupling the differential electrode configuration to the sense circuitry during the quadrature touch sensing phase comprises coupling the differential electrode configuration to the sense circuitry in a second electrode grouping, different from the first electrode grouping. Additionally or alternatively to one or more of the examples disclosed above, in some examples, the sensing phase comprises concurrently capturing an in-phase touch measurement, a quadrature touch measurement, and a force measurement. Additionally or alternatively to one or more of the examples disclosed above, in some examples, concurrently capturing comprises, concurrently receiving at least four signals from at least four of the differential electrodes at four sensing circuits and concurrently combining the at least four differential signals in different combinations to produce the in-phase touch measurement, quadrature touch measurement, and force measurement.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method comprising:
coupling a differential electrode configuration to drive circuitry configured to drive a transducer to produce an acoustic wave during a drive phase; and
coupling the differential electrode configuration to sense circuitry configured to receive electrical signals from the transducer during a sensing phase, wherein the differential electrode configuration is coupled to the transducer and configured to reject a spatial common mode signal from a received acoustic wave.

2. The method of claim 1, wherein the sensing phase comprises a touch sensing phase and a force sensing phase.

3. The method of claim 2, wherein the touch sensing phase comprises an in-phase touch sensing phase and a quadrature touch sensing phase, wherein coupling the differential electrode configuration to the sense circuitry during the in-phase touch sensing phase comprises coupling the differential electrode configuration to the sense circuitry in a first electrode grouping and coupling the differential electrode configuration to the sense circuitry during the quadrature touch sensing phase comprises coupling the differential electrode configuration to the sense circuitry in a second electrode grouping, different from the first electrode grouping.

4. The method of claim 1, wherein the sensing phase comprises concurrently capturing an in-phase touch measurement, a quadrature touch measurement, and a force measurement.

5. The method of claim 4, wherein concurrently capturing comprises, concurrently receiving at least four differential signals from at least four of differential electrodes included in the differential electrode configuration at four sensing circuits and concurrently combining the at least four differential signals in different combinations to produce the in-phase touch measurement, the quadrature touch measurement, and the force measurement.

6. The method of claim 1, wherein the spatial common signal corresponds to a common mode voltage.

7. The method of claim 1, wherein the differential electrode configuration is configured to generate a differential signal using a first signal corresponding to a first electrode and a second signal corresponding to a second electrode included in the differential electrode configuration.

8. A non-transitory computer-readable storage medium having stored therein instructions, which when executed by a processor cause the processor to perform a method comprising:

coupling a differential electrode configuration to drive circuitry configured to drive a transducer to produce an acoustic wave during a drive phase; and
coupling the differential electrode configuration to sense circuitry configured to receive electrical signals from the transducer during a sensing phase, wherein the differential electrode configuration is coupled to the transducer and configured to reject a spatial common mode signal from a received acoustic wave.

9. The non-transitory computer-readable storage medium of claim 8, wherein the sensing phase comprises a touch sensing phase and a force sensing phase.

10. The non-transitory computer-readable storage medium of claim 9, wherein the touch sensing phase comprises an in-phase touch sensing phase and a quadrature touch sensing phase, wherein coupling the differential electrode configuration to the sense circuitry during the in-phase touch sensing phase comprises coupling the differential electrode configuration to the sense circuitry in a first electrode grouping and coupling the differential electrode configuration to the sense circuitry during the quadrature touch sensing phase comprises coupling the differential electrode configuration to the sense circuitry in a second electrode grouping, different from the first electrode grouping.

11. The non-transitory computer-readable storage medium of claim 8, wherein the sensing phase comprises concurrently capturing an in-phase touch measurement, a quadrature touch measurement, and a force measurement.

12. The non-transitory computer-readable storage medium of claim 11, wherein concurrently capturing comprises, concurrently receiving at least four differential signals from at least four differential electrodes of the differential electrode configuration at four sensing circuits and concurrently combining the at least four differential signals in different combinations to produce the in-phase touch measurement, the quadrature touch measurement, and the force measurement.

13. An acoustic touch sensing system, comprising:
a transducer;
a differential electrode configuration coupled to the transducer;
switching circuitry configured to:
couple the differential electrode configuration to drive circuitry configured to drive the transducer to produce an acoustic wave during a drive phase;
couple the differential electrode configuration to sense circuitry configured to receive electrical signals from the transducer during a sensing phase; and
an amplifier coupled to at least two electrodes of the differential electrode configuration, wherein the differential electrode configuration is configured to reject a spatial common mode signal.

14. The acoustic touch sensing system of claim 13, further comprising:
a first electrode and a second electrode disposed on a first side of the transducer; and
a third electrode disposed on a second side of the transducer;
wherein:
the first electrode and the second electrode are coupled together during the drive phase, and
the first electrode and the second electrode are coupled differentially to the sense circuitry during the sensing phase.

15. The acoustic touch sensing system of claim 14, wherein the third electrode is grounded during the sensing phase and the third electrode is differentially driven with the coupled first and second electrode in the drive phase.

16. The acoustic touch sensing system of claim 14, wherein the third electrode is floating during the sensing phase and the third electrode is differentially driven with the coupled first and second electrode in the drive phase.

17. The acoustic touch sensing system of claim 13, wherein the sensing phase comprises a touch sensing phase and a force sensing phase.

18. The acoustic touch sensing system of claim 17, wherein:
the touch sensing phase comprises an in-phase touch sensing phase and a quadrature touch sensing phase,
coupling the differential electrode configuration to the sense circuitry during the in-phase touch sensing phase comprises coupling the differential electrode configuration to the sense circuitry in a first electrode grouping, and
coupling the differential electrode configuration to the sense circuitry during the quadrature touch sensing phase comprises coupling the differential electrode configuration to the sense circuitry in a second electrode grouping, different from the first electrode grouping.

19. The acoustic touch sensing system of claim 13, wherein operating the acoustic touch sensing system during the sensing phase comprises concurrently capturing an in-phase touch measurement, a quadrature touch measurement, and a force measurement.

20. The acoustic touch sensing system of claim 19, wherein the concurrently capturing comprises, concurrently receiving at least four differential signals from at least four of differential electrodes included in the differential electrode configuration at four sensing circuits, and concurrently combining the at least four differential signals in different combinations to produce the in-phase touch measurement, the quadrature touch measurement, and the force measurement.

* * * * *